US010986848B2

(12) United States Patent
Holz-Schietinger et al.

(10) Patent No.: US 10,986,848 B2
(45) Date of Patent: *Apr. 27, 2021

(54) METHODS AND COMPOSITIONS FOR CONSUMABLES

(71) Applicant: Impossible Foods Inc., Redwood City, CA (US)

(72) Inventors: Celeste Holz-Schietinger, East Palo Alto, CA (US); Sue Klapholz, Stanford, CA (US); Ranjani Varadan, Fremont, CA (US); Monte Casino, San Bruno, CA (US); Patrick O'Reilly Brown, Stanford, CA (US); Michael Eisen, Berkeley, CA (US); Elysia Cohn, Mountain View, CA (US); Jean Prevot, Foster City, CA (US)

(73) Assignee: Impossible Foods Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,937

(22) Filed: Jul. 10, 2015

(65) Prior Publication Data
US 2015/0305361 A1 Oct. 29, 2015

Related U.S. Application Data

(63) Continuation of application No. PCT/US2014/011362, filed on Jan. 13, 2014.

(60) Provisional application No. 61/751,818, filed on Jan. 11, 2013.

(51) Int. Cl.
*A23L 25/00* (2016.01)
*A23L 2/38* (2021.01)
*A23C 20/02* (2021.01)

(52) U.S. Cl.
CPC .............. *A23C 20/02* (2013.01); *A23L 2/382* (2013.01); *A23L 25/00* (2016.08); *A23L 25/40* (2016.08)

(58) Field of Classification Search
CPC .......... A23L 2/385; A23L 25/40; A23L 25/00; A23C 20/02
USPC ...... 426/34, 36, 38, 42, 43, 44, 49, 63, 615, 426/629, 632
See application file for complete search history.

(56) References Cited

U.S. PATENT DOCUMENTS

| | | |
|---|---|---|
| 3,658,550 A | 4/1972 | Hawley |
| 3,693,533 A | 9/1972 | Liepa |
| 3,719,499 A | 3/1973 | Hai et al. |
| 3,743,516 A | 7/1973 | Lundstedt et al. |
| 3,829,582 A | 8/1974 | Guadagni et al. |
| 3,857,970 A | 12/1974 | Tsumura |
| 3,870,801 A | 3/1975 | Tombs |
| 3,892,025 A | 7/1975 | Lainez et al. |
| 3,966,985 A | 6/1976 | Jonas |
| 3,973,043 A | 8/1976 | Lynn |
| 4,045,587 A | 8/1977 | Katz et al. |
| 4,094,997 A | 6/1978 | Aishima et al. |
| 4,218,487 A | 8/1980 | Jaeggi |
| 4,435,438 A | 3/1984 | Lehnhardt et al. |
| 4,604,290 A | 8/1986 | Lee et al. |
| 4,664,919 A | 5/1987 | Yan |
| 4,678,673 A | 7/1987 | Marshall |
| 4,678,676 A | 7/1987 | Ishizuka et al. |
| 4,994,285 A | 2/1991 | Hisano et al. |
| 5,055,310 A | 10/1991 | Nonaka et al. |
| 5,264,239 A | 11/1993 | Cornet et al. |
| 5,443,852 A | 8/1995 | Shahidi et al. |
| 5,597,594 A | 1/1997 | Matsuura et al. |
| 5,650,554 A | 7/1997 | Moloney et al. |
| 5,753,295 A | 5/1998 | Goldman |
| 5,807,601 A | 9/1998 | Carpenter et al. |
| 5,856,452 A | 1/1999 | Moloney et al. |
| 5,922,392 A | 7/1999 | Kelly et al. |
| 6,093,424 A | 7/2000 | Han et al. |
| 6,146,645 A | 11/2000 | Deckers et al. |
| 6,183,762 B1 | 2/2001 | Deckers et al. |
| 6,210,742 B1 | 4/2001 | Deckers et al. |
| 6,228,418 B1 | 5/2001 | Gluck |
| 6,242,036 B1 | 6/2001 | Han et al. |
| 6,254,900 B1 | 7/2001 | Hansen |
| 6,287,620 B1 | 9/2001 | Van Den Ouweland et al. |
| 6,372,234 B1 | 4/2002 | Deckers et al. |
| 6,372,961 B1 | 4/2002 | Tarczynski |
| 6,379,738 B1 | 4/2002 | Dingman et al. |
| 6,383,531 B1 | 5/2002 | Gottemoller |
| 6,399,135 B2 | 6/2002 | Gottemoller |
| 6,413,569 B1 | 7/2002 | Borders et al. |
| 6,416,797 B1 | 7/2002 | Han et al. |
| 6,420,148 B2 | 7/2002 | Yamaguchi |

(Continued)

FOREIGN PATENT DOCUMENTS

| | | |
|---|---|---|
| CN | 1252231 A | 5/2000 |
| CN | 1301811 A | 7/2001 |

(Continued)

OTHER PUBLICATIONS

Anonymous, Almond 'Feta' or 'Ricotta' (http://thesethingsilove.com/2012/03/almond-feta-or-ricotta/), Mar. 21, 2012.*
Felt, M., Raw Vegan Almond Ricotta Cheese (https://feedyourskull.com/2012/03/12/raw-vegan-almond-ricotta-cheese/), Mar. 12, 2012.*
"Heterlolgous," Merriam-Webster Dictionary, retrieved on Sep. 10, 2015, http://www.merriam-webster.com/dictionary/heterologous, 1 page.
"Silicon Valley gets a taste for food," The Economist Technology Quarterly, Mar. 7, 2015, http://cdn.static-economist.com/sites/default/files/sponsorships/accenture_tq_march2015/20150307_tq_mailout.pdf, pp. 11-13.

(Continued)

Primary Examiner — Leslie A Wong
(74) Attorney, Agent, or Firm — Fish & Richardson P.C.

(57) ABSTRACT

Provided herein are methods and compositions for the production of cheese replicas. Generally the cheese replicas are produced by inducing the enzymatic curdling of non-dairy milks.

8 Claims, 22 Drawing Sheets
Specification includes a Sequence Listing.

(56) References Cited

U.S. PATENT DOCUMENTS

| | | |
|---|---|---|
| 6,455,081 B1 | 9/2002 | Han et al. |
| 6,495,184 B1 | 12/2002 | Zheng et al. |
| 6,495,187 B1 | 12/2002 | Borders et al. |
| 6,509,453 B1 | 1/2003 | Moloney |
| 6,582,710 B2 | 6/2003 | Deckers et al. |
| 6,596,287 B2 | 7/2003 | Deckers et al. |
| 6,599,513 B2 | 7/2003 | Deckers et al. |
| 6,692,788 B1 | 2/2004 | Mottram et al. |
| 6,761,914 B2 | 7/2004 | Deckers et al. |
| 6,908,634 B2 | 6/2005 | Hwang |
| 6,936,749 B1 | 8/2005 | Guy et al. |
| 7,052,879 B2 | 5/2006 | Shaw et al. |
| 7,332,587 B2 | 2/2008 | Moloney |
| 7,407,786 B2 | 8/2008 | Giver et al. |
| 7,479,472 B1 | 1/2009 | Harbury et al. |
| 7,585,645 B2 | 9/2009 | Deckers et al. |
| 7,622,290 B2 | 11/2009 | Brunstedt et al. |
| 7,666,618 B2 | 2/2010 | Miasnikov et al. |
| 7,666,628 B2 | 2/2010 | Moloney |
| 7,674,953 B2 | 3/2010 | Mulet Salort et al. |
| 7,709,044 B2 | 5/2010 | Ishimoto |
| 7,807,870 B2 | 10/2010 | Geigenberger et al. |
| 7,931,925 B2 | 4/2011 | Nielsen |
| 8,012,732 B2 | 9/2011 | Brunstedt et al. |
| 8,021,695 B2 | 9/2011 | Gruber et al. |
| 8,188,415 B2 | 5/2012 | Kats et al. |
| 8,304,522 B2 | 11/2012 | Kungitani |
| 8,597,694 B2 | 12/2013 | Guth et al. |
| 9,011,949 B2 * | 4/2015 | Brown ............... A23C 20/005 426/63 |
| 9,808,029 B2 | 11/2017 | Fraser et al. |
| 9,826,772 B2 | 11/2017 | Fraser et al. |
| 9,943,096 B2 | 4/2018 | Fraser et al. |
| 2001/0024677 A1 | 9/2001 | Bringe |
| 2001/0049132 A1 | 12/2001 | Kringelum et al. |
| 2002/0034570 A1 | 3/2002 | Krammer et al. |
| 2003/0198700 A1 | 10/2003 | Gruber |
| 2003/0212281 A1 | 11/2003 | Sinha et al. |
| 2003/0224476 A1 | 12/2003 | Chou |
| 2004/0151778 A1 | 8/2004 | Richard et al. |
| 2004/0161513 A1 | 8/2004 | Akashe et al. |
| 2005/0037111 A1 | 2/2005 | Berry |
| 2006/0035003 A1 | 2/2006 | McMindes et al. |
| 2006/0035006 A1 | 2/2006 | McMindes et al. |
| 2006/0204644 A1 | 9/2006 | Cavallini et al. |
| 2006/0233721 A1 | 10/2006 | Tamarkin et al. |
| 2007/0269567 A1 | 11/2007 | McMindes et al. |
| 2007/0269571 A1 | 11/2007 | Akita et al. |
| 2007/0269583 A1 | 11/2007 | McMindes et al. |
| 2008/0063752 A1 | 3/2008 | Perez |
| 2008/0226810 A1 | 9/2008 | Passe et al. |
| 2008/0254168 A1 | 10/2008 | Mueller et al. |
| 2008/0254199 A1 | 10/2008 | Orcutt et al. |
| 2008/0268112 A1 | 10/2008 | Rolan et al. |
| 2008/0292749 A1 | 11/2008 | Goodwins et al. |
| 2008/0299254 A1 | 12/2008 | Kim et al. |
| 2009/0061046 A1 | 3/2009 | Tams et al. |
| 2009/0264520 A1 | 10/2009 | Bhagat et al. |
| 2009/0274817 A1 | 11/2009 | Yamaguchi et al. |
| 2010/0074998 A1 | 3/2010 | Vega et al. |
| 2010/0136201 A1 | 6/2010 | Bigeard et al. |
| 2010/0196575 A1 | 8/2010 | Sanchez |
| 2010/0233347 A1 | 9/2010 | Uhrhan |
| 2010/0249560 A1 | 9/2010 | Levinson et al. |
| 2010/0281765 A1 | 11/2010 | Schwartz |
| 2010/0310738 A1 | 12/2010 | Ludwig |
| 2010/0311950 A1 | 12/2010 | Kugitani |
| 2011/0008502 A1 | 1/2011 | Hosomi et al. |
| 2011/0064847 A1 | 3/2011 | Miwa et al. |
| 2011/0064862 A1 | 3/2011 | McCready et al. |
| 2011/0065847 A1 | 3/2011 | Miwa et al. |
| 2011/0081386 A1 | 4/2011 | Guth et al. |
| 2011/0081435 A1 | 4/2011 | Guth et al. |
| 2011/0117180 A1 | 5/2011 | Yan et al. |
| 2011/0286992 A1 | 11/2011 | Gruber et al. |
| 2011/0288389 A9 | 11/2011 | Levinson et al. |
| 2012/0059150 A1 | 3/2012 | Moloney et al. |
| 2012/0093994 A1 | 4/2012 | Hsieh et al. |
| 2013/0004617 A1 | 1/2013 | Zhang et al. |
| 2015/0296834 A1 | 10/2015 | Geistlinger et al. |
| 2015/0296835 A1 | 10/2015 | Anderson et al. |
| 2015/0366233 A1 | 12/2015 | Brown et al. |
| 2017/0172169 A1 | 6/2017 | Grzanich |
| 2018/0027851 A1 | 2/2018 | Vrlijic et al. |
| 2018/0192680 A1 | 7/2018 | Fraser et al. |
| 2018/0199605 A1 | 7/2018 | Fraser et al. |
| 2018/0199606 A1 | 7/2018 | Fraser et al. |
| 2018/0368453 A1 | 12/2018 | Brown et al. |
| 2019/0008192 A1 | 1/2019 | Brown et al. |

FOREIGN PATENT DOCUMENTS

| | | |
|---|---|---|
| CN | 1407108 A | 4/2003 |
| CN | 1466903 | 1/2004 |
| CN | 1557188 | 12/2004 |
| CN | 1593223 A | 3/2005 |
| CN | 1634524 A | 7/2005 |
| CN | 101138405 | 3/2008 |
| CN | 101156632 | 4/2008 |
| CN | 101489422 | 7/2009 |
| CN | 101541187 A | 9/2009 |
| CN | 101606574 A | 12/2009 |
| CN | 101861895 | 10/2010 |
| CN | 101897418 | 12/2010 |
| CN | 102440302 | 5/2012 |
| CN | 102578544 | 7/2012 |
| CN | 102835460 | 12/2012 |
| DE | 102007061256 | 6/2009 |
| DE | 202011002097 | 3/2011 |
| EP | 0500132 | 8/1992 |
| EP | 0521331 | 1/1993 |
| EP | 0386817 | 5/1993 |
| EP | 0815736 | * 1/1998 |
| EP | 1166653 | 1/2002 |
| EP | 1254601 | 11/2002 |
| EP | 0680751 | 11/2004 |
| EP | 1529444 | 5/2005 |
| EP | 1759593 | 3/2007 |
| EP | 1361264 | 4/2007 |
| EP | 1952695 | 8/2008 |
| EP | 2138052 | 12/2009 |
| EP | 2943072 | 11/2015 |
| GB | 1383149 | 2/1975 |
| GB | 2016255 | 9/1979 |
| JP | 52156962 | 12/1977 |
| JP | S53115846 | 10/1978 |
| JP | S54122766 | 9/1979 |
| JP | S 573338 | 1/1982 |
| JP | S5959151 | 4/1984 |
| JP | S6283842 | 4/1987 |
| JP | H08140627 | 6/1996 |
| JP | H11-508448 | 7/1999 |
| JP | 2001057858 | 3/2001 |
| JP | 2004-242614 | 9/2004 |
| JP | 2009-516522 | 4/2009 |
| JP | 2009136158 | 6/2009 |
| JP | 2009171877 | 8/2009 |
| JP | 2010004809 | 1/2010 |
| JP | 2011000073 | 1/2011 |
| JP | 2011019423 | 2/2011 |
| JP | 2012016336 | 1/2012 |
| RU | 2349093 | 3/2009 |
| SU | 291395 | 6/1971 |
| WO | WO 1993/025697 | 12/1993 |
| WO | WO 1994/017673 | 8/1994 |
| WO | WO 1996/017981 | 6/1996 |
| WO | WO 1997/01961 | 1/1997 |
| WO | WO 1998/012913 | 4/1998 |
| WO | WO 1998/053698 | 12/1998 |
| WO | WO 2001/022829 | 4/2001 |
| WO | WO 2001/022830 | 4/2001 |
| WO | WO 2002037984 | 5/2002 |
| WO | WO 2003/070172 | 8/2003 |
| WO | WO 2004062385 | 7/2004 |

(56) References Cited

FOREIGN PATENT DOCUMENTS

| | | |
|---|---|---|
| WO | WO 2004/113543 | 12/2004 |
| WO | WO 2005/013713 | 2/2005 |
| WO | WO 2005/046354 | 5/2005 |
| WO | WO 2005/097059 | 10/2005 |
| WO | WO 2006/042608 | 4/2006 |
| WO | WO 2007/060288 | 5/2007 |
| WO | WO 2007/115899 | 10/2007 |
| WO | WO 2007/137125 | 11/2007 |
| WO | WO 2007/137128 | 11/2007 |
| WO | WO 2007/118751 | 12/2007 |
| WO | WO 2008/017499 | 2/2008 |
| WO | WO 2008/030089 | 3/2008 |
| WO | WO 2008/083117 | 7/2008 |
| WO | WO 2009/060678 | 5/2009 |
| WO | WO 2009/061571 | 5/2009 |
| WO | WO 2009065723 | 5/2009 |
| WO | WO 2010/101625 | 9/2010 |
| WO | WO 2010136320 | 12/2010 |
| WO | WO 2012/106751 | 8/2012 |
| WO | WO 2012/110797 | 8/2012 |
| WO | WO 2012/116703 | 9/2012 |
| WO | WO 2012169348 | 12/2012 |
| WO | WO 2013/010037 | 1/2013 |
| WO | WO 2013/010042 | 1/2013 |
| WO | WO 2013/013292 | 1/2013 |
| WO | WO 2013/138793 | 9/2013 |
| WO | WO 2014/110532 | 7/2014 |
| WO | WO 2014/110540 | 7/2014 |
| WO | WO 2015/127388 | 8/2015 |

OTHER PUBLICATIONS

"Acidified Milk Products and Protein Stabilisation," Herbstreith & Fox, retrieved on Mar. 3, 2014, http://www.herbstreith-fox.de/en/informative-literature/informative-literature-from-rd-and-tech-application.html, 15 pages.

"Ice Cream and Ice Cream Desserts," Herbstreith & Fox, retrieved on Mar. 3, 2014, http://www.herbstreith-fox.de/en/informative-literature/informative-literature-from-rd-and-tech-application.html, 5 pages.

"Innovation at Its Best: 5 Years of Food Valley Awards," Food Valley, retrieved on Mar. 7, 2014, http://www.foodvalley.nl/English/Afbeeldingen/FVAjubileumuitgave/Innovation%20at%20Its%20Best%20-%205%20Years%20of%20Food%20Valley%20Awards.pdf, 51 pages.

"Low Methylester Amidated Pectins," Herbstreith & Fox, retrieved on Mar. 3, 2014, http://www.herbstreith-fox.de/en/informative-literature/informative-literature-from-rd-and-tech-application.html, 13 pages.

"Stabilisation of Whey and Whey Mix Products with Pectin," Herbstreith & Fox, retrieved on Mar. 3, 2014, http://www.herbstreith-fox.de/en/informative-literature/informative-literature-from-rd-and-tech-application.html, 6 Pages.

"Texturising of Fermented Milk Products," Herbstreith & Fox, retrieved on Mar. 3, 2014, http://www.herbstreith-fox.de/en/informative-literature/informative-literature-from-rd-and-tech-application.html, 6 pages.

Ba et al., "Principles of Meat Aroma flavors and Future Prospect," INTECH Open Science, Open Minds, 2012, Chapter 7, 145-176.

Baek, "Process Flavors," Handbook of Meat, Poultry and Seafood Quality, Second Edition, 2012, Chapter 7, 91-104.

Battaglia et al., "The Enigmatic LEA Proteins and Other HydroPhilins1[W]," Plant Physiology, Sep. 2008, 148:6-24.

Beuchat et al., "Fermentation of Peanut Milk with Lactobacillus bulgaricus and L. acidophilus," J. Food Sci, 1978, 43:1109-1112.

Beyond Better Order page and Nutritional Facts, retrieved on Feb. 6, 2014, http://www.beyond-better.com/order.html, 8 pages.

Beyond Meat, posted on or before Feb. 24, 2001, accessed Jan. 7, 2014, http://beyondmeat.com/, 2 pages.

Boca Bruschetta Tomato Basil Parmesan Veggie Patties Package Ingredients, posted on or before Jul. 22, 2008, accessed on Jan. 7, 2014, http://www.bocaburger.com/products/nutrition-info.aspx?product=5928360103, 1 page.

Boca Flame Grilled Meatless Burgers Package Ingredients, posted on or before Jul. 14, 2008, accessed on Jan. 7, 2014, http://www.bocaburger.com/products/nutrition-info.aspx?product=5928367321, 1 page.

Boca Original Meatless Chik'n Nuggets Package Ingredients, posted on or beforeJul. 22, 2008, accessed Jan. 7, 2014, http://www.bocaburger.com/products/nutrition-info.aspx?product=5928360012, 1 page.

Boca Original Vegan Meatless Burgers Package Ingredients, posted on or before Jul. 14, 2008, accessed Jan. 7, 2014, http://www.bocaburger.com/products/nutrition-info.aspx?product=5928333445, 1 page.

Boral and Bohidar, "Effect of Ionic Strength on Surface-Selective Patch Binding-Induced Phase Separation and Coacervation in Similarly Charged Gelatin-Agar Molecular Systems," Journal of Physical Chemistry B, 2010, 114(37): 12027-35.

Bradshaw, "Food 2.0: the future of what we eat," FT Magazine, Oct. 31, 2014, retrieved on Nov. 11, 2014, http://www.ft.com/cms/s/2/bfa6fca0-5fbb-11e4-8c27-00144feabdc0.html#axzz3InGaCIdL, 6 pages.

Bute Island Foods, "Sheese," posted on or before Dec. 5, 2006, retrieved on Feb. 6, 2014, http://www.buteisland.com/a_sheese_home.htm, 26 pages.

Chicago Vegan Foods, accessed on Jan. 7, 2014, http://chicagoveganfoods.com/products/teese-vegan-cheese/, 8 pages.

Connelly and Piper, "Person of the Year: Tal Ronnen," VegNews, Nov./Dec. 2013, 29-32.

Daiya, Deliciously Dairy Free, "Say Cheese, Dairy-Free cheesy deliciousness," posted on or before Jan. 26, 2010, accessed Jan. 7, 2014, http://www.daiyafoods.com, 6 pages.

Davis et al., "Some Rheological Properties of Aqueous Peanut Flour Dispersions," J. Texture Studies, 2007, 38:253-272.

Deliciously Healthy Nacheez, Products and Nutrition Facts, posted on or before Jan. 23, 2011, retrieved on Sep. 18, 2015, http://nacheez.com/, 9 pages.

Dixie Diner's Club, Cheese (Not!) Sauce Nutrition Facts, posted on or before Sep. 3, 2009, retrieved on Feb. 7, 2014, http://www.dixiediner.com/cheese-notÂ™-sauce-regular-cheese-p-69.html, 4 pages.

Door 86 Vegan Cheese, Discover a New World of Vegan Cheese and Menu, posted on or before Dec. 5, 2013, retrieved Feb. 7, 2014, http://door86vegancheese.wix.com/door-86-vegan-cheese#, 14 pages.

Dr. Cow, Natural Living & Organic Foods, "Aged Cashew & Brazil Nut Cheese," posted on or before Sep. 22, 2008, accessed Feb. 7, 2014, http://www.dr-cow.com/products/aged-cashew-brazil.html, 1 page.

Dr. Cow, Natural Living & Organic Foods, "Aged Cashew & Crystal Algae Cheese," posted on or before Sep. 22, 2008, accessed Feb. 7, 2014, http://www.dr-cow.com/products/aged-cashew-crystal.html, 1 page.

Dr. Cow, Natural Living & Organic Foods, "Aged Cashew & Dulse Cheese," posted on or before Sep. 22, 2008, accessed Feb. 7, 2014, http://www.dr-cow.com/products/aged-cashew-dulse.html, 1 page.

Dr. Cow, Natural Living & Organic Foods, "Aged Cashew & Hemp Seeds Cheese," posted on or before Sep. 22, 2008, accessed Feb. 7, 2014, http://www.dr-cow.com/products/aged-cashew-hemp.html, 1 page.

Dr. Cow, Natural Living & Organic Foods, "Aged Cashew Nut Cheese," posted on or before Sep. 22, 2008, accessed Feb. 7, 2014, http://www.dr-cow.com/products/aged-cashew-nut-cheese.html, 1 page.

Dr. Cow, Natural Living & Organic Foods, "Aged Macadamia & Hemp Seeds Cheese," posted on or before Sep. 22, 2008, accessed Feb. 7, 2014, http://www.dr-cow.com/products/aged-macadam-hemp.html, 1 page.

Dr. Cow, Natural Living & Organic Foods, "Aged Macadamia Nut Cheese," posted on or before Sep. 22, 2008, accessed Feb. 7, 2014, http://www.dr-cow.com/products/aged-macadam-nut-cheese.html, 1 page.

(56) References Cited

OTHER PUBLICATIONS

Dr. Cow, Natural Living & Organic Foods, "Cashew Nut Cream Cheese," posted on or before Sep. 22, 2008, accessed Jan. 7, 2014, http://www.dr-cow.com/products/cashew-nut-cream-cheese.html, 1 page.
Duane, "Engineering the Future of Artisanal Vegan Cheese," Food & Wine, Nov. 2013, http://www.foodandwine.com/articles/engineering-the-future-of-artisanal-vegan-cheese, 5 pages.
Ellis et al., "Structure of ferric soybean leghemoglobin a nicotinate at 2.3 A resolution," Acta Crystallographica, May 1997, Section D, 53(3):302-310.
European Search Report (Supplementary) in European Application No. 12810661.4, dated Mar. 12, 2015, 14 pages.
European Search Report (Supplementary) in European Application No. 12811683.7, dated Mar. 12, 2015, 9 pages.
Fantastic World Foods, "Fantastic Foods Nature's Burger (Meatless Burger Mix)," posted on or before Jan. 6, 2009, accessed on Jan. 7, 2014, http://fantasticfoods.elsstore.com/view/product/?id=8715&cid=1967, 2 pages.
Follow Your Heart Homepage, posted on or before Nov. 28, 1999, accessed Jan. 7, 2014, http://www.followyourheart.com, 3 pages.
Follow Your Heart, Products and Nutrition Facts, posted on or before Nov. 28, 1999, accessed Feb. 7, 2014, http://www.followyourheart.com/products/, 26 pages.
Foo, "Beef and Scallop Stir-Fry," Food & Wine, Jul. 2001, retrieved on Sep. 10, 2015, http://www.foodandwine.com/recipes/beef-and-scallop-stir-fry/print, 3 pages.
Food for Lovers, Vegan Queso Original & Vegan Queso Mild, posted on or before Oct. 27, 2011, retrieved Feb. 7, 2014, http://www.foodforlovers.com/products, 3 pages.
Free & Easy Dairy Free Cheese Flavour Sauce Mix, Holland & Barrett, posted on or before Jun. 22, 2013, retrieved Feb. 7, 2014, http://www.hollandandbarrett.com/pp./product_detail.asp?pid=2686, 2 pages.
Fromson, "The Race to Build a Fake-Meat Burger That Just Might Save the World, Free the cows!" New York Magazine, Jun. 1-7, 2015, 46-48.
Galaxy Foods Vegan Soy Grated Parmesan, ShopRite, retrieved Feb. 7, 2014, http://www.shoprite.com/pd/Galaxy-Nutritional-Foods/Vegan-Grated-Soy-Topping-Parmesan-Flavor/4-oz/077172640006/, 6 pages.
Gardein the Ultimate Beefless Burger Package Ingredients, posted on or before 2013, accessed Jan. 7, 2014, http://gardein.com/products/beefless-burger/, 12 pages.
Gardenburger the Original Veggie Burger Package Ingredients, posted on or before Oct. 5, 2008, accessed Jan. 7, 2014, http://www.gardenburger.com/product.aspx?id=11630, 1 page.
GenBank Accession No. AFK42304.1, unknown [Medicago truncatula], May 25, 2012, 1 page.
Gharst, "Biochemical and Rheological Characteristics of Peanut Proteins Crosslinked with Microbial Transglutaminase," A dissertation submitted to the Graduate Faculty of North Carolina State University, Raleigh NC, 2007, 149 pages.
Gharst, "Effects of Transglutaminase Catalysis on the Functional and Immunoglobulin Binding Properties of Peanut Flour Dispersions Containing Casein," J. Agric. Food Chem., 2008, 56:10913-10921.
Gharst, "The Effect of Transglutaminase Crosslinking on the Rheological Characteristics of Heated Peanut Flour Dispersions," J. Food Sci., 2007, 72(7):C369-C375.
Go Veggie!, "0% Dairy. 100% Yum.," posted on or before 2013, accessed Jan. 7, 2014, http://goveggiefoods.com/our-products/dairy-free-cheese-alternative-products/, 1 page.
Gordinier, "Masters of Disguise Among Meatless Burgers," The New York Times, Mar. 22, 2011, accessed Jan. 7, 2014, http://www.nytimes.com/2011/03/23/dining/23meatless.html?pagewanted=all&_r=0, 5 pages.
Hanlon, "Fake Meat: is science fiction on the verge of becoming fact?," The Guardian, Jun. 22, 2012, http://www.theguardian.com/science/2012/jun/22/fake-meat-scientific-breakthroughs-research, 7 pages.
Heme Protein Database, "Welcome to the Heme Protein Database," posted on or before Apr. 14, 2013, accessed Dec. 18, 2013, http://hemeprotein.info/heme.php, 1 page.
Heritage Health Food Creamy Veeta Cheeze Sauce Mix, Vegan Essentials, posted on or before Aug. 13, 2013, retrieved Feb. 7, 2014, http://store.veganessentials.com/creamy-veeta-cheeze-sauce-mix-by-heritage-health-food-p3945.aspx, 1 page.
Herper, "Drop that Burger," Forbes Online, Nov. 12, 2009, http://www.forbes.com/forbes/2009/1130/thought-leaders-mcdonalds-global-warming-drop-that-burger.html, 4 pages.
Homma et al. "Cheese-like food production from various nuts," Food Preservation Science, Japan 2009, Abstract.
International Preliminary Report on Patentability in International Application No. PCT/US14/11362, dated Jul. 23, 2015, 10 pages.
International Search Report and Written Opinion in International Application No. PCT/US14/11362, dated Jun. 13, 2014, 19 pages.
Jamieson, "Iroquois Stew with Beef, Chicken and Pork," Epicurious, Nov. 1995, retrieved on Sep. 10, 2015, http://www.epicurious.com/recipes/food/printerfriendly/iroquois-stew-with-beef-chicken-and-pork-865, 2 pages.
Jensen, "Comparative Analysis of Autoxidation of Haemoglobin," J. Experimental Biology, 2001, 204:2029-2033.
Ju and Kilara, "Textural Properties of Cold-set Gels Induced from Heat-denatured Whey Protein Isolates," J. Food Science, 1998, 63(2): 288-292.
Kanani, "The Future of Meat is Meatless, Just as Tasty, and About to Change the World," Forbes, Mar. 6, 2014, retrieved on Sep. 11, 2015, http://www.forbes.com/sites/rahimkanani/2014/03/06/the-future-of-meat-is-meatless-just-as-tasty-and-about-to-change-the-world/, 8 pages.
Kraft American Singles Package Ingredients, posted on or before Jun. 27, 2012, accessed on Jan. 7, 2014, http://www.kraftrecipes.com/Products/ProductInfoDisplay.aspx?SiteId=1&Product=2100060473, 1 page.
Kung et al., "Tobacco as a Potential Food Source and Smoke Material: Nutritional Evaluation of Tobacco Leaf Protein," J. Food Sci., 1980, 45(2):320-322, 327.
Leahy Gardens Vegan & Delicious, Macaroni & Cheese and Cheese Flavored Sauce Mix Product and Nutrition Facts, posted on or before Feb. 8, 2010, retrieved Feb. 7, 2014, http://www.leaheyfoods.com/products/MacCheese.aspx, 3 pages.
Lisanatti Foods, Vegan Cheeze Products and Nutrition Facts, posted on or before Mar. 26, 2013, retrieved Feb. 7, 2014, http://www.lisanatti.com/index.php?option=com_zoo&view=category&layout=category&Itemid=22 , 5 pages.
Liu et al., "Intermolecular Interactions During Complex Coacervation of Pea Protein Isolate and Gum Arabic," Journal of Agricultural and Food Chemistry, 2010, 58:552-556.
Lugay and Kim, "Freeze alignment: A novel method for protein texturization," Utilization of Protein Resources, 1981, p. 177-187.
Luteness, "The Richest Source of Protein," MOSAIC, May/Jun. 1979, 39-45.
Maltais et al., "Formation of Soy Protein Isolate Cold-Set Gels: Proteins and Salt Effects," J. Food Science, 2005, 70 (1): C67-C73.
Morningstar Farms Garden Veggie Patties Package Ingredients, posted on or before Jun. 26, 2013, accessed Jan. 7, 2014, https://www.morningstarfarms.com/products/burgers/garden-veggie-patties, 6 pages.
Nacho Mom's Vegan Queso, Products and Nutrition Facts, posted on or before Sep. 20, 2010, retrieved on Feb. 7, 2014, http://fatgoblin.com/Home.html, 6 pages.
Nielson, Introduction to the Chemical Analysis of Foods, Jones & Bartlett Publishers, 1994.
Nutty Cow Nut Cheeses, Products and Nutrition Facts, posted on or before Jul. 23, 2012, retrieved Feb. 7, 2014, http://www.nuttycow.com/, 6 pages.
Parmela Parmesan Style Aged Nut Cheese, Product and Nutrition Facts, 2012, retrieved Feb. 7, 2014, http://www.parmelafoods.com/your-health.html, 4 pages.

(56) References Cited

OTHER PUBLICATIONS

Peace Cheese 100% Plant-based Cheese Alternative, Product and Nutrition Facts, posted on or before Jun. 6, 2012, retrieved Feb. 7, 2014, http://www.ilovepeacecheese.com/#/products/4571642621, 3 pages.
Proulx et al., "Iron Bioavailability of Hemoglobin from Soy Root Nodules Using a Caco-2 Cell Culture Model," J. Agricultural and Food Chemistry, Feb. 2006, 54(4):1519-1522.
Punk Rawk Labs: an ongoing experiment in optimal health, Nut Milk Cheese Products, posted on or before Jun. 8, 2011, retrieved Feb. 7, 2014, http://www.punkrawklabs.net/cheeses.html, 4 pages.
Reedy et al., "Development of a heme protein structure-electrochemical function database," Nucleic Acids Research, 2008, 36:307-313.
Road's End Organics, Cheese Sauce Mix Products and Nutrition Facts, posted on or before Oct. 28, 2009, retrieved Feb. 7, 2014, http://www.edwardandsons.com/reo_shop_chreese.itml, 6 pages.
Road's End Organics, Mac & Chreese Products and Nutrition Facts, posted on or before Oct. 28, 2009, retrieved Feb. 7, 2014, http://www.edwardandsons.com/reo_shop_pastas.itml, 7 pages.
Rusli, "The Secret of These New Veggie Burgers: Plant Blood," The Wall Street Journal, Oct. 7, 2014, retrieved on Oct. 9, 2014, http://online.wsj.com/articles/the-secret-of-these-new-veggie-burgers-plant-blood-1412725267, 5 pages.
Schwartz, "Meet the Silicon Valley-Backed Vegan Cheese That You Might Actually Eat," Fast Company, Feb. 26, 2014, retrieved Sep. 11, 2015, http://www.fastcoexist.com/3025648/meet-the-silicon-valley-backed-vegan-cheese-that-you-might-actually-eat, 6 pages.
Sister River Foods Parma!, Products and Nutrition Facts, Posted on or before Jun. 2, 2012, retrieved Feb. 11, 2014, http://www.veganstore.com/product/parma-vegan-parmesan/vegan-cheese-and-dairy-alternatives, 6 pages.
Soy Kaas, Products, posted on or before Jan. 20, 2011, retrieved Feb. 11, 2014, http://www.soykaas.com/products, 1 page.
Soyco Cheese Products, Natural Pantry, retrieved Feb. 11, 2014, http://www.natural-pantry.com/search_results.asp?ct=All&site_search_qu=soyco&storeID=D92VLAQVMPDL9L5UHTS2WLU67NADEHUA, 10 pages.
Soymage Cheese Products, Good Earth Natural Foods, retrieved on Feb. 11, 2014, http://www.goodearthnaturalfoods.com/shop/brand2.asp?storeID=PJ102JRNHNGT8G0QMPEQ7LDC7GX6C2W2&alpha=S&brand=Soymage&brand_id=805, 6 pages.
Ste Martaen Cheese, Products and Nutrition Facts, posted on or before May 28, 2009, retrieved Feb. 11, 2014, http://stemartaen.bigcartel.com/, 14 pages.
The Daiya Advantage, Products and Nutrition Facts, posted on or before Jan. 26, 2010, retrieved on Feb. 7, 2014, http://us.daiyafoods.com/our-products, 126 pages.
The Vegetarian Express Parma Zaan Sprinkles, posted on or about Oct. 17, 2009, retrieved Feb. 11, 2014, http://www.thevegetarianexpress.com/cart/home.php?cat=250, 2 pages.
Tofu Rella Mozzarella Cheese, Natural Pantry, retrieved Feb. 11, 2014, http://www.natural-pantry.com/shop/product_view.asp?id=24684&StoreID=D92VLAQVMPDL9L5UHTS2WLU67NADEHUA&private_product=0, 2 pages.
Tofutti Cheese Products and Nutrition, posted on or before Jun. 26, 2013, retrieved Feb. 11, 2014, http://www.tofutti.com/dairy-free-cheeses/, 18 pages.
Tofutti Milk Free, "Premium Dairy Free Cheeses,", posted on or before Jun. 26, 2013, accessed Jan. 7, 2014, http://www.tofutti.com/dairy-free-cheeses/, 2 pages.
Trader Joe's Sliced Soy Cheese Alternative, Fotki, posted Oct. 27, 2008, retrieved Feb. 11, 2014, http://public.fotki.com/harwons/food/tj-sliced-soy-cheese.html, 1 page.
Trader Joe's Vegan Mozzarella, a(soy) Bean, posted Jun. 7, 2013, retrieved Feb. 11, 2014, http://a-soy-bean.blogspot.com/2013/06/showdown-trader-joes-vegan-mozzarella.html, 13 pages.
Treeline Treenut Cheese, Products and Nutrition Facts, posted on or before Dec. 10, 2013, retrieved on Feb. 11, 2014, http://www.treelinecheese.com/treeline-cheese-products.html, 3 pages.
Van Den Ouweland et al., "Process Meat Flavor Development and the Maillard Reaction," In Thermal Generation of Aromas, ACS Symposium Series, American Chemical Society, 1989, 433-441.
VBites, "Cheezly," posted on or before 2013, accessed Jan. 7, 2014, http://www.vbitesfoods.com/meat-free/cheezly.html, 2 pages.
Vegan Sun Artisan Aged Raw Cheese, Vegan Essentials, retrieved Feb. 11, 2014, http://store.veganessentials.com/vegan-sun-artisan-aged-raw-cheese-p4201.aspx, 3 pages.
VegCuisine Soy Cheese Products, the Vegan Store, retrieved on Feb. 11, 2014, http://www.veganstore.com/category/s?keyword=vegcuisine, 5 pages.
Veggie Brothers Mozzarella Sticks, Vegan Essentials, Nov. 9, 2013, retrieved Feb. 11, 2014, http://store.veganessentials.com/vegan-mozzarella-sticks-by-veggie-brothers-p3761.aspx, 2 pages.
Victoria Vegan Sauces, Products and Nutrition Facts, posted on or about Sep. 16, 2012, retrieved Feb. 11, 2014, http://www.victoriafinefoods.com/products/specialty-sauces/victoria-vegan, 9 pages.
Wayfare We Can't say It's Cheese Spread, Products and Nutrition Facts, posted on or about Oct. 12, 2013, retrieved Feb. 11, 2014, http://www.wayfarefoods.com/we-cant-say-its-cheese/, 5 pages.
Wortham and Miller, "Venture Capitalists Are Making Bigger Bets on Food Start-Ups," The New York Times Online, Apr. 28, 2013, http://www.nytimes.com/2013/04/29/business/venture-capitalists-are-making-bigger-bets-on-food-start-ups.html?pagewanted=all&_r=1&, 4 pages.
Yves Veggie Cuisine the Good Slice, ShopWell, retrieved on Feb. 11, 2014, http://www.shopwell.com/yves-veggie-cuisine-the-good-slice-cheese-alternative-cheddar-style/soy-foods/p/6082260001, 1 page.
Kummer, "The Problem with Fake Meat," MIT Technology Review, Mar. 31, 2015, retrieved Apr. 20, 2016, <https://www.technologyreview.com/s/536296/the-problem-with-fake-meat/>, 11 pages.
Sterling, "Welcome to the Era of Plant-Based Meat," Food & Wine, Apr. 13, 2016, Retrieved Apr. 20, 2016, <http://www.foodandwine.com/blogs/welcome-era-plant-based-meat>, 3 pages.
"Veggie burgers that look, taste, and bleed like real meat," CBS News, Aug. 9, 2016, retrieved Aug. 25, 2016 <http://www.cbsnews.com/news/food-trend-veggie-burgers-that-look-bleed-taste-like-real-meat/>, 4 pages.
"Watch Momofuku Cook Impossible Foods' Plant-Based Burger that 'Bleeds'," Vice, Jul. 27, 2016, retrieved Aug. 25, 2016, <https://munchies.vice.com/en/videos/watch-momofuku-cook-impossible-foods-plant-based-burger-that-bleeds>, 3 pages.
Belitz et al., "Aroma Compounds," Food Chemistry, Springer 2009, pp. 340-402.
Belitz et al., Food Chemistry, 3rd revised edition. Springer-Verlag, Berlin (2006), p. 368.
Brewer, "The Chemistry of Beef Flavor," Dec. 2006, retrieved on Aug. 30, 2016, <http://beefresearch.org/CMDocs/BeefResearch/The%20Chemistry%20of%20Beef%20Flavor.pdf>.
Brooks et al., "Prediction of beef flavor by precursor and volatile compounds Principal Investigators: Funded by the Beef Checkoff," Texas Tech University, May 31, 2012, retrieved Aug. 30, 2016, <http://www.beefresearch.org/CMDocs/BeefResearch/PE_Project_Summaries_FY11Prediction_of_beef_flavor.pdf>.
Bunge et al., "Quest Heats up for Alternatives to Beef," The Wall Street Journal, Business News, Nov. 4, 2016, p. B5.
Burdock, "Fenaroli's handbook of flavor ingredients," CRC press, 17 pages (2016).
Cadwallader and Macleod, "16 Instrumental methods for analyzing the flavor of muscle foods," Flavor of Meat, Meat Products and Seafoods, 18 pages (1998).
Calkins et al., "A fresh look at meat flavor," Meat Science, 77(1):63-80 (2007).
Chamlee, "Why Do People Want Veggie Burgers That Bleed?," Eater, Jul. 25, 2016, retrieved Aug. 25, 2016, <http://www.eater.com/2016/7/25/12270698/lab-grown-meat-beyond-burger-impossible-foods>, 11 pages.
Chaudhari et al., "The cell biology of taste," 190(3):285-296 (Aug. 2010).
Chen et al., "Effect of Urea on Volatile Generation from Maillard Reaction of Cysteine and Ribose,". J. Agric. Food Chem., 48:3512-3516 (2000).

(56) References Cited

OTHER PUBLICATIONS

Chen et al., "Influence of DNA on Volatile Generation from Maillard Reaction of Cysteine and Ribose," Nutraceutical Beverages, American Chemical Society, pp. 427-442 (Dec. 2003).
Dai, "David Chang Adds Plant Based 'Impossible Burger' to Nishi Menu," Jul. 26, 2016, retrieved Jul. 27, 2016 <http://ny.eater.com/2016/7/26/12277310/david-chang-impossible-burger-nishi>, 6 pages.
D'Onfro, "I tried the plant-based meat that Google wanted to buy and I never want to eat a 'real' hamburger again" Business Insider, Jun. 12, 2016, retrieved Jun. 14, 2016, <http://www.businessinsider.com/impossible-burgers-taste-test-2016-6>, 14 pages.
Donnelly, "Meet the Impossible Burger: It Looks and Tastes Like the Real Thing But Is Totally Meat-Free," Vogue, Aug. 1, 2016, retrieved Aug. 25, 2016 <http://www.vogue.com/13462891/impossible-burger-meat-free-vegan-david-chang/>, 6 pages.
Elmore et al., "Effect of the Polyunsaturated Fatty Acid Composition of Beef Muscle on the Profile of Aroma Volatiles," J. Agric. Food Chem. 47:1619-1625 (1999).
Etienne, "Eating the plant-derived Impossible Burger cooked by Momofuku's David Chang," Tech Crunch, Jul. 26, 2016, retrieved Aug. 25, 2016, <https://techcrunch.com/2016/07/26/eating-the-plant-derived-impossible-burger-cooked-by-momofukus-david-chang/>, 9 pages.
European Search Report for International Application No. EP 14737766, dated Jul. 15, 2016, 11 pages.
Gilbert et al., "The revolutionary meatless burger from Impossible Foods is perfect for vegetarians and carnivores alike," Tech Insider, Aug. 4, 2016, retrieved on Aug. 25, 2016, <http://www.techinsider.io/the-impossible-foods-burger-review-vegetarian-2016-8>, 9 pages.
Grigorakis et al., "Organoleptic and volatile aroma compounds comparison of wild and cultured gilthead sea bream (*Sparus aurata*): sensory differences and possible chemical basis," Aquaculture 225:109-119 (2003).
Grobart, "Making a Steak Without a Cow," Bloomberg Technology, Jun. 21, 2016, retrieved Jun. 23, 2016 <http://www.bloomberg.com/news/articles/2016-06-21/making-a-steak-without-the-cow>, 2 pages.
Grosch, "Evaluation of the Key Odorants of Food by Dilution Experiments, Aroma Models and Omission," Chem. Senses 26:533-545 (Jun. 2001).
Hannah, "A fermented feast," Bittersweet, retrieved on Nov. 3, 2016, retrieved from <https://bittersweetblog.com/2010/06/09/a-fermented-feast/>, 2 pages.
Herper, "Mission Impossible Burger: Tasting the Fake Meat That Wants to Save the World," Forbes, Jul. 28, 2016, retrieved on Aug. 25, 2016, <http://www.forbes.com/sites/matthewherper/2016/07/28/mission-impossible-burger-tasting-the-fake-meat-that-wants-to-save-the-world/#57781d823c43>, 6 pages.
Hoshaw, "Silicon Valley's Bloody Plant Burger Smells, Tastes and Sizzles Like Meat" the salt, Jun. 21, 2016, retrieved Jun. 21, 2016 <http://www.npr.org/sections/thesalt/2016/06/21/482322571/silicon-valley-s-bloody-plant-burger-smells-tastes-and-sizzles-like-meat>, 8 pages.
Hui et al., "Handbook of meat and meat processing," CRC Press, 2012, retrieved on Dec. 5, 2016, retrieved from <https://www.crcpress.com/Handbook-of-Meat-and-Meat-Processing-Second-Edition/Hui/p/book/9781439836835>, 3 pages.
Jublot et al., "Quantitation of sulphur aroma compounds in maillard model reaction systems of different composition," Expression of Multidisciplinary Flavour Science, 4 pages (2010).
Karahadian et al., "Action of Tocopherol-Type Compounds in Directing Reactions Forming Flavor Compounds in Autoxidizing Fish Oils," J. Amer. Oil Chem. Soc., 66:1302-8 (1989).
Kerscher et al., "Quantification of 2-Methyl-3-furnathiol, 2-Furfurylthiol, 3-Mercapto-2-pentanone in Heated Meat," J. Agric. Food Chem. 46:1954-1958 (1996).
Kerth and Miller, "Beef flavor: a review from chemistry to consumer," White Paper: Product Quality, Texas A&M University Dept of Animal Sciences, 25 pages (2013).

Khan et al., "Meat flavor precursors and factors influencing flavor precursors—A systematic review," Meat Science, 110:278-284 (Dec. 2010).
Lane et al., "The Variety of Odors Produced in Maillard Model Systems and How They are Influenced by Reaction Conditions," The Maillard Reaction in Foods and Nutrition, American Chemical Society, pp. 141-158 (Apr. 1983).
Leduc et al., "Differentiation of fresh and frozen/thawed fish, European sea bass (*Dicentrarchus labrax*), gilthead seabream (*Sparus aurata*), cod (*Gadus morhua*) and salmon (*Salmo salar*), using volatile compounds by SPME/GC/MS," J. Sci. Food Agric., 92:2560-80 (2012).
Lopez, "We just tried the 'Impossible Burger'—the meatless burger NYC has been waiting for," Business Insider, Jul. 27, 2016, retrieved on Aug. 25, 2016, <http://www.businessinsider.com/what-the-impossible-burger-tastes-like-2016-7>, 5 pages.
Marshall et al., "We Tried the "Bleeding" Vegetarian Burger and It Was Actually Good," Jul. 27, 2016, retrieved Jul. 28, 2016 <https://www.buzzfeed.com/chelseamarshall/bleeding-vegetable-burger?utm_term=.jaa03Kyo7#.ogV0m7MAW>, 10 pages.
McGorrin, "Advances in Daily Flavor Chemistry," FoodFlavors and Chemistry: Advances of the New Millennium, Spanier, A. M.; Shahidi,F.; Parliment, T. H.; Mussinan, C. J.; Ho, C.-T.; Contis,. E. T., Eds., RoyalSociety of Chemistry, Cambridge, pp. 67-84 (2001).
McGorrin, "Character-impact flavor and off-flavor compounds in foods," Flavor, Fragrance, and Odor Analysis, 2nd, 207-262 (2012).
McGorrin, "The significance of volatile sulfur compounds in food flavors," Volatile sulfur compounds in food 1068, 29 pages (2011).
Moon et al., "Odour-active components of simulated beef flavour analyzed by solid phase microextraction and gas chromatography-mass spectrometry and -olfactometry," Food Research International, 39:294-308 (Apr. 2006).
Morita, "Comparison of aroma characteristics of 16 fish species by sensory evaluation and gas chromatographic analysis," J. Sci. Food Agric., 83:289-297 (2003).
Mottram et al., "Formation of Suffer Aroma Compounds in Reaction Mixtures Containing Cysteine and Three Different Forms of Ribose," J. Agric. Food Chem., 50:4080-4086 (2002).
Mottram, "Flavour formation in meat and meat products: a review," Food Chemistry, 62(4):415-24 (Aug. 1998).
Mottram,"An Overview of the Contribution of Sulfur-Containing Compounds to the Aroma in Heated Foods," Heteroatomic Aroma Compounds, American Chemical Society, pp. 73-92 (Aug. 2002).
Proulx, "Diversified strategies for improving iron bioavailability of maize," Iowa State University—Retrospective Theses and Dissertations, 2007 retrieved on Sep. 19, 2016, retrieved from <http://lib.dr.iastate.edu/rtd/15852/>, 144 pages.
Ramos et al., "What is Masa?—Ingredient Intelligence," The Kitchn, retrieved on Dec. 1, 2016, http://www.thekitchn.com/whats-the-difference-between-masa-and-masa-harina-226434, 5 pages.
Richins et al., "Effect of Iron Source on Color and Appearance of Micronutrient-Fortified Corn Flour Toritallas," Cereal Chem., 85:561-5 (2008).
Rochet and Chaintreau, "Carbonyl Odorants Contributing to the In-Oven Roast Beef Top Note," J. Agric. Food Chem., 53:9578-9585 (Nov. 2005).
Rowe, "Chemistry and technology of flavors and fragrances," Oxford:: Blackwell; 2005, 351 pages.
Schieberle et al., "Characterization of Key Odorants in Dry-Heated Cysteine-Carbohydrate Mixtures: Comparison with Aqueous Reaction Systems," Flavor Analysis, American Chemical Society, pp. 320-330 (Sep. 1998).
Segner, "Meatless burger made possible with local effort," Jul. 29, 2016, retrieved Aug. 1, 2016 <http://www.southernminn com/owatonna_peoples_press/news/article_3d414149-1040-534d-blaf-bf4f8c486788.html>, 5 pages.
Selli et al., "Odour-active and off-odour components in rainbow trout (*Oncorhynchus mykiss*) extracts obtained by microwave assisted distillation-solvent extraction," Food Chemistry, 114:317-322 (2009).
Shahidi et al., "Meat flavor volatiles: a review of the composition, techniques of analysis, and sensory evaluation," CRC Critical Reviews in Food Science and Nutrition, 24(2):141-243 (Jan. 1986).

(56) References Cited

OTHER PUBLICATIONS

Shi et al., "Identification of characteristic flavour precursors from enzymatic hydrolysis-mild thermal oxidation tallow by descriptive sensory analysis and gas chromatography-olfactometry and partial least squares regression," Journal of Chromatography B, 913-914:96-76 (Jan. 2013).

Shu et al., "Parameter Effects on the Thermal Reaction of Cystine and 2,5-Dimethyl-4-hydroxy-3(2H)-furanone," Thermal Generation of Aromas, American Chemical Society, pp. 229-241 (Oct. 1989).

Soller, "The Impossible Burger is Ready for Its (Meatless) Close-Up," The Wall Street Journal, Jun. 14, 2016, retrieved Jun. 21, 2016 <http://www.wsj.com/articles/the-impossible-burger-is-ready-for-its-meatless-close-up-1465912323>, 8 pages.

Song, et al., "Contribution of oxidized tallow to aroma characteristics of beeflike process flavour assessed by gas chromatography-mass spectrometry and partial least squares regression," Journal of Chromatography A, 1254:115-124 (Sep. 2012).

Supplementary Partial European Search Report in European Application No. 14738061 dated Nov. 7, 2016, 11 pages.

Swanson, "Patenting the Quest for a More Perfect Veggie Burger," JDSUPRA Business Advisor, Jun. 21, 2016, retrieved Jun. 23, 2016 <http://www.jdsupra.com/legalnews/patenting-the-quest-for-a-more-perfect-72212/>. 13 pages.

Tang et al., "Flavor chemistry of 2-methyl-3-furanthiol, an intense meaty aroma compound," Journal of Sulfur Chemistry, 11 pages, (2012).

The Good Scents Company, "The Good Scents Company Information System," 2015, retrieved on Dec. 1, 2016, http://www.thegoodscentscompany.com/, 2 pages.

Tressl et al., "Formation of Amino Acid Specific Maillard Products and Their Contribution to Thermally Generated Aromas," Thermal Generation of Aromas, American Chemical Society, pp. 156-171 (Oct. 1989).

Uauy et al., "Iron Fortification of Foods: Overcoming Technical and Practical Barriers," J. Nutr. 132:849S-852S (2002).

Withycombe et al., "Identification of 2-Methyl-3-Furanthiol in the Steam Distillate from Canned Tuna Fish," Journal of Food Science, 53(2):658-660 (1988).

Yancey et al., "Effects of total iron, myoglobin, hemoglobin, and lipid oxidation of uncooked muscles on livery flavor development and volatiles of cooked beef steaks," Meat Science, 73:680-686 (2006).

Asgar et al., "Nonmeat protein alternatives as meat extenders and meat analogs," Comprehensive Reviews in Food Science and Food Safety, 2010, 9:513-529.

Clare et al., "Effects of transglutaminase catalysis on the functional and immunoglobulin binding properties of peanut flour dispersions containing casein," J. Agric. Food Chem., 2008, 56(22):10913-10921.

Heller, "Barbecued Soybeans," Vegetarian Soybean Recipes, Mother Earth News, Jan./Feb. 1985, http://motherearthnews.com/real-food/vegetarian-soybean-recipes-zmaz85asie.aspx.

Aubrey, "Food for thought: saving the planet, one burger at a time: this juicy patty is meat-free," The Salt, Feb. 11, 2017, retrieved on Feb. 14, 2017, retrieved from <http://www.npr.org/sections/thesalt/2017/02/11/514544431/saving-the-planet-one-burger-at-a-time-this-juicy-patty-is-meat-free>, 14 pages.

Australian Patent Examination Report No. 1 in Australian Application No. 2012281064, dated Jan. 25, 2016, 5 pages.

Australian Patent Examination Report No. 1 in Australian Application No. 2012281069, dated Sep. 25, 2015, 5 pages.

Cerny et al., "Formation of Aroma Compounds from Ribose and Cysteine during the Maillard Reaction," J. Agric. Food Chem., 2003, 51, pp. 2714-2721.

Chau, "Uncanny Patty," The Ringer, Feb. 27, 2017, retrieved on Feb. 28, 2017, retrieved from <https://theringer.com/impossible-burger-last-meal-on-earth-week-food-f9f14acdb99d#.vocb2hi6e>, 19 pages.

Fang et al., "Food Nutrition health theory and technology," China light industry press, p. 448, Jan. 31, 1997 (English translation).

Field et al., "Heme Pigment Content of Bovine Hemopoietic Marrow and Muscle," J. Food Sci., 45:1109-1112, 1980.

Fourth Chinese Office Action in Chinese Application No. 201280041713.1, dated Nov. 11, 2016, 18 pages (with translation).

Griffiths, "XCIII. The Action of Gastric Juice on Beef Muscle-Globulin, With References to Anaemia," Biochemistry Journal, 28:671-675 (1934).

International Search Report and Written Opinion in International Application No. PCT/US2015/023679, dated Aug. 28, 2015, 26 pages.

Koutsidis et al., "Water-soluble precursors of beef flavor: I. Effect of diet and breed," Meat Science, 79:124-130, 2008.

Lombardi et al., "Total heme and non-heme iron in raw and cooked meats," Journal of Food Science, 67(5):1738-1741 (2002).

Shimbayashi et al., "Free Amino Acids and Phosphorylethanolamine in Milk Whey of Cow" Agr. Biol. Chem, 29(1):13-19, 1965.

Spence et al., "Multisensory Flavor Perception," Cell 161: 24-35 (2015).

Supplemental European Search Report for International No. EP 14737909.3, dated Oct. 7, 2016, 10 pages.

Tong et al. ,"Blood Composition of Different Beef Breed Types" Can. J. Anim. Sci, 66:915-924 (Dec. 1986).

Zhengnong et al., "Cihai biological fascicle," Shanghai Lexicographical Publishing House, p. 243, Dec. 31, 1987 (English translation).

Naike, "Food Flavor Chemistry," 1st Edition China Light Industry Press, pp. 236-243 (1996) (English Translation).

Office Action in Chinese Application No. 201480014349.9, dated Jul. 24, 2017, 52 pages (English Translation).

Office Action in Chinese Application No. 201280041713.1, dated Jul. 13, 2017, 28 pages (English Translation).

Office Action in Chinese Application No. 201480013778.4, dated Aug. 8, 2017, 24 pages (English Translation).

Xiaoling, "Practical technology and quality management of deep processing of meat products," China Textile & Apparel Press, pp. 9 and 10 (English Translation), 10 pages.

Agyare et al., "Emulsifying and foaming properties of transglutaminase-treated wheat gluten hydrolysate as influenced by pH, temperature and salt," Food Hydrocolloids, 23:72-81 (2009).

Bastide et al., "Heme iron from meat and risk of coloretctal cancer: a meta-analysis and a review of the mechanisms involved," Cancer Prevention Research, 4:177-184 (2011).

Dufosse et al., "Importance of lactones in food flavours," Sciences Des Aliments, 14:17-25 (1994).

Elise, "Classic meatloaf recipe," Simply Recipes, available at http://www.simplyrecipes.com/recipes/classic_meatloaf/, 11 pages (2009).

GenBank Accession No. AAA02168.1, 1 page (1993).

Mercola, "Controversy over fake meat burger," available at https://articles.mercola.com/sites/articles/archive/2017/08/21/impossible-burger-meat-substitute.aspx, 9 pages (2011).

Office Action in Japanese Patent Application No. 2015552870, dated Dec. 5, 2017, 8 pages (English Translation).

Office Action in Russian Patent Application No. 2014104812, dated May 23, 2017, 8 pages (English Translation).

PancakeNinja, "Beef and chicken cheese burgers," available at http://pancake-ninja.blogspot.com/2011/06/beef-and-chicken-cheese-burgers.html, 8 pages (2011).

Ramsay, "Truffled cream cheese," available at https://www.thetimes.co.uk/articlettruffled-cream-cheese-tc9559whh65, (2007).

Supplementary European Search Report in European Application No. 15774164, dated Oct. 27, 2017, 11 pages.

Supplementary European Search Report in European Application No. 15752705, dated Sep. 29, 2017, 10 pages.

Topunov et al., "Hemoglobins: evolution, abundance, and heterogeneity," Uspekhi Biologicheskoi Khimii, 41:207, 1 page (2001) (partial translation).

Walter et al, "Effect of bovine-hemoglobin-fortified cookies on iron status of schoolchildren: a nationwide program in Child," Am J Clin Nutr, 57:190-194 (1993).

(56) References Cited

OTHER PUBLICATIONS

Yokoyama et al., "Properties and applications of microbial translutaminase," Appl Microbiol. Biotechnol, 64:447-454 (2004).

Baohua, "Animal products processing," China Agricultural Science and Technology Press, 2008, pp. 222-224, English translation.

Brown et al., "The structure and function of mammalian and plant globins," International Review of Scientific Synthesis, Sep. 2013, 2014, 21 pages.

Fengyi et al., "Soybean protein production and application," China Light Industry Press, 2004, pp. 275-277, English translation.

Biede, et al., "Swiss cheese flavor: I. chemical analysis," Journal of Dairy Science, 1979, 62:227-237.

Friedman and Brandon, "Nutritional and health benefits of soy proteins," J. Agric. Food Chem., 2001, 49(3):1069-1086.

Singh, et al., "Functional and edible uses of soy protein products," Comp. Rev. Food Sci. Food Safety, 2008, 7:14-28.

Young and Pellett, "Plant proteins in relation to human protein and amino acid nutrition," Am. J. Clin. Nutr., 1994, 59(Suppl):1203S-1212S.

Abou El-Ella, "Hard cheese substitute from soy milk," Journal of Food Science, Wiley-Blackwell Publishing, Inc., US, vol. 45, No. 6, Jan. 1, 1980.

Cao Jian et al., "Food Enzymology," Zhengzhou University Press, pp. 311-313, Feb. 2011.

Derwent, "Cheese-like, soybean-fermented foodstuff prodn.—by inoculating soybean milk with lactic acid bacteria and protein decomposing yeast," 1979.

Extended European Search Report in Application No. 18203176.5, dated May 31, 2019.

Hofmann et al., "Lactic Fermentation of Ground Soybean for Use in Imitation Cream Cheese Products," Journal of Food Science, vol. 50, No. 2, pp. 325-329, 1985.

International Preliminary Report on Patentability in International Application No. PCT/US2012/46552, dated Jan. 23, 2014, 9 pages.

International Search Report and Written Opinion in International Application No. PCT/US2012/46552, dated Nov. 19, 2012, 12 pages.

Jiang Jie et al., "Soybean Deep Processing Technology," China Light Industry Press, pp. 137-140, Jul. 31, 2004.

Mintel, [Online], "Greek Style Cultured Almond Milk Yogurt," retrieved from www.gnpd.com, Nov. 2012 Database accession No. 1943001, 5 pages.

Campbell, et al., "The effect of starter culture and annatto on the flavor and functionality of whey protein concentrate," J. Dairy Sci., 2011, 94:1185-1193.

\* cited by examiner

```
                          SEQUENCE LISTING

<160> NUMBER OF SEQ ID NOS: 8

<210> SEQ ID NO 1
<211> LENGTH: 25
<212> TYPE: DNA
<213> ORGANISM: Artificial Sequence
<220> FEATURE:
<223> OTHER INFORMATION: synthetically generated oligonucleotides

<400> SEQUENCE: 1
tatgaaagga acttatctta aagtt                                           25

<210> SEQ ID NO 2
<211> LENGTH: 25
<212> TYPE: DNA
<213> ORGANISM: Artificial Sequence
<220> FEATURE:
<223> OTHER INFORMATION: synthetically generated oligonucleotides

<400> SEQUENCE: 2
attttcaatc tccatttttt agagt                                           25

<210> SEQ ID NO 3
<211> LENGTH: 25
<212> TYPE: DNA
<213> ORGANISM: Artificial Sequence
<220> FEATURE:
<223> OTHER INFORMATION: synthetically generated oligonucleotides

<400> SEQUENCE: 3
attcttgatt tcaaaaaacc tgatt                                           25

<210> SEQ ID NO 4
<211> LENGTH: 25
<212> TYPE: DNA
<213> ORGANISM: Artificial Sequence
<220> FEATURE:
<223> OTHER INFORMATION: synthetically generated oligonucleotides

<400> SEQUENCE: 4
aaattgattg aagtcggtca aaagt                                           25

<210> SEQ ID NO 5
<211> LENGTH: 23
<212> TYPE: DNA
<213> ORGANISM: Artificial Sequence
<220> FEATURE:
<223> OTHER INFORMATION: synthetically generated oligonucleotides

<400> SEQUENCE: 5
caaagttctt tgacattatg ttg                                             23

<210> SEQ ID NO 6
<211> LENGTH: 25
<212> TYPE: DNA
<213> ORGANISM: Artificial Sequence
<220> FEATURE:
<223> OTHER INFORMATION: synthetically generated oligonucleotides
```

```
<400> SEQUENCE: 6
ctaatgatga tttagatatg atgac                                              25

<210> SEQ ID NO 7
<211> LENGTH: 22
<212> TYPE: DNA
<213> ORGANISM: Artificial Sequence
<220> FEATURE:
<223> OTHER INFORMATION: synthetically generated oligonucleotides

<400> SEQUENCE: 7
ccagactcct acgggaggca gc                                                 22

<210> SEQ ID NO 8
<211> LENGTH: 23
<212> TYPE: DNA
<213> ORGANISM: Artificial Sequence
<220> FEATURE:
<223> OTHER INFORMATION: synthetically generated oligonucleotides

<400> SEQUENCE: 8
cttgtgcggg cccccgtcaa ttc                                                23
```

METHODS AND COMPOSITIONS FOR CONSUMABLES

CROSS-REFERENCE TO RELATED APPLICATIONS

This application is a continuation of PCT/US2014/011362, filed Jan. 13, 2014, which claims priority from U.S. Provisional Application Ser. No. 61/751,818, filed Jan. 11, 2013, and is related to co-pending PCT/US12/46552, filed Jul. 12, 2012, all of which are incorporated herein by reference

BACKGROUND OF THE INVENTION

Cheese making has relied on dairy milks as the major ingredient for more than 4000 years. Dairy cheese is usually made from curds formed from dairy milk. Dairy milks can readily be made to form curds suitable for making cheese by contacting the dairy milk with rennet (an aspartic protease which cleaves kappa-casein) at mildly acidic pH. Some cheeses, e.g., cream cheese, cottage cheese and paneer, are made without rennet. In the absence of rennet, dairy cheese may be induced to curdle with acid (e.g., lemon juice, vinegar, etc.) or a combination of heat and acid. Acid coagulation can also occur naturally from starter culture fermentation. The strength of the curds depends on the type of coagulation. Most commercially produced cheeses use some type of rennet (animal, vegetable or microbial-derived) in their production. Commodity cheeses or "processed cheeses" such as bulk cheddar, food-service mozzarella pizza and "cheese products," or "cheese foods" such as American cheese, American singles, Velveeta, and Cheese Whiz are typically produced from dairy-derived ingredients and other additives using industrial processes which sometimes little resemble traditional cheese making.

The global dairy sector contributes an estimated 4 percent to the total global anthropogenic green house gas emissions. Producing 1 kg of cheddar cheese requires an average of 10,000 L of fresh water. Additionally, many individuals cannot digest and metabolize lactose. In these individuals enteric bacteria ferment the lactose, resulting in various abdominal symptoms, which can include abdominal pain, bloating, flatulence, diarrhea, nausea, and acid reflux. Additionally, the presence of lactose and its fermentation products raises the osmotic pressure of the colon contents. Approximately 3.4% of children in the U.S.A. are reported to have allergies to dairy milks. Many individuals choose to avoid milk for ethical or religious reasons.

Non-dairy milks, including plant-derived milks avoid many of the environmental, food sensitivity, ethical and religious problems associated with dairy milk and they can be made free of lactose, making the generation of dairy substitutes using the plant derived milks attractive. However, rennet is not an effective agent for inducing non-dairy proteins or emulsions, including plant-derived milks (e.g., almond milk, chestnut milk, pecan milk, hazelnut milk, cashew milk, pine nut milk, or walnut milk), to curdle. Consequently, traditional cheese making techniques have not been successfully used to produce non-dairy cheese replicas.

Flavor and aroma in dairy cheese results in part from the degradation of lactose, proteins and fats, carried out by ripening agents, which include bacteria and enzymes in the milk, bacterial cultures added during the cheese-making process, rennet, other proteases, lipases, added molds and/or yeasts and bacteria and fungi that opportunistically colonize the cheese during ripening and aging. In addition, the bacterial cultures and fungi used in traditional dairy cheesemaking use microorganisms adapted to growing and producing flavors in dairy milks. Hence, traditional cheese culturing techniques have not been successfully used to produce non-dairy cheese replicas.

Cheese replicas made principally of non-dairy ingredients are commercially available. Many of these cheese replicas include some dairy ingredients, for example, casein. Some commercially available cheese replicas contain no animal products. These include fermented cheese replicas made from nut milks from which insoluble carbohydrates have not been effectively removed, and made without using a protein crosslinking agent and several products in which a starch is a principal ingredient or containing agar, carrageenan or tofu to provide the desired texture. The few fermented products contain *Lactobacillus acidophilus*, a microbe often used in dairy yogurts. Most tasters consider none of the currently available cheese replicas to adequately replicate the taste, aroma and mouthfeel of dairy cheeses.

Complex carbohydrates in currently available cheese replicas made from nut milks have unfavorable effects on the texture, resulting in a product with a grainy mouthfeel and lacking the creaminess of dairy cheeses.

Starches that comprise the major gelling agent in many currently available cheese replicas lead to a relatively high carbohydrate content, which may be undesirable to consumers, for example those wishing to limit carbohydrate intake.

Because of these deficiencies, there is currently no cheese replica that is acceptable to most consumers as an alternative to traditional dairy cheeses.

Thus, it is clear that there is a great need in the art for an improved method and system for producing non-dairy cheese replicas while avoiding the shortcomings and drawbacks of the cheese replicas that have previously been available to consumers.

SUMMARY OF THE INVENTION

The invention relates to methods and compositions for producing non-dairy milk and cheese products, including without limitation, plant-derived milk and cheese products, as an alternative to dairy products for human consumption.

In one aspect, this document features a non-dairy cheese replica that includes a coacervate comprising one or more isolated and purified proteins from a non-animal source. The one or more isolated and purified proteins can be plant proteins (e.g., seed storage proteins, pea proteins, Lupine proteins, proteins from a legume, chickpea proteins, or lentil proteins. The pea proteins can include pea vicilins and/or pea legumins. The non-dairy cheese replica can include one or more microbes selected from bacteria, molds, and yeast.

This document also features a non-dairy cheese replica that includes a cold set gel comprising one or more isolated and purified proteins from a non-animal source and a salt. The non-dairy cheese replica can include one or more heat-labile ingredients such as one or more fats, microbes, volatile compounds, or enzymes. The non-dairy cheese replica can include one or more microbes selected from bacteria, molds, and yeast.

The one or more microbes in the non-dairy cheese replicas can be selected from the group consisting of a *Penicillium* species, a *Debaryomyces* species, a *Geotrichum* species, a *Corynebacterium* species, a *Streptococcus* species, a *Verticillium* species, a *Kluyveromyces* species, a *Saccharomyces* species, a *Candida* species, a *Rhodosporidum* species, a *Cornybacteria* species, a *Micrococcus* species, a *Lacto-* bacillus species, a *Lactococcus* species, a *Staphylococcus* species, a *Halomonas* species, a *Brevibacterium* species, a *Psychrobacter* species, a *Leuconostocaceae* species, a *Pediococcus* species, a *Propionibacterium* species, and a lactic acid bacterium.

In some embodiments, the one or more microbes are selected from the group consisting of *Lactococcus lactis lactis* (LLL), *Leuconostoc mesenteroides cremoris* (LM), *Lactococcus lactis cremoris* (LLC), *Pediococcus pentosaceus, Clostridium butyricum, Lactobacillus delbrueckii lactis, Lactobacillus delbrueckii bulgaricus, Lactobacillus helveticus, Lactobacillus plantarum, Lactobacillus casei, Lactobacillus rhamnosus, Staphylococcus xylosus* (SX), *Lactococcus lactis biovar diacetylactis* (LLBD), *Penicillium roqueforti, Penicillium candidum, Penicillium camemberti, Penicillium nalgiovensis Debaryomyces hansenii, Geotrichum candidum, Streptococcus thermophiles* (TA61), *Verticillium lecanii, Kluyveromyces lactis, Saccharomyces cerevisiae, Candida utilis, Rhodosporidum infirmominiatum* and *Brevibacterium linens*.

This document also features a non-dairy cheese replica comprising a solidified mixture of one or more isolated and purified proteins from a non-animal source and one or more isolated plant based lipids, said cheese replica comprising one or more microbes selected from the group consisting of *Pediococcus pentosaceus, Clostridium butyricum, Lactobacillus delbrueckii lactis, Lactobacillus delbrueckii bulgaricus, Lactobacillus helveticus, Lactobacillus plantarum, Lactobacillus casei, Lactobacillus rhamnosus, Staphylococcus xylosus*, and *Brevibacterium linens*.

In another aspect, this document features a non-dairy cheese replica that includes a solidified non-dairy milk, nut milk, and one or microbes selected from the group consisting of *Pediococcus pentosaceus, Clostridium butyricum, Lactobacillus delbrueckii lactis, Lactobacillus delbrueckii bulgaricus, Lactobacillus helveticus, Lactobacillus plantarum, Lactobacillus casei, Lactobacillus rhamnosus, Staphylococcus xylosus*, and *Brevibacterium linens*, wherein at least 85% of the insoluble solids of the non-dairy milk have been removed, wherein the non-dairy milk is a nut milk, a bean milk, or a grain milk. Such a non-dairy replica further include one of more microbes selected from the group consisting of *Penicillium roqueforti, Debaryomyces hansenii, Geotrichum candidum, Penicillium candidum, Corynebacteria, Streptococcus thermophiles, Penicillium camemberti, Penicillium nalgiovensis, Verticillium lecanii, Kluyveromyces lactis, Saccharomyces cerevisiae, Candida utilis, Rhodosporidum infirmominiatum, Cornybacteria*, a *Micrococcus* species, a *Lactobacillus* species, a *Lactococcus* species, *Lactococcus lactis lactis* (LLL), *Leuconostoc mesenteroides cremoris* (LM), *Lactococcus lactis cremoris* (LLC), a *Staphylococcus* species, a *Halomonas* species, a *Brevibacterium* sps, a *Psychrobacter* sps, a *Leuconostocaceae* sps, a *Pediococcus* species, *Leuconostoc mesenteroides, Lactococcus lactis biovar. diacetylactis* (LLBD) or a *Propionibacterium* species.

In another aspect, this document features a non-dairy cheese replica that includes an isolated and solidified non-dairy cream fraction and one or microbes selected from the group consisting of *Pediococcus pentosaceus, Clostridium butyricum, Lactobacillus delbrueckii lactis, Lactobacillus delbrueckii bulgaricus, Lactobacillus helveticus, Lactobacillus plantarum, Lactobacillus casei, Lactobacillus rhamnosus, Staphylococcus xylosus*, and *Brevibacterium linens*. Such a non-dairy replica further include one of more microbes selected from the group consisting of *Penicillium roqueforti, Debaryomyces hansenii, Geotrichum candidum, Penicillium candidum, Corynebacteria, Streptococcus thermophiles, Penicillium camemberti, Penicillium nalgiovensis, Verticillium lecanii, Kluyveromyces lactis, Saccharomyces cerevisiae, Candida utilis, Rhodosporidum infirmominiatum, Cornybacteria*, a *Micrococcus* species, a *Lactobacillus* species, a *Lactococcus* species, *Lactococcus lactis lactis* (LLL), *Leuconostoc mesenteroides cremoris* (LM), *Lactococcus lactis cremoris* (LLC), a *Staphylococcus* species, a *Halomonas* species, a *Brevibacterium* sps, a *Psychrobacter* sps, a *Leuconostocaceae* sps, a *Pediococcus* species, *Leuconostoc mesenteroides, Lactococcus lactis biovar. diacetylactis* (LLBD) or a *Propionibacterium* species.

In any of the non-dairy replicas described herein, the replica can include two of LLL, LLC, and LLBD (e.g., LLC and LLL, LLL and LLBD, or LLL, LLC, and LLBD) or can include SX and TA61. The non-dairy cheese replica further can include *Penicillium roqueforti* and *Debaryomyces hansenii*.

The one or more non-animal based proteins can be plant proteins (e.g., seed storage protein or an oil body protein). The seed storage protein can be an albumin, glycinin, conglycinin, globulin, legumin, vicilin, conalbumin, gliadin, glutelin, glutenin, hordein, prolamin, phaseolin, proteinoplast, secalin, triticeae gluten, or zein. The oil body protein can be an oleosin, a caloleosin, or a steroleosin. The plant protein can be selected from the group consisting of ribosomal proteins, actin, hexokinase, lactate dehydrogenase, fructose bisphosphate aldolase, phosphofructokinases, triose phosphate isomerases, phosphoglycerate kinases, phosphoglycerate mutases, enolases, pyruvate kinases, proteases, lipases, amylases, glycoproteins, lectins, mucins, glyceraldehyde-3-phosphate dehydrogenases, pyruvate decarboxylases, actins, translation elongation factors, histones, ribulose-1,5-bisphosphate carboxylase oxygenase (RuBisCo), ribulose-1,5-bisphosphate carboxylase oxygenase activase (RuBisCo activase), collagens, kafirin, avenin, dehydrins, hydrophilins, and natively unfolded proteins.

In any of the non-dairy replicas described herein, the replica further can include one or more sugars (e.g., sucrose, glucose, fructose, and/or maltose), one or more purified enzymes (a lipase, a protease, and/or an amylase), a melting salt (e.g., sodium citrate, trisodium pyrophosphate, sodium hexametaphosphate, disodium phosphate, or any combination thereof), a divalent cation (e.g., $Fe^{2+}$, $Mg^{2+}$, $Cu^{2+}$, or $Ca^{2+}$), an isolated amino acid (e.g., methionine, leucine, isoleucine, valine, proline, or alanine) or other additive selected from the group consisting of a food product, a yeast extract, miso, molasses, a nucleobase, an organic acid, a vitamin, a fruit extract, coconut milk, and a malt extract, one or more plant-derived lipids, one or more oils derived from an algae, fungus, or bacterium, or one or more free fatty acids. The plant-derived lipids can include corn oil, olive oil, soy oil, peanut oil, walnut oil, almond oil, sesame oil, cottonseed oil, canola oil, safflower oil, sunflower oil, flax seed oil, palm oil, palm kernel oil, palm fruit oil, coconut oil, babassu oil, shea butter, mango butter, cocoa butter, wheat germ oil, or rice bran oil (e.g., canola oil, cocoa butter, and/or coconut oil).

In any of the non-dairy cheese replicas described herein, the replica further can include a cross-linking enzyme (e.g., a transglutaminase or a lysyl oxidase).

In any of the non-dairy cheese replicas described herein, the cheese replica can have one or more of: a) increased creamy, milky, buttery, fruity, cheesy, free fatty acids, sulfury, fatty, sour, floral, or mushroom flavor or aroma notes; 2) reduced nutty, planty, beany, soy, green, vegetable, dirty, or sour flavor or aroma notes; 3) an increased creamy texture; 4) an improved melting characteristic; and 5) an increased stretching ability, relative to a corresponding cheese replica lacking the one or more microbes, sugars, divalent cations, isolated enzymes, isolated amino acids or other additive, plant-derived lipids, or combinations thereof.

For example, a cheese replica can have an increase in one or more of acetoin, diacetyl, 2,3-hexandione, or 5-hydroxy-4-octanone, or a decrease in one or more of benzaldehyde, 1-hexanol, 1-hexanal, furan, benzaldehyde or 2-methyl-2-propanol, pyrazine, or heptanal relative to a corresponding cheese replica lacking said one or more microbes, sugars, divalent cations, isolated enzymes, isolated amino acids or other additive, plant-derived lipids, or combinations thereof.

For example, the cheese replica can have an increase in methional and/or dimethyl trisulfide relative to a corresponding cheese replica lacking said one or more microbes, sugar, divalent cations, isolated enzymes, isolated amino acids or other additive, plant-derived lipids, or combinations thereof.

For example, the cheese replica can have an increase in one or more of butanoic acid, propanoic acid, hexanoic acid, octanoic acid, or decanoic acid relative to a corresponding cheese replica lacking said one or more microbes, sugars, divalent cations, isolated enzymes, isolated amino acids or other additive, plant-derived lipids, or combinations thereof.

For example, the cheese replica can have an increase in one or more of 2-heptanone, 2-undecanone, 2-nonanone, 2-butanone, 2-methyl propanoic acid, 2-methyl butanoic acid, or 3-methyl butanoic acid relative to a corresponding cheese replica lacking said one or more microbes, sugars, divalent cations, isolated enzymes, isolated amino acids or other additive, plant-derived lipids, or combinations thereof.

For example, the cheese replica can have an increase in one or more of ethyl butanoate or methyl hexanoate relative to a corresponding cheese replica lacking said one or more microbes, sugars, divalent cations, isolated enzymes, isolated amino acids or other additive, plant-derived lipids, or combinations thereof.

For example, the cheese replica can have (i) an increase in ethyl octanoate and/or 2-ethyl-1-hexanol or (ii) an increase in 2-methyl butanal and/or 3-methyl butanal relative to a corresponding cheese replica lacking said one or more microbes, sugars, divalent cations, isolated enzymes, isolated amino acids or other additive, plant-derived lipids, or combinations thereof.

For example, the cheese replica can have an increase in acetic acid relative to a corresponding cheese replica lacking the one or more microbes, sugars, divalent cations, isolated enzymes, isolated amino acids or other additive, plant-derived lipids, or combinations thereof.

For example, the cheese replica can have an increase in one or more of gamma-octalactone, delta-octalactone, gamma-nonalactone, butyrolactone, or methyl isobutyl ketone relative to a corresponding cheese replica lacking said one or more microbes, sugars, divalent cations, isolated enzymes, isolated amino acids, yeast extract, plant-derived lipids, or combinations thereof.

For example, the cheese replica can have an increase in one or more of nonanol or 1-octen-3-ol relative to a corresponding cheese replica lacking said one or more microbes, sugars, divalent cations, isolated enzymes, isolated amino acids, yeast extract, plant-derived lipids, or combinations thereof.

This document also features a method of making a non-dairy cheese replica. The method includes solidifying a mixture of one or more isolated and purified proteins from a non-animal source and one or more isolated fats, the mixture comprising one or more microbes selected from the group consisting of *Pediococcus pentosaceus, Clostridium butyricum, Lactobacillus delbrueckii lactis, Lactobacillus delbrueckii bulgaricus, Lactobacillus helveticus, Lactobacillus plantarum, Lactobacillus casei, Lactobacillus rhamnosus, Staphylococcus xylosus*, and *Brevibacterium linens*. The solidifying can include cross-linking the proteins using a transglutaminase or a lysyl oxidase, subjecting the mixture to a heat/cool cycle, forming a cold set gel, forming a coacervate comprising one or more isolated and purified proteins from a non-animal source. The method further can include adding one or more of the following: the replica further can include one or more sugars (e.g., sucrose, glucose, fructose, and/or maltose), one or more purified enzymes (a lipase, a protease, and/or an amylase), a melting salt (e.g., sodium citrate, trisodium pyrophosphate, sodium hexametaphosphate, disodium phosphate, or any combination thereof), a divalent cation (e.g., $Fe^{2+}$, $Mg^{2+}$, $Cu^{2+}$, or $Ca^{2+}$), an isolated amino acid (e.g., methionine, leucine, isoleucine, valine, proline, or alanine) or other additive selected from the group consisting of a food product, a yeast extract, miso, molasses, a nucleobase, an organic acid, a vitamin, a fruit extract, coconut milk, and a malt extract, one or more plant-derived lipids, one or more oils derived from an algae, fungus, or bacterium, or one or more free fatty acids. The method further can include aerating the mixture. The method can include incubating said mixture with one microbe for a period of time and then adding a second microbe to said mixture.

This document also features a method for making a cold set gel. The method includes denaturing a solution comprising at least one isolated and purified plant proteins under conditions wherein said isolated and purified protein does not precipitate out of said solution; optionally adding any heat-labile components to said solution of denatured protein; gelling said solution of denatured protein between 4° C. and 25° C. by increasing the ionic strength; and optionally subjecting said cold set gel to high pressure processing. The one or more isolated and purified proteins can be plant proteins (e.g., seed storage proteins, pea proteins, Lupine proteins, proteins from a legume, chickpea proteins, or lentil proteins. The pea proteins can include pea vicilins and/or pea legumins. The heat labile components can include one or more microbes. Gelling can be induced using 5 to 100 mM sodium or calcium chloride.

This document also features a method of making a coacervate. The method includes acidifying a solution of one or more isolated and purified proteins from a non-animal source to a pH between 3.5 and 5.5 (e.g., pH 4-5, wherein the solution comprises 100 mM or less of a salt; and isolating the coacervate from said solution; and optionally subjecting said coacervate to high pressure processing. The isolated and purified proteins can be plant proteins (e.g., seed storage proteins, chickpea proteins, lentil proteins, pea proteins or Lupine proteins). The pea proteins can include pea vicilins and/or pea legumins. The pea vicilins can include convicilins. The acidifying step can be done in the presence of a plant based oil.

This document also features a method of minimizing one or more undesirable odors in a composition containing plant proteins. The method includes contacting the composition with a ligand having binding affinity for lipoxygenases. The ligand can be bound to a solid substrate. The composition can be a food composition (e.g. a cheese replica)

In another aspect, this document features a method of minimizing one or more undesirable odors in a composition containing plant proteins. The method includes contacting the composition with activated carbon then removing the activated carbon from the composition. The composition can be a food composition (e.g. a cheese replica)

This document also features a method of minimizing one or more undesirable odors in a composition containing plant proteins. The method includes contacting the composition with a lipoxygenase inhibitor and/or an antioxidant. The composition can be a food composition (e.g. a cheese replica).

This document also features a method for modulating a flavor profile and/or an aroma profile of a cultured non-dairy product. The method includes adding one or more microbes to a non-dairy milk source selected from the group consisting of a nut milk, a grain milk or a bean milk and culturing the microbe-containing non-dairy milk and modulating 1) the aeration rate and/or timing of aeration during the culturing; 2) the timing of adding the microbes to the mixture; 3) the order of adding the one or more microbes; 4) the cell density of the contacted microbes prior to or after addition to the mixture; or 5) the microbial growth phase of the microbes prior to or after addition to the mixture, whereby the flavor profile and/or aroma profile of the non-dairy milk is modulated. The method further can include adding one or more sugars, divalent cations, isolated enzymes, isolated amino acids or other additives, plant-derived lipids, algal oils, or oil derived from bacteria, oil derived from fungi, or free fatty acids to the mixture during said culturing step. The method further can include solidifying the microbe containing mixture. The product can be a cheese replica, yogurt or sour cream, crème fraiche, or kefir.

This document also features a non-dairy cheese replica comprising a coacervate comprising one or more isolated proteins from a non-animal source. The one or more isolated and purified proteins can be plant proteins (e.g., seed storage proteins, pea proteins, Lupine proteins, proteins from a legume, chickpea proteins, or lentil proteins. The pea proteins can include pea vicilins and/or pea legumins.

In another aspect, this document features a non-dairy cheese replica comprising (i) a solidified mixture of one or more isolated and purified proteins from a non-animal source and one or more isolated plant based lipids or (ii) a solidified non-dairy milk, nut milk, and one or microbes; wherein the non-dairy cheese replica has a) an increased creamy texture; b) an improved melting characteristic; or an increased stretching ability.

This document also features a method of making a non-dairy cheese replica. The method includes solidifying a mixture of one or more isolated and purified proteins from a non-animal source and one or more isolated fats using high pressure processing. The mixture can include one or more microbes comprising one or more microbes selected from the group consisting of a *Penicillium* species, a *Debaryomyces* species, a *Geotrichum* species, a *Corynebacterium* species, a *Streptococcus* species, a *Verticillium* species, a *Kluyveromyces* species, a *Saccharomyces* species, a *Candida* species, a *Rhodosporidum* species, a *Cornybacteria* species, a *Micrococcus* species, a *Lactobacillus* species, a *Lactococcus* species, a *Staphylococcus* species, a *Halomonas* species, a *Brevibacterium* species, a *Psychrobacter* species, a *Leuconostocaceae* species, a *Pediococcus* species, a *Propionibacterium* species, and a lactic acid bacterium.

This document also features a ricotta cheese replica comprising a solidified nut milk, *Lactococcus lactis lactis*, and *Lactococcus lactis cremoris*. The ricotta cheese of further can include a transglutaminase. The nut milk can be made with almond milk. In some embodiments, it is made with a mixture of almond milk and macadamia nut milk. The ricotta replica has a white and creamy appearance with a buttery appearance. It can be smooth and sweet with toasted almond overtones. The ricotta cheese replica can be whipped or firm. The whipped ricotta has a smooth texture, and a higher moisture content than the firm ricotta. The whipped ricotta replica can be used as substitute for mascarpone. The firm ricotta can be used as a cottage cheese substitute.

In yet another aspect, this document features a blue cheese replica comprising a solidified nut milk, *Lactococcus lactis cremoris, Lactococcus lactis diacetylactis, Lactococcus lactis lactis; Penicillium roquetforte*, and *Debaryomyces hansenii*. The blue cheese of further can include a transglutaminase. The nut milk can include a mixture of almond milk and macadamia nut milk.

In yet another aspect, this document features a method for creating a library of isolated microbial strains for use in flavoring a non-dairy cheese replica. comprising: obtaining a starter culture comprising a heterogenous population of microbial strains; isolating one or more individual microbial strains from said heterogenous population; and determining a flavor contribution of each of said individual microbial strains to a non-dairy cheese replica.

In practicing the invention, in some embodiments the cheese replica is comprised of less than 5% complex carbohydrates.

In practicing the invention, in some embodiments the cheese replica is comprised of less than 5% polysaccharides In practicing the invention, in some embodiments the cheese exhibits smooth melting.

In some embodiments the invention provides a hard cheese replica and method of making the same. In some embodiments, a non-dairy milk is inoculated with thermophilic cultures before formation of the gel. The hard cheese replica is optionally aged.

In another aspect, the invention provides a blue cheese replica and method of making the same. In some embodiments, the blue cheese replica is prepared from a nut milk. In some embodiments, the nut milk is prepared from almonds and macadamia nuts. In some embodiments, the nut milk is a 50:50 composition of almond and macadamia milk. In some embodiments, the nut milk has 28% cream. In some embodiments, the nut milk is pasteurized. In some embodiments, the nut milk is heated, e.g., to 83±3° F. In some embodiments, microbial cultures are then added to the nut milk. In some embodiments, the microbial cultures comprise MA11 and *penicillium roquefortii*. In particular embodiments, the microbial cultures are allowed to hydrate on top of milk for about 5 minutes before they are stirred into the milk). In some embodiments, proteases or lipases are added. In some embodiments, the proteases or lipases are dissolved in water prior to adding to the milk.

In another aspect the invention provides a washed rind cheese replica and methods of making the same. In some embodiments, the washed rind cheese replica is prepared from a nut milk. In some embodiments, the nut milk is prepared from almonds and macadamia nuts. In some embodiments, the nut milk is a 50:50 composition of almond and macadamia milk. In some embodiments, the nut milk has 28% cream.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims. The word "comprising" in the claims may be replaced by "consisting essentially of" or with "consisting of," according to standard practice in patent law.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
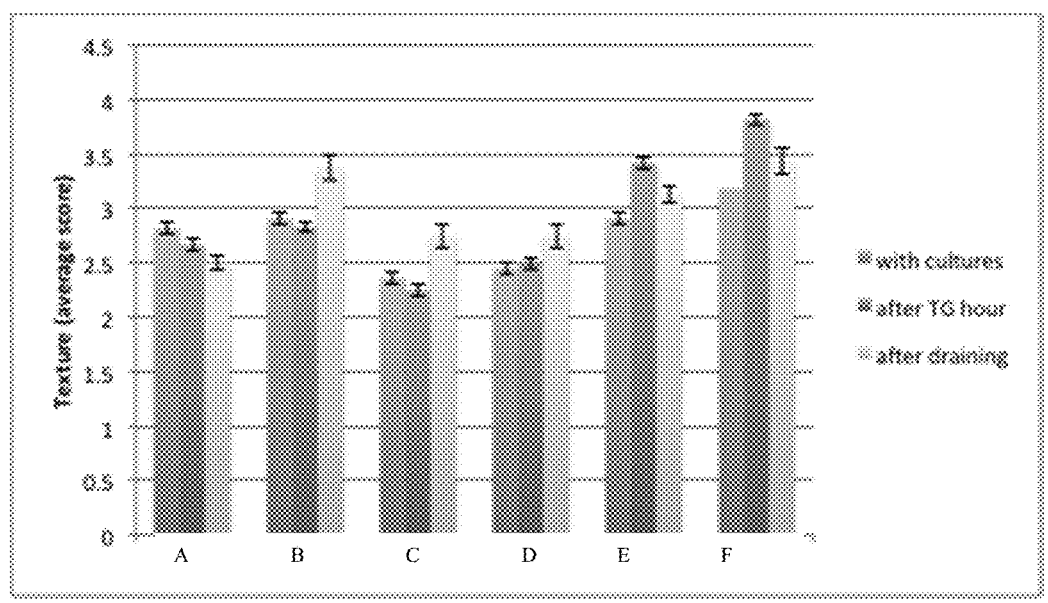
FIG. 1 is a bar graph of the average texture score of each of the soft ripened cheese replicas with the addition of proteases and lipases, as determined by the taste testers.

The present invention discloses methods and compositions for producing desired flavors and textures in cheese made from non-dairy sources. One of skill in the art will recognize that any combination of the embodiments described herein are within the scope of the invention. Broadly, the invention provides methods for making non-dairy cheeses by solidifying a non-dairy cheese source using a variety of techniques, including crosslinking, using a heat/cool cycle, forming a cold set gel, forming a coacervate, or using high pressure processing. The solidifying process can allow the separation of the crosslinked proteins and associated fats into solid curds that can be separated from the "whey," e.g., the liquid remaining after curdling. The solidified proteins can hold a fat emulsion, and have the essential physical characteristics needed for pressing, culturing and ripening a cheese replica derived from non-dairy milk.

As described herein, the texture and/or flavor of the cheese replica, as well as melting characteristic or stretchability of the cheese replica, can be modified by adding one or more specific enzymes (e.g., lipases and/or protease), sugars, proteins, amino acids, divalent cations, melting salts, yeast extract, food product, miso, molasses, nucleobases, organic acids, vitamins, fruit extracts, coconut milk, malt extracts, plant-based lipids, free fatty acids, and one or more microbes. In addition, culture parameters can be adjusted to alter the flavor, texture, melting characteristics, and strechability of a cheese replica. For example, the aeration rate and/or timing of aeration during the culturing; the timing of adding the microbes to the mixture; the order in which two or more microbes are added, e.g., together or sequentially; the relative amounts of two or more microbes; the absolute number of microbes inoculated; or the microbial growth phase of the microbes prior to or after addition to the mixture, In some embodiments, one or more specific enzymes (e.g., lipases and/or protease), sugars, proteins, amino acids, divalent cations, melting salts, yeast extract, food product, miso, molasses, nucleobases, organic acids, vitamins, fruit extracts, coconut milk, malt extracts, plant-based lipids, free fatty acids, can be used to affect emulsion stability, protein solubility, suspension stability, or ability to support growth of microbial cultures used in making cheese replicas, yogurt replicas, or other food replicas of cultured dairy products.

In various embodiments, the current invention includes cheese replicas principally, entirely or partially composed of ingredients derived from non-animal sources. In additional embodiments the present invention includes methods for making cheese replicas from non-animal sources. In various embodiments these results are achieved by replicating the curdling process of cheese making in non-dairy milks using a transglutaminase.

Definitions

The term "isolated protein" as used herein refers to a preparation in which a protein or population of proteins is substantially isolated from a source, wherein non-proteinaceous components have been substantially reduced in the preparation. Non-proteinaceous components may be reduced by a factor of 3 or more, a factor of 5 more more, or a factor of 10 or more relative to the source material from which the protein or proteins have been isolated. The population of proteins may be heterogenous, or the population of proteins may be heterogenous. A non-limiting example of an isolated protein preparation comprising a heterogenous population of proteins is soy protein isolate.

The term "isolated and purified protein" refers to a preparation in which the cumulative abundance by mass of protein components other than the specified protein, which can be a single monomeric or multimeric protein species, is reduced by a factor of 2 or more, 3 or more, 5 or more, 10 or more, 20 or more, 50 or more, 100 or more or 1000 or more relative to the source material from which the specified protein was said to be purified. For clarity, the isolated and purified protein is described as isolated and purified relative to its starting material (e.g., plants or other non-animal sources). In some embodiments, the term "isolated and purified" can indicate that the preparation of the protein is at least 60% pure, e.g., greater than 65%, 70%, 75%, 80%, 85%, 90%, 95%, or 99% pure. The fact that composition can include materials in addition to the isolated and purified protein does not change the isolated and purified nature of the protein as this definition typically applies to the protein before addition to the composition.

The term "homogeneous" can mean a single protein component comprises more than 90% by mass of the total protein constituents of a preparation.

The term "resemble" can mean one composition having characteristics recognizably similar to another composition by an ordinary human observer.

The term "indistinguishable" can mean that an ordinary human observer would not be able to differentiate two compositions based on one or more characteristics. It is possible that two compositions are indistinguishable based on one characteristic but not based on another, for example two compositions can have indistinguishable taste while having colors that are different. Indistinguishable can also mean that the product provides an equivalent function as or performs an equivalent role as the product for which it is substituting.

The term cheese "substitute" or "replica" can be any non-dairy product that can be used in any role commonly served by traditional dairy cheese. A cheese "substitute" or "replica" can be a product that shares visual, olfactory, textural or taste characteristics of cheese such that an ordinary human observer of the product is induced to think of traditional dairy cheese.

The term "controlled", "controlling", and "defined" are used interchangeably herein to refer to the manipulation of a method or components of a composition to achieve a desired characteristic or keep said desired characteristic within certain bounds defined by a user. By way of example only, a controlled fat profile refers to a fat profile wherein the fat content or content of specific fat classes (e.g., saturated or unsaturated) are kept within user-defined limits. By way of other example only, a controlled amount refers to an amount kept within certain bounds defined by a user. For instance, adding a controlled amount of bacteria may refer to adding bacterial cultures comprising a known population and/or known amount of bacterial strains. By contrast, Rejuvelac is an exemplary composition that comprises an uncontrolled amount of, e.g., bacteria. Rejuvelac is prepared by incubating a liquid containing a bacterial food source in an environment that is conducive to the growth of bacteria, but the amount of bacteria or the types of bacteria that grow in said environment is not kept to within user-defined bounds, e.g., is not controlled.

Non-Dairy Milks

In one aspect, the invention provides a non-dairy cheese source that can be used as a starting material for preparing a non-dairy cheese. The term "non-dairy cheese source" refers to an emulsion comprising proteins and fats, wherein said proteins and fats are prepared from a non-dairy source. In some embodiments, the non-dairy cheese source can be a non-dairy milk obtained from nuts or seeds. In other embodiments, one or more isolated proteins from a non-animal source as used as a non-dairy cheese source.

In some embodiments, the plant source comprises one or more nuts or seeds. In some embodiments, the plant source is a flour compounded from one or more nuts or seeds (e.g., almonds and macadamia nuts). The term "nut" generally refers to any hard-walled, edible kernel. A nut can be a composite of a hard-shelled fruit and a seed, where the hard-shelled fruit does not open to release the seed. Exemplary nuts include, but are not limited to almonds, butternut, hickory nuts, wingnuts (*Pterocarya*), beech nuts, oak nuts, filberts, hornbeam nuts, soy nuts, cashews, brazil nuts, chestnuts, coconuts, hazelnuts, macadamia nuts, mongogo (*Schinziophyton rautanenii*), peanuts, pecans, pine nuts, pistachios, or walnuts. Any large, oily kernel found within a shell and used in food may be regarded as a nut. Plant seeds can include any embryonic plant enclosed in a seed coat. Exemplary plant seeds include, e.g., legumes such as, e.g., alfalfa, clover, peas, beans, lentils, lupins, mesquite, carob, soybeans, peanuts, cereals such as, e.g., corn, rice, wheat, barley, sorghum, millet, oats, triticale, rye, buckwheat, fonio, teff, amaranth, spelt, quinoa, angiosperms (e.g., flowering plants such as, for example, sunflowers) and gymnosperms. "Gymnosperm" generally refer to plant species that produce seeds that are generally not enclosed in a nut or fruit. Exemplary gymnosperms include conifers such as, e.g., pine trees, spruce trees, and fir trees. In some embodiments, the non-dairy milk is not soy milk.

Non-dairy products or compositions include products or compositions where the constituent proteins, fats and/or small molecules can be isolated from, or secreted by, plants, bacteria, viruses, archaea, fungi, or algae. The non-dairy proteins also can be recombinantly produced using polypeptide expression techniques (e.g., heterologous expression techniques using bacterial cells, insect cells, fungal cells such as yeast cells, plant cells). In some cases, standard polypeptide synthesis techniques (e.g., liquid-phase polypeptide synthesis techniques or solid-phase polypeptide synthesis techniques) can be used to produce proteins synthetically. In some cases, in vitro transcription/translation reactions are used to produce the proteins. Non-dairy products are generally not derived from cows, goats, buffalo, sheep, horses, camels, or other mammals. In some embodiments non-dairy products do not contain dairy proteins. In some embodiments non-dairy products do not contain dairy fats.

The non-dairy milk can be made by a method comprising preparing the nuts or plant seeds with processing steps such as sterilizing, blanching, shocking, decompounding, centrifugation, or washing. The nuts or seeds can be decompounded for example, by grinding or blending or milling the nuts in a solution comprising water. Alternative methods for decompounding the nuts or dried seeds can include crushing, tumbling, crumbling, atomizing, shaving, pulverizing, grinding, milling, water eroding (for example with a water jet), or finely chopping the nuts or plant seeds. In some embodiments, the decompounding step takes place in a blender, a continuous flow grinder, or a continuous flow mill. The decompounding can be followed by a sorting, filtering, screening, air-classification, or separation step. In some embodiments the decompounded nuts or seeds can be stored prior to the formation of a non-dairy milk. The aqueous solution can be added before, during, or after the decompounding.

The nuts or seeds used in some embodiments of the invention to make non-dairy milks may have contaminants on the surface which would make a non-dairy milk unsafe or unpalatable. Accordingly the nuts or seeds can be washed or blanched prior to use. The nuts or seeds can also be sterilized to remove, reduce, or kill any contaminants on the surface of the nuts or seeds. A sterilization step can be an irradiation step, a heat step (e.g. steam sterilization, flaming, or dry heat), or a chemical sterilization (e.g., exposure to ozone). In some embodiments the sterilization step kills more than 95% or more than 99% of microbes on the nuts or seeds.

In some embodiments, the non-dairy milk is centrifuged to remove insoluble solids. The non-dairy milk can have less than 1%, 5%, 10%, 20%, 30%, 40% or 50% of insoluble solids found in the non-dairy milk before centrifugation. The non-dairy milk can have 99%, 95%, 90%, 80%, 70%, 60% or 50% of insoluble solids removed by centrifugation. Centrifugation of the non-dairy milk is described herein.

In some embodiments the non-dairy milk is pasteurized or sterilized. The pasteurization can be high-temperature, short-time (HTST), "extended shelf life" (ESL) treatment, or ultra-high temperature (UHT or ultra-heat-treated). In some embodiments the pasteurization procedure includes pasteurizing the non-dairy milk at 164° F.-167° F. for 10 to 20 seconds (e.g., 10, 12, 14, 16, 18, or 20) seconds. In some embodiments, the microbial load in the non-dairy milk is reduced by exposure to UV light or high pressure pasteurization. A controlled chilling system can be used to rapidly bring non-dairy milk temperature down rapidly and store in a refrigerator at 36° F.

In some embodiments, the non-dairy milk is a non-dairy cream fraction.

In some embodiments, the non-dairy milk is an emulsion comprising one or more isolated and purified proteins and one or more isolated fats. In some embodiments the isolated and purified proteins are contained in a protein solution. The solution can comprise EDTA (0-0.1M), NaCl (0-1M), KCl (0-1M), NaSO$_4$ (0-0.2M), potassium phosphate (0-1M), sodium citrate (0-1M), sodium carbonate (0-1M), sucrose (0-50%), Urea (0-2M) or any combination thereof. The solution can have a pH of 3 to 11. In some embodiments, the one or more isolated and purified proteins accounts for 0.1%, 0.2%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 99% or more of the protein content of said protein solution. In some embodiments, the one or more isolated and purified proteins accounts for 0.1-5%, 1-10%, 5-20%, 10-40%, 30-60%, 40-80%, 50-90%, 60-95%, or 70-100% of the protein content of said protein solution. In some embodiments, the total protein content of the protein solution is about 0.1%, 0.2%, 0.3%, 0.4%, 0.5%, 0.75%, 1%, 1.5%, 2%, 5%, 7.5%, 10%, 12.5%, 15%, 17.5%, 20%, or more than 20% weight/volume. In some embodiments, the total protein content of the protein solution is 0.1-5%, 1-10%, 5-20%, or more than 20% weight/volume. In some embodiments, the protein content of the protein solution contains 1-3 isolated and purified proteins, 2-5 isolated and purified proteins, 4-10 isolated and purified proteins, 5-20 isolated and purified proteins, or more than 20 isolated and purified proteins.

In some embodiments, the one or more isolated, purified proteins are derived from non-animal sources. In some embodiments, the non-dairy milk is isolated from a non-dairy source (e.g., a plant). Non-limiting examples of plant sources include grain crops such as, e.g., maize, oats, rice, wheat, barley, rye, triticale (a wheat rye hybrid), teff (*Eragrostis tef*); oilseed crops including cottonseed, sunflower seed, safflower seed, *Crambe*, *Camelina*, mustard, rapeseed (*Brassica napus*); leafy greens such as, e.g., lettuce, spinach, kale, collard greens, turnip greens, chard, mustard greens, dandelion greens, broccoli, or cabbage; or green matter not ordinarily consumed by humans, including biomass crops such as switchgrass (*Panicum virgatum*), *Miscanthus*, *Arundo donax*, energy cane, *Sorghum*, or other grasses, alfalfa, corn stover, kelp or other seaweeds, green matter ordinarily discarded from harvested plants, sugar cane leaves, leaves of trees, root crops such as cassava, sweet potato, potato, carrots, beets, or turnips; plants from the legume family, such as, e.g., clover, *Stylosanthes*, *Sesbania*, vetch (*Vicia*), *Arachis*, *Indigofera*, *Leucaena*, *Cyamopsis*, peas such as cowpeas, english peas, yellow peas, or green peas, or beans such as, e.g., soybeans, fava beans, lima beans, kidney beans, garbanzo beans, mung beans, pinto beans, lentils, lupins, mesquite, carob, soy, and peanuts (*Arachis hypogaea*); coconut; or *Acacia*. One of skill in the art will understand that proteins that can be isolated from any organism in the plant kingdom may be used in the present invention. In some embodiments, the plant source is not soybeans.

Proteins that are abundant in plants can be isolated in large quantities from one or more source plants and thus are an economical choice for use in any of the cheese products.

Accordingly, in some embodiments, the one or more isolated proteins comprise an abundant protein found in high levels in a plant and capable of being isolated and purified in large quantities. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, or 70% of the total protein content of the source plant. In some embodiments, the abundant protein comprises about 0.5-10%, about 5-40%, about 10-50%, about 20-60%, or about 30-70% of the total protein content of the source plant. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, or 50% of the total weight of the dry matter of the source plant. In some embodiments, the abundant protein comprises about 0.5-5%, about 1-10%, about 5-20%, about 10-30%, about 15-40%, or about 20-50% of the total weight of the dry matter of the source plant.

In particular embodiments, the one or more isolated proteins comprise an abundant protein that is found in high levels in the leaves of plants. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, or 80% of the total protein content of the leaves of the source plant. In some embodiments, the abundant protein comprises about 0.5-10%, about 5%-40%, about 10%-60%, about 20%-60%, or about 30-70% of the total protein content of the leaves of the source plant. In particular embodiments, the one or more isolated proteins comprise ribulose-1,5-bisphosphate carboxylase oxygenase (RuBisCo). RuBisCo is a particularly useful protein for cheese replicas because of its high solubility and an amino acid composition with close to the optimum proportions of essential amino acids for human nutrition. In particular embodiments, the one or more isolated proteins comprise ribulose-1,5-bisphosphate carboxylase oxygenase activase (RuBisCo activase). In particular embodiments, the one or more isolated proteins comprise a vegetative storage protein (VSP).

In some embodiments, the one or more isolated proteins comprise an abundant protein that is found in high levels in the seeds of plants. In some embodiments, the abundant protein comprises about 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85% or 90% or more of the total protein content of the seeds of the source plant. In some embodiments, the abundant protein comprises about 0.5-10%, about 5%-40%, about 10%-60%, about 20%-60%, or about 30-70% or >70% of the total protein content of the seeds of the source plant. Non-limiting examples of proteins found in high levels in the seeds of plants are seed storage proteins, e.g., albumins, glycinins, conglycinins, globulins, vicilins, convicilins, legumins, conalbumin, gliadin, glutelin, glutenin, hordein, prolamin, phaseolin (protein), proteinoplast, secalin, triticeae gluten, zein, or oil body proteins such as oleosins, caloleosins, or steroleosins.

In some embodiments, the one or more isolated proteins comprise proteins that interact with lipids and help stabilize lipids in a structure. Without wishing to be bound by a particular theory, such proteins may improve the integration of lipids and/or fat replicas with other components of the cheese product, resulting in improved mouthfeel and texture of the final product. A non-limiting example of a lipid-interacting plant protein is the oleosin family of proteins. Oleosins are lipid-interacting proteins that are found in oil bodies of plants. Other non-limiting examples of plant proteins that can stabilize emulsions include seed storage proteins from Great Northern Beans, albumins from peas, globulins from peas, 8S globulins from moong bean, and 8S globulins from kidney bean.

In some embodiments, the one or more isolated and purified proteins is selected from the group consisting of ribosomal proteins, actin, hexokinase, lactate dehydrogenase, fructose bisphosphate aldolase, phosphofructokinases, triose phosphate isomerases, phosphoglycerate kinases, phosphoglycerate mutases, enolases, pyruvate kinases, proteases, lipases, amylases, glycoproteins, lectins, mucins, glyceraldehyde-3-phosphate dehydrogenases, pyruvate decarboxylases, actins, translation elongation factors, histones, ribulose-1,5-bisphosphate carboxylase oxygenase (RuBisCo), ribulose-1,5-bisphosphate carboxylase oxygenase activase (RuBisCo activase), albumins, glycinins, conglycinins, globulins, legumins, vicilins, conalbumin, gliadin, glutelin, glutenin, hordein, prolamin, phaseolin (protein), proteinoplast, secalin, extensins, triticeae gluten, collagens, zein, kafirin, avenin, dehydrins, hydrophilins, late embyogenesis abundant proteins, natively unfolded proteins, any seed storage protein, oleosins, caloleosins, steroleosins or other oil body proteins, vegetative storage protein A, vegetative storage protein B, moong seed storage 8S globulin, pea globulins, pea albumins, or any other protease described herein.

In some embodiments, the isolated and purified proteins are concentrated using any methods known in the art. The proteins may be concentrated 2-fold, five-fold, 10-fold, or up to 100 fold. The proteins may be concentrated to a final concentration of 0.001-1%, 0.05-2%, 0.1-5%, 1-10%, 2-15%, 4-20%, or more than 20%. Exemplary methods include, e.g., ultrafiltration (or tangential flow filtration), lyphilisation, spray drying, or thin film evaporation.

The fats used in preparing the emulsion can be from a variety of sources. In some embodiments, the sources are non-animal sources (e.g., oils obtained from plants, algae, fungi such as yeast or filamentous fungi, seaweed, bacteria, Archae), including genetically engineered bacteria, algae, archaea or fungi. The oils can be hydrogenated (e.g., a hydrogenated vegetable oil) or non-hydrogenated. Non-limiting examples of plant oils include corn oil, olive oil, soy oil, peanut oil, walnut oil, almond oil, sesame oil, cottonseed oil, rapeseed oil, canola oil, safflower oil, sunflower oil, flax seed oil, palm oil, palm kernel oil, coconut oil, babassu oil, shea butter, mango butter, cocoa butter, wheat germ oil, or rice bran oil; or margarine.

In some embodiments, the fat can be triglycerides, monoglycerides, diglycerides, sphingosides, glycolipids, lecithin, lysolecithin, phospholipids such as phosphatidic acids, lysophosphatidic acids, phosphatidyl cholines, phosphatidyl inositols, phosphatidyl ethanolamines, or phosphatidyl serines; sphingolipids such as sphingomyelins or ceramides; sterols such as stigmasterol, sitosterol, campesterol, brassicasterol, sitostanol, campestanol, ergosterol, zymosterol, fecosterol, dinosterol, lanosterol, cholesterol, or episterol; free fatty acids such as palmitoleic acid, palmitic acid, myristic acid, lauric acid, myristoleic acid, caproic acid, capric acid, caprylic acid, pelargonic acid, undecanoic acid, linoleic acid (C18:2), eicosanoic acid (C22:0), arachidonic acid (C20:4), eicosapentanoic acid (C20:5), docosapentaenoic acid (C22:5), docosahexanoic acid (C22:6), erucic acid (C22:1), conjugated linoleic acid, linolenic acid (C18:3), oleic acid (C18:1), elaidic acid (trans isomer of oleic acid), trans-vaccenic acid (C18:1 trans 11), or conjugated oleic acid; or esters of such fatty acids, including monoacylglyceride esters, diacylglyceride esters, and triacylglyceride esters of such fatty acids.

The fat can comprise phospholipids, sterols or lipids. The phospholipids can comprise a plurality of amphipathic molecules comprising fatty acids (e.g., see above), glycerol and polar groups. In some embodiments, the polar groups are, for example, choline, ethanolamine, serine, phosphate, glycerol-3-phosphate, inositol or inositol phosphates. In some embodiments, the lipids are, for example, sphingolipids, ceramides, sphingomyelins, cerebrosides, gangliosides, ether lipids, plasmalogens or pegylated lipids.

In some embodiments, the fat are the cream fraction created from seeds, nuts, and legumes, including but not limited to sunflower seeds, safflower seeds, sesame seeds, rape seeds, almonds, macadamia nuts, grapefruit, lemon, orange, watermelon, pumpkin, cocoa, coconut, mango, butternut squash, cashews, brazilnuts, chestnuts, hazelnuts, peanuts, pecans, walnuts, and pistachios. Methods for preparing a cream fraction are described herein.

The addition of controlled amounts of one or more fats can result in different cheese properties, including but not limited to firmness, water retention, oil leakage, melt-ability, stretching, color, and creaminess. The fats can be in the form of unsaturated oil, saturated oil, washed cream fraction, and/or unwashed cream fraction. The unsaturated oils can include, e.g., olive oil, palm oil, soybean oil, canola oil (rapeseed oil), pumpkin seed oil, corn oil, sunflower oil, safflower oil, avocado oil, other nut oils, peanut oil, grape seed oil, sesame oil, argan oil, and rice bran oil. The saturated oils can include, e.g., coconut, palm, cocoa, cottonseed, mango oil, etc. The cream fraction can be made from, by way of example only, sunflower seeds, safflower, sesame seeds, rape seeds, almonds, macadamia, and pistachios. Preparation and isolation of cream fractions are described herein.

In some embodiments, an emulsion is prepared by isolating and purifying one or more proteins, preparing a solution comprising the one or more isolated and purified proteins, admixing said solution with one or more fats, thereby creating said emulsion. The ratio of protein solution to fats can be about 1:10, 1:5, 1:4, 1:3, 1:2, 1:1, 2:1, 3:1, 4:1, 5:1, or 10:1. The ratio of protein solution to fats can be about 10:1-1:2, 1:4-2:1, 1:1-4:1, or 2:1-10:1. The emulsion can be used as a non-dairy milk for the preparation of a non-dairy cheese. By way of example only, 0%-50% fat can be added to a protein solution by weight/weight or weight/volume.

Method of Isolating and Mixing Cream and Skim Fractions

In some embodiments, the non-dairy milk can be further separated into a cream fraction and a skim fraction. In some embodiments, defined amounts of cream fraction can be mixed with defined amounts of skim fraction to produce a non-dairy milk with a controlled fat profile. In one aspect, the invention provides a method for creating a non-dairy cheese replica with a controlled fat profile. In some embodiments, the method comprises isolating a cream and skim fraction from a non-dairy milk, and mixing a defined amount of said cream and optionally said skim fraction to produce a mixture with a controlled fat profile. In some embodiments, said isolating comprises separating a non-dairy milk into a cream and skim fraction. In some embodiments the cream fraction is enriched in fats relative to the skim fraction. The cream fraction may contain at least 50%, 55%, 60%, 65%, 70%, 75%, 80%, 85%, 90%, or 95% or more of the fat content of said non-dairy milk prior to separation. The cream fraction may comprise a fat content that is at greater than the fat content of a skim fraction. The cream fraction may comprise a fat content that is increased by 10%, 15%, 20%, 25%, 30%, 35%, 40%, 45%, 50%, 55%, 60%, 65%, 70%, 75%, 80%, 85%, 90%, 95%, 100%, or greater than 100% as compared to the skim fraction. The cream fraction may comprise a fat content that is 0.2-fold greater, 0.5-fold greater, 0.75-fold greater, 1-fold greater, 1.2-fold greater, 1.3-fold greater, 1.4-fold greater, 1.5-fold greater, 2-fold greater, 3-fold greater, 4-fold greater, 5-fold greater, 7.5-fold greater, 10-fold greater, 15-fold greater, 20-fold greater, or more than 20-fold greater than the fat content of the skim fraction.

The cream and skim fractions can, for example, be separated by gravity or by centrifugation. Centrifugation generally refers to a process of separating components in a composition using centrifugal force. The rate of centrifugation is specified by the angular velocity measured in revolutions per minute (RPM), or acceleration expressed as g. The term "g" generally refers to the acceleration produced by gravity at the Earth's surface. In some embodiments, the cream and skim fractions are separated by centrifugation at 500, 1000, 1500, 2000, 2500, 3000, 3500, 4000, 4500, 5000, 5500, 6000, 6500, 7000, 7500, 8000, 8500, 9000, 9500, or 10,000 RPM. In some embodiments, the cream and skim fraction are separated by centrifugation at about 500-2000, 1000-5000, 2000-7000, 4000-10,000, or greater than 10,000 RPM. In some embodiments, the cream and skim fractions are separated by centrifugation for about 1, 5, 10, 15, 20, 25, 30, 35, 40, 45, 50, 55, 60, or more than 60 minutes. In some embodiments, the cream and skim fractions are separated by centrifugation for 1-10, 5-30, 10-45, 30-60, or more than 60 minutes. In one embodiment, the cream and skim fractions are centrifuged in a JS-5.0 rotor at 5000 RPM for 30 mins. In some embodiments, the cream fraction and skim fraction are separated by centrifugal separation in a Flotwegg ac1500 or GEA ME55.

In some embodiments the cream fraction and the skim fraction are incompletely separated. The skim fraction and the cream fraction can be separated from the insoluble solids in a separation process. In some embodiments the skim fraction and the cream fraction are stored separately.

In some embodiments, a cream fraction can be used as a non-dairy cheese source.

In some embodiments, a protein solution can be admixed with a cream fraction to produce a non-dairy cheese source. Exemplary protein solutions are described herein.

In some embodiments, the method further comprises admixing the protein solution with a cream fraction isolated from a plant source. As used herein, the term "cream fraction" refers to an emulsion comprising fats, proteins and water that is enriched in fats as compared to an original emulsion (i.e., non-dairy milk). Exemplary cream fractions and methods of preparing the same are described herein. In some embodiments, a cream fraction is purified from a plant source, e.g., seeds, nuts, or legumes such as sunflowers, safflower, sesame seeds, rape seeds, almonds, macadamia, and pistachios. In some embodiments, the cream fraction is purified by blending seeds or nuts in water or a solution to create a slurry. Some embodiments includes blending seeds, nuts or legumes from 1 minute up to 30 minutes which could include a blending method by increasing the speed gradually to maximum speed over 4 minute, and blending at maximum speed for 1 minute. The solution can comprise EDTA (0-0.1M), NaCl (0-1M), KCl (0-1M), $NaSO_4$ (0-0.2M), potassium phosphate (0-1M), sodium citrate (0-1M), sodium carbonate (0-1M), sucrose (0-50%), urea (0-2M) or any combination thereof. The solution can have a pH of 3 to 11.

See, Example 11. The slurry can be centrifuged by any method known in the art or as described herein.

Centrifugation can result in a separation of liquid layers and an insoluble solid pellet. The top layer can be used as the cream fraction. The lower layer can be used as whey, and the pellet is removed. The cream fraction can then be used as is immediately after centrifugation, or can be further washed with the solutions described above or heated in solution. Washing and heating removes the unwanted color and flavor molecules, or unwanted grainy particles to improve the mouth feel. In particular, washing with a high pH buffer (e.g., above pH 9) can remove bitter tasting compounds and improve mouth feel, washing with urea can remove storage proteins, washing below pH 9, followed by washing with a pH above pH 9 can remove unwanted color molecules, and/or washing with salts can decrease taste compounds. Heating increases the removal of grainy particles, color and flavor compounds. Heating can be from 0-24 hours, at 25° C. to 80° C. Washing and heating can remove unwanted colors and flavor notes, and can remove unwanted grainy particles. In some embodiments, washing and heating improves mouthfeel. In some embodiments, the resulting creamy fraction comprises seed storage proteins. In some embodiments, the seed storage proteins are substantially removed from the resulting creamy fraction.

In some embodiments, a defined amount of a cream fraction and a defined amount of a skim fraction are mixed to produce a mixture. The cream and/or skim fractions can be pasteurized or not pasteurized. In some embodiments, the defined amounts are defined by a user to result in a mixture with a controlled fat profile. In some embodiments, the cream and skim fractions are mixed at a defined ratio to result in a mixture with a controlled fat profile. In some embodiments the ratio of cream layer to skim layer in the non-dairy milk is about 100:1, 90:1, 80:1, 70:1, 60:1, 50:1, 40:1, 30:1, 20:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:20, 1:30, 1:40, 1:50, or 1:60. In some embodiments the methods described herein comprise measuring the amount of skim layer and cream layer being added to a non-dairy milk.

The mixture may then be used as a non-dairy cheese source to prepare a cheese replica. It is understood that any of the non-dairy cheese sources as described herein may be used individually, or in any combination thereof, when practicing the methods described herein.

Flavoring Components/Methods

In another aspect, the invention provides methods for flavoring cultured non-dairy products, including sour cream, crème fraiche, yogurt, or cheese replicas. In some embodiments, the method comprises comparing a flavor note profile of a test non-dairy product with one or more flavor additives and/or one or more individual microbial strains described herein to a flavor note profile of a control non-dairy product without the additives and/or individual microbial strain. The texture and flavor profile of the non-dairy product (e.g. cheese replica) can be ascertained by any method known in the art or described herein. Exemplary methods of ascertaining flavor and texture can be by a taste test, e.g., a blind taste test, or using gas chromatography-mass spectrometry (GCMS).

GCMS is a method that combines the features of gas-liquid chromatography and mass spectrometry to identify different substances within a test sample. GCMS can, in some embodiments, be used to evaluate the properties of a dairy cheese and a cheese replica. For example volatile chemicals can be detected from the head space around a dairy cheese or a cheese replica. These chemicals can be identified using GCMS. A profile of the volatile chemicals in the headspace around cheese is thereby created. In some instances each peak of the GCMS can be further evaluated. For instance, a human could rate the experience of smelling the chemical responsible for a certain peak. This information could be used to further refine the profile. GCMS could then be used to evaluate the properties of the cheese replicas. The GCMS could be used to refine the cheese replica. In some embodiments the cheese replica has a GCMS profile similar to that of dairy cheese. In some embodiments the cheese replica has a GCMS profile identical to that of dairy cheese.

The flavor profile can be characterized by the presence and/or intensity of one or more flavor notes. Exemplary flavor notes include, but are not limited to butteriness, fruitiness, nuttiness, dairy, milky, chessy, fatty, fruity, pinnapple, waxy, buttery, tonka, dark fruit, citrus, sour, banana-like, sweet, bitter, musty, floral, goaty, sweaty, woody, earthly, mushroom, malty, spicy, pear, green, balsamic, pungent, oily, rose, fatty, butterscotch, orange, pine, carnation, melon, pineapple, vanilla, garlic, herbaceous, woody, cinnamon, rue, yogurt, peach, vanilla, hawthorn, and herbaceous. The flavor notes may be associated with the release of one or more volatile compounds. The flavor profile can be characterized by the absence or reduction in the intensity of one or more flavor notes. Exemplary flavor notes include: planty, beany, soy, green, vegetable, nutty, dirty, and sour.

Exemplary volatile compounds include, e.g., gamma-nonanoic lactone, gamma-undecalactone, gamma-decalactone, delta-tetradecalactone, S-methyl thiopropionate, delta-tridecalactone, delta-tetradecalactone, δ-tetradecalactone, butyl butyryllactate, 2,3-hexandione, methyl hexanoate, butyrolactone, propanoic acid, 2-methyl propanoic acid, methyl isobutyl ketone, gamma octalactone, delta octalactone, gamma nonalactone, 5-hydroxy-4-octanone, 2-ethyl-1-hexanol, octane, ethanol, 2,3-butanedione, 2 heptanone, 1-butanol, acetoin, butanoic acid, nonanal, acetic acid, 1,3 butanediol, methyl-3-buten-1-ol, methanol, hexanol, dimethyl-benzene, ethyl-benzene, indole, limonene, toluene, acetophenone, pentan-2,3-dione, 2-pentanone, 2-heptanone, 2-nonanone, acetone, butanone, 2-methylpropionic acid, butanoic acid, 2-methylbutanoic acid, 3-methylbutanoic acid, pentanoic acid, 4-methylpentanoic acid, hexanoic acid, octanoic acid, decanoic acid, undecanoic acid, dodecanoic acid, tetradecanoic acid, hexadecanoic acid, octadecanoic acid, oleic acid, linoleic acid, linolenic acid, propanol, butanol, pentanol, hexanol, heptanol, octanol, propan-2-ol, butan-2-ol, pentan-2-ol, hexan-2-ol, heptan-2-ol, nonan-2-ol, undecan-2-ol, octen-3-ol, octa-1,5-dien-3-ol, 3-methyl-2-cyclohexenol, 2-methylpropanol, 2-methylbutanol, 3-methylbutanol, 3-methylpentanol, phenylmethanol, 2-phenylethanol, 2-phenyl-ethan-2-ol, propan-2-one, butan-2-one, pentan-2-one, hexan-2-one, heptan-2-one, octan-2-one, nonan-2-one, decan-2-one, undecan-2-one, dodecan-2-one, tridecan-2-one, pentadeca-2-one, pentan-3-one, octan-3-one, 3-methylpentan-2-one, 4-methylpentan-2-one, methylhexan-2-one, hydroxypropan-2-one, hept-5-en-2-one, 4-methylpent-3-en-2-one, octen-3-one, octa-1,5-dien-3-one, nonen-2-one, undecen-2-one, methylfuryl ketone, phenylpropan-2-one, propiophenone, methyl butanoate, methyl hexanoate, methyl octanoate, methyl decanoate, methyl tetradecanoate, methyl hexadecanoate, methyl cinnamate, ethyl formate, ethyl acetate, ethyl propanoate, ethyl butanoate, ethyl hexanoate, ethyl octanoate, ethyl decanoate, ethyl dodecanoate, ethyl tetradecanoate, ethyl-3-methyl butanoate, propyl acetate, propyl butanoate, butyl formate, butyl acetate, amyl acetate, isoamyl formate, isoamyl acetate, isoamyl propanoate, isoamyl butanoate, diethyl phthalate, dimethyl phthalate, 2-phenylethyl acetate, 2-phenylethyl propanoate, 2-phenylethyl butanoate, 3-methylthiopropanol, methanethiol, hydrogen sulfide, dimethyl disulfide, dimethyl trisulfide, dimethyl tetrasulfide, methylethyl disulfide, diethyl disulfide, 2,4-dithiapentane, methional, 3-methylthio-2,4-dithiapentane, 2,4,5-trithiahexane, 1,1-bis-methylmercaptodisulfide, methanethiol acetate, methyl thiopropanoate, methyl thiobenzoate, thiophen-2-aldehyde, methylindole, p-ethylphenol, p-cresol, acetaldehyde, butanal, 2-methylbutanal, 3-methylbutanal, 2-methylpropanal, hexanal, heptanal, nonanal, 2-methylbuten-2-al, benzaldehyde, 3-methylheptyl acetate, 1-butanol, 1-butanol, 3-methyl, 1-heptanol, formic acid, 1-hexanol-2,ethyl, 1-octanol, 2-butanone, 2-hepten-1-ol, 2-hexanone, heptanal, 2-octen-1-ol, 1-octen-3-ol, 2-pentanone, 2,3-butanedione, 3-buten-1-ol, 5-Hepten-2-one, octane, ethanol, 2,3-butanedione, 2 heptanone, 1-butanol, butanoic acid, nonanal, acetic acid, 1,3 butanediol, methyl-3-buten phenylethyl alcohol, toluene, 1-pentanol, 3-octene-1-ol, 2 octene-1-ol, 2-undecanone, 1-octanol, Benzaldehyde, 1-heptanol, 2-heptanone, 4-methyl-2-nonanone, 2-methyl-2-nonanol, 1-hexanol, 2-methyl 2-propanol, Ethanol, 3 methyl 1-butanol, 1-hexanol, 2-methyl 2-nonanol, 2-nonanone, 2-heptanone, 4-methyl, 1-heptanol, 1-octanol, 2 octene-1-ol, 3-octene-1-ol, 1-octanol, 1-heptanol, 2-heptanone, 4-methyl-2-nonanone, 2-dodecanol, 2-dodecanone, 3-decene 1-ol acetate, benzyl alcohol, phenylethyl alcohol, 2-methoxy 4-vinylphenol, 3-decene 1-ol acetate, 2-dodecanone, 2-dodecanol, or 2-methoxy 4-vinylphenol.

In some embodiments, the improved flavors are due to the decreased levels of volatile flavor compounds, such as, e.g., benzaldehyde, 2-methyl-2-propanol, acetophenone, octane, ethanol, 2-pentanone, pentanal, 2 heptanone, 1-butanol, 1-hexanol, 3-methyl-1-butanol, 2-methyl-2-noonanol, 2-nonanone, 1-octanol, 2-undecanone, 2-octene-1-ol (Z), 1-octene-3-ol, acetophenone, 4-methyl-2 heptanone, nonanal, acetic acid, 3-methyl furan, 2-methyl furan, 1-hexanal, furan, 2-methyl-2-propanol, pyrazine, 1-heptanal, 2-ethyl furan, 2-pentyl furans, or 1,3 butanediol.

In some embodiments, the method further comprises preparing a cultured non-dairy product such as a cheese replica, yogurt, sour cream, or crème fraiche with a controlled flavor profile, by the controlled addition of defined combinations of flavor additives, described herein, to the non-dairy e source at any time point of the replica making process. Exemplary additives and specific combinations are described herein.

Flavor Generators
Control of Flavor by Addition of Bacteria/Microbes

Flavor compounds can be generated by microbes in the non-animal derived material used for producing many different non-dairy products described herein, including cheese replicas. The methods of flavoring generally include contacting a non-dairy milk or protein solution with one or more microbes, and preparing a cultured non-dairy product from the non-dairy milk. Microbes such as bacteria, yeast, or mold can be used to create a product with a desired flavor profile or be used as a component of the flavor in a product, as bacteria can create desirable flavors (e.g., buttery, creamy, dairy, or cheesy) in a neutral, planty, or beany product.

Exemplary non-dairy milks are described herein. Any of the non-dairy cheese milks or combinations thereof may be contacted with one or more microbes (e.g., a controlled amount of bacteria) to control the flavor of a resulting cultured non-dairy product such as a cheese replica. The microbes can be selected from bacteria, yeast, or molds. The bacteria can comprise mesophilic and/or thermophilic bacteria. The bacteria can comprise bacteria from a commercial starter. Exemplary commercial starters are described herein.

Flavor production in the replicas can be controlled by the use of one or more microbes e.g., one or more bacteria, yeast, or molds, including but not limited to Flavor production in the replicas can be controlled by the use of one or more microbes e.g., one or more bacteria, yeast, or molds, including but not limited to *Lactococcus* species such as *Lactococcus lactis lactis* (LLL, used alone or as a component of commercial mix MA11), *Lactococcus lactis cremoris* (LLC, used alone or as a component of commercial mix MA11), or *Lactococcus lactis biovar diacetylactis* (LLBD, often used as commercial culture MD88), a *Lactobacillus* species such as *Lactobacillus delbrueckii lactis*, *Lactobacillus delbrueckii bulgaricus*, *Lactobacillus helveticus*, *Lactobacillus plantarum*, *Lactobacillus casei*, or *Lactobacillus rhamnosus*, a *Leuconostocaceae* species such as *Leuconostoc mesenteroides cremoris*(LM), a *Streptococcus* species such as *Streptococcus thermophiles* (ST, often used as commercial culture TA61) a *Pediococcus* species such as *Pediococcus pentosaceus*, a *Clostridium* species such as *Clostridium butyricum*, a *Staphylococcus* species such as *Staphylococcus xylosus* (SX), a *Brevibacterium* species such as *Brevibacterium linens*, a *Propioniibacteria* species, a *Penicillium* species such as *Penicillium candidum*, *Penicillium camemberti*, or *Penicillium roqueforti*, a *Debaryomyces* species such as *Debaryomyces hansenii*, a *Geotrichum* species such as *Geotrichum candidum*, a *Corynebacteria* species, a *Verticillium* species such as *Verticillium lecanii*, a *Kluyveromyces* species such as *Kluyveromyces lactis*, a *Saccharomyces* species such as *Saccharomyces cerevisiae*, a *Candida* species such as *Candida jefer* or *Candida utilis*, a *Rhodosporidum* species such as *Rhodosporidum infirmominiatum*, a *Micrococcus* species, a *Halomonas* species, a *Psychrobacter* species. In some embodiments, lactic acid bacteria such as *Lactobacillus, Leuconostoc, Pediococcus, Lactococcus,* or *Streptococcus* are used. In some embodiments, the bacteria do not comprise *Lactobaccilius acidophilus* strains. In some embodiments, a yeast such as *Saccharomyces cerevisiae, Kluveromyces lactis* and/or *Debaromyces hansenii* can be used. In some embodiments, a mold can be *Penicillium candidum, Penicillium camemberti, Penicillium roqueforti, Geotrichum candidum*, or a combination thereof.

In some embodiments, one or more of the follow microbes are used: *Pediococcus pentosaceus, Clostridium butyricum, Lactobacillus delbrueckii lactis, Lactobacillus delbrueckii bulgaricus, Lactobacillus helveticus, Lactobacillus plantarum, Lactobacillus casei, Lactobacillus rhamnosus, Staphylococcus xylosus,* and *Brevibacterium linens.*

The one or more microbes can be cultured alone (e.g., bacteria, yeast, or mold alone), or in combination with two ore more microbes (e.g., two different bacteria, two different yeast, two different molds, a bacteria and a yeast, a bacteria and a mold, or a yeast and a mold). When two or more microbes are used, the microbes can be co-cultured or sequentially cultured, i.e., one microbe can be cultured for a length of time before adding another microbe. Particular good combinations for flavor generation in replicas are pre-culturing with SX, followed by either TA61 or MD88, or MD88 co-cultured with MA11.

The growth conditions of microbes also can control flavor generation in replicas. The temperature of microbes growth ranging from 4° C. to 45° C. can control the amount and type of flavor compounds produced in replicas. The amount of aeration by shaking (e.g., 0 to 300 rpm) changes the flavor productions of many different bacteria in non-dairy media.

Greater aeration during culturing by either SX, TA61, or MD88 generates more desired cheese and buttery compounds. Aeration also decreases the undesired flavor compounds. Desired cheese compounds such as 2-heptanone increase when SX, MD88, or TA61 are cultured with aeration. MD88's production of hexanoic methyl ester in cheese replicas is also modulated by aeration. An increase in aeration of SX during culturing in soymilk greatly increases 3-methyl and 2-methyl butanoic acid production and decreases the amounts of undesirable aroma compounds such as 2-ethyl furan or 2-pentyl furan in cheese replicas.

The amount of time the one or more microbes is cultured also can modulate the amount and types of flavor compounds. Culturing can range from 1 hour to multiple days. In some embodiments, one or more microbes and the non-dairy milk are incubated together for a length of time ranging from 1 min-60 minutes, 0.5-5 hours, 3-10 hours, 6-15 hours, 10-20 hours, or more than 20 hours. Most buttery compounds are created within the first 10 hours, while additional cheese compounds typically require 24-48 hours or more hours. Butyrolactone, a creamy, milky note compound is created in non-dairy media by MD88 and MA11 only after 20 hours of culturing in soymilk.

The one or more microbes also can be added at different inoculums, e.g., $10^2$-$10^9$ cfu/mL or even greater. The phase of growth (i.e, stationary phase versus exponential phase) and the cell density of the bacterial culture affect the flavor compound profile of the medium. Higher inocula of a starter culture can protect the replica from unwanted microbial contamination (e.g., bacterial contamination). Therefore, an inoculum of $10^6$-$10^9$ cfu/mL is usually used.

Flavor production by the one or more microbes also can be modulated by directing the metabolic pathways, e.g., by modulating their nitrogen source, carbon source, additional available nutrients, and growth conditions. Non-limiting examples of additives that can be used are shown in Table A. The additives can be added to the media at the same time as the bacteria or any time during the creation of the replica. When sequential culturing occurs additional additives can be added at the same time that the additional strains are inoculated.

TABLE A

Additives used to control flavor production by microbes in non-dairy replicas

| | | |
|---|---|---|
| $FeCl_2$ | Asp | C8:0, Caprylic acid |
| $MgCl_2$ | Cys | C10:0, Capric acid |
| $CaCl_2$ | Glutamine | C12:0, lauric acid |
| $MnSO_4$ | Glutamate | C14:0, myristic acid |
| $CoCl_2$ | Gly | C16:0, palmitic acid |
| $CuSO_4$ | His | C18:0, stearic acid |
| $ZnSO_4$ | Ile | C16:1, palmitoleic acid |
| Adenine | Lue | Coconut Oil |
| Guanine | Lys | Castor Oil |
| Inosine | Met | Palm Oil |
| Uracil | Phe | Palm Fruit Oil |

TABLE A-continued

Additives used to control flavor production by microbes in non-dairy replicas

| | | |
|---|---|---|
| Xanthine | Pro | Jojoba Oil |
| Pyridoxamine | Ser | Sunflower Oil |
| Pyridoxine | The | Mango Butter |
| D-sorbitol | Trp | Ala |
| Citric Acid | Tyr | Arg |
| Lactic Acid | Val | Asn |
| α-ketoglutarate | Riboflavin | FAD |
| Pyruvic Acid | Thiamine | NAD |
| Ororic acid | Lipoic Acid | Biotin |
| oxalic acid | Nicotinic acid | Pantothenate |
| Ascorbic Acid | CoA hydrate | B12 |
| Succinic acid | propanoic acid | Folic Acid |
| p-aminobenzoic acid | C4:0, butyric acid | |
| DL-Malate | C6:0, caproic acid | |

The amount and type of sugar is a large driver of the type of flavors produced, including buttery compounds. In some embodiments, sugars are naturally present in the non-dairy milk. By way of example only, sucrose is present in a variety of nuts such as, e.g., almonds, which can be used to provide a non-dairy milk used for preparing the cheese replica. In some embodiments, a controlled amount of one or more sugars is added to the non-dairy milk or non-dairy cheese source.

In some embodiments, the sugar is a monosaccharide, including but not limited to glucose (dextrose), fructose (levulose), galactose, mannose, arabinose, xylose (D- or L-xylose), and ribose, a disaccharide including but not limited to sucrose, lactose, melibiose, trehalose, cellobiose and maltose, a sugar alcohol such as arabitol, mannitol, dulcitol, or sorbitol, sugar acids such as galacturonate, glucuronate, or gluconate, oligosaccharides and polysaccharides such as glucans, starches such as corn starch, potato starch, pectins such as apple pectin or orange pectin, raffinose, stachyose and dextrans, a plant cell wall degradation product, β-galactosides, β-glucosides such as salicin, and/or sugar derivatives such as N-acetylglucosamine. In particular embodiments, the sugars are chosen from the group consisting of sucrose, maltose, glucose and fructose.

The relative growth of each isolated strain can be controlled by the addition of said one or more sugars. The addition of said one or more sugars can result in nondairy cheese replicas with significantly improved texture and flavor. A user, e.g., an individual or plurality of individuals practicing the invention, can select specific isolated strains and add controlled amounts of the selected strains to create a non-dairy cheese replica with a desired flavor and texture profile. A user can additionally select specific sugars and add controlled amounts of the selected sugars along with controlled amounts of specific isolated strains to create a non-dairy cheese replica with a desired flavor and texture profile. Table B provides non-limiting examples of bacteria culturing conditions for producing dairy flavor notes created in non-dairy cheese or other non-dairy products.

TABLE B

| Genus | species | sub species | growth temperature | Aeration | sugar preference (based on generation time) |
|---|---|---|---|---|---|
| Lactococcus | lactis | cremoris | 30 C. (25-40 C.) | yes | glucose = fructose > maltose > sucrose* |
| Lactococcus | lactis | lactis | 30 C. (25-40 C.) | yes | glucose = fructose = sucrose > maltose* |
| Leuconostoc | mesenteroides | cremoris | 30 C. (25-35 C.)* | yes | glucose = fructose = maltose > sucrose |

TABLE B-continued

| Genus | species | sub species | growth temperature | Aeration | sugar preference (based on generation time) |
|---|---|---|---|---|---|
| Lactococcus | lactis | biovar diacetylactis | 30 C. (25-40 C.) | yes | glucose > fructose = sucrose = maltose |
| Streptococcus | thermophilus | | 37 C. | no | glucose > maltose |
| Lactobacillus | delbrueckii | lactis | 37 C. | no | glucose > maltose |
| Lactobacillus | delbrueckii | bulgaricus | 37 C. | no | glucose > maltose |
| Lactobacillus | helveticus | | 37 C. | no | glucose > maltose |
| Lactobacillus | plantarum | | 37 C. | no | glucose = maltose |
| Lactobacillus | casei | | 37 C. | no | glucose > maltose |
| Lactobacillus | rhamnosus | | 37 C. | no | glucose > maltose |
| Staphylococcus | xylosus | | 30 C. | yes | glucose > maltose |
| Pediococcus | pentosaceus | | 30 C. | | maltose > glucose |
| Clostridium | butyricum | | 37 C. | no | glucose > maltose |

*Large variation in different strains of this subspecies

The effect of different sugars and microbes on flavor production also depends on the type and composition of the starting material (e.g., the starting material can include any non-animal derived material, including but not limited to soymilk, pea protein, moong protein, soy protein, coconut milk, yeast extract, protein hydrolysate, derived media, and synthetic media), and the amino acid composition of the proteins in the starting materials, the types of sugars and carbohydrates included, and the types of fats, triglycerides, and/or free fatty acids present. The amino acid composition of the protein can be broken down by enzymes, such as those created by the microbes and those added as part of the recipe, and the resulting amino acids or peptides can serve as precursors to particular flavor molecules. Synthetic media refers to using ammonium for the nitrogen source, and a defined sugar for the carbon source, with any other additives. The starting material can comprise isolated purified proteins, or crude plant extracts.

Acetoin and diacetyl ("buttery" compounds) are created by MD88 (LLBD) in the greatest abundance in a yeast extract medium with maltose added. On the other hand MD88 creates more of these buttery compounds in soymilk with glucose added. Acetoin and diacetyl are created in even higher amounts by MD88 and TA61 (ST) with the addition of citrate or pyruvate. Acetoin/diacetyl and 2,3-hexandione concentrations all increase in response to increased citrate concentration in cheese replicas made with strain MD88.

The addition of amino acids (see Table A) can directly control the production of particular flavor compounds in non-dairy replicas. The creation of these flavor compounds contributes to the overall flavor profile of the replica. Methionine can be added to cheese replica or media to produce methional by SX or dimethyl trisulfide by *Brevibacterium*. Methional and dimethyl trisulfide are two sulfur compounds that are found in many dairy cheeses, and contribute to the aged character of cheddar. Leucine added to soymilk, yeast extract media, or pea proteins significantly increase the 3-methyl butanoic acid production by SX bacteria, adding cheesy notes. Adding multiple compounds can further control flavor production by bacteria, e.g. alpha-ketoglutarate with leucine increases the 3-methyl butanoic acid production by SX bacteria. 3-methyl butanoic acid has a cheesy aroma and taste, it is similar to butanoic acid, which is a key flavor in American and cheddar cheeses. Organic acids can also control flavor production by bacteria in non-dairy replicas. Oxalate added to yeast extract media and cultured by *Brevibacterium* creates cheese compounds butanoic acid, 3-methyl butanoic acid, and 2,6-nonadienal, and the flavors generated were described as "aged cheese". The creation of buttery compounds can be controlled by the addition of citrate, xanthine, and pyruvate, when added to cultures of TA61. Adding citric acid, pyruvate, riboflavin, and copper can affect the cheese and buttery flavor production by MD88. Other important aroma compounds like butanoic acid derivatives and 2-heptanone are produced when isoleucine, proline, alanine, malate, inosine, $Fe^{2+}$, $Mg^{2+}$, serine, and thiamine are added into replicas. Additionally, ZnSO4, citric acid, lactic acid, pyruvic acid, succinic acid, malic acid, aspartic acid, lysine, tyrosine, valine, and jojoba oil allow for the creation of desired cheese flavor compounds by TA61 in replicas. The affect of each additive depends on the composition of the other stating materials.

Other additives can be added before bacteria culturing or after culturing. These include but are not limited to fruit extracts (0.0001%-0.2% wt/vol), fruit puree (peach, pineapple strawberry, mango, papaya, plum, etc) (0.001%-2% wt/vol), vegetable puree (potato, yam, onion, garlic, or broccoli) (0.001%-2% wt/vol), molasses (0.001%-2% wt/vol), yeast extracts (0.001%-2% wt/vol), protein hydrolysates (0.01%-10% wt/vol), red or white miso (0.01%-2% wt/vol), coconut milk (0.5%-60%), malt extracts (0.01%-2% wt/vol), or coconut cream (0.5%-60%), and combinations thereof. Malt extracts and molasses can add cheese flavor molecules like 3-methyl butanal, 2-methyl butanal, 2-heptanone, butanoic acid, or butyrolactone. Replicas with the addition of peach extract or puree were described by trained flavor scientists as having more cream flavor. Replicas with the addition of papaya were described as more cheesy by trained flavor scientist and had an increase in 3-methyl butanoic acid by GCMS. Red miso added to MD88 cultures, and white miso added to TA61 cultures resulted in improved flavor complexity and a perceived decrease in astringency by a trained flavor scientist.

Yeast extract can control bacteria growth and flavor generation, and contribute different starting flavors. There are many vitamins in yeast extracts that improve the growth of TA61 in replicas. All yeast extracts are not the same. TA61 growth was greater with Flavor House Flavor Spark, and BioSpringer Yeast Extract 2020, compared to other yeast extracts. BioSpringer Yeast Extract 2020 supports good growth and decent flavor development for MD88 and TA61. Yeast extract can be added between 0.01%-2% wt/vol of media to improve growth and flavor production by the bacteria. Yeast extract can be added at 0.02%-0.1% improve growth and flavor production by the bacteria. Yeast extracts themselves can also provide certain flavors to the product including, brothy, whey, nutty, savory, roasted, malty, caramel, cooked-milk, light-sulfurous, and slight cheese-like. Yeast extracts also supports the production of flavor compounds by TA61, MA88, and SX that lead to a more cheesy and complexly flavored replicas.

In some embodiments, the one or more microbes, the non-dairy cheese source, and the one or more optional components that can be used to alter flavor (e.g., sugars, fats, carbohydrates, vitamins, organic acids, nucleotides, or food products) are incubated together for a sufficient period of time to achieve a desired pH. The pH can range from pH 3-5, 4-6, or 4.3-5.7. The desired pH can be pH 6 or lower, pH 5 or lower, or pH 4 or lower. Culturing the material by bacteria in some cases decreases the pH to 6.5, 6, 5.5, 5, 4.5, 4, or 3.5, while in other cases, flavors are generated with no change in pH. Culturing with *Lactococcus, Lactobacillus, Leuconostoc, Pediococcus* and/or *Streptococcus* typically results in a decrease in pH with most starting material, while culturing with *Staphylococcus, Brevibacterium*, and/or *Clostridium* typically has little or no effect on the pH.

In some embodiments, the method further comprises solidifying said non-dairy cheese source. Methods of solidifying are described herein.

In some embodiments, the method comprises isolating a plurality of microbial strains from a heterogeneous population, e.g., a commercial starter or a probiotic (e.g., Rejuvelac). In some embodiments, the isolated microbial strains are each characterized according to defined criteria. The defined criteria may include, for example, growth rates in non-dairy cheese sources comprising different sugars added therein. The defined criteria may include the contribution of each isolated strain to a flavor palette by characterizing flavor notes from a cheese replica with the isolated strain added therein as compared to a control cheese replica without the isolated strain added therein. The isolated microbial strains may be characterized by genetic sequencing, and/or determining sequences unique to each of the isolated strains.

In some embodiments, the method further comprises preparing a cheese replica with a controlled flavor profile, by the controlled addition of specific combinations of isolated strains to provide a desired array of flavor notes to the cheese replica.

In another aspect, the invention provides a library of isolated microbial strains. In some embodiments, the isolated strains in the library are selected to provide a palette of flavor profiles to non-dairy cheese. In some embodiments, the isolated microbial strains are bacterial strains. In some embodiments, the isolated strains are isolated from a commercial starter culture, e.g., a bacterial culture that is commercially available. In some embodiments, the commercial starter culture is a mesophilic bacterial culture. In some embodiments, the commercial starter culture is a thermophilic bacterial culture. Exemplary commercial starters include, e.g., MA11, MA14, MA19, LM57, MA4002, MM100, TA061, LH100, MD88, and Flora Danica.

Strains can be isolated by plating commercial mixes on selective or non-selective growth media, e.g., Reddy's selective agar, LB agar. In some embodiments, single bacterial cells of an individual strain will grow into discrete colonies on said growth media. In some embodiments, individual colonies can be screened by PCR. In some embodiments, PCR can involve the use of universal primers containing sequences that are common to all strains of a microbial species, or can involve the use of primers comprising sequences that are unique to particular subspecies of the microbial population. PCR products can be sequenced and the sequences compared to known sequences, e.g., in Gen Bank, and also to one another. pH profile, sugar fermentation, phenotype on Reddy's selective agar and more extensive sequencing can be carried out to help further identify and characterize individual strains.

In some embodiments, the bacterial strains are selected to provide to provide an array of flavors and textures, or other defined characteristics, to a non-dairy milk cheese. In dairy milks, LLL strains typically grow more quickly and rapidly acidify the milk, while LLC strains grow more slowly and provide more flavor. In dairy milks, both LLBD and LM contribute additional flavor compounds, notably diacetyl, which gives a buttery taste to the cheese. One or more isolated bacterial strains, e.g., LLL, may be selected to acidify a non-dairy milk quickly, e.g., a drop in pH within one hour, or an overall drop in pH from 6.3 to 4.3 in less than 15 hours. One or more isolated bacterial strains, e.g., LLC, may be selected for a slower growth profile with greater production of flavor compounds and a less dramatic lowering of pH, e.g., from 6.3 to only 5.4 in 15 hours. Such a slowed growth rate may serve to, e.g., provide a cheesemaker greater control over the flavoring process and more tightly regulate the resulting taste profile of the non-dairy cheese replica. One or more isolated bacterial strains may be used to provide different flavor profiles to a non-dairy cheese. The different flavor profiles may be characterized by the release of specific volatile chemicals from the replica. For example, some bacterial strains, e.g., LLBD and LM, may be used to produce diacetyl when contacted with a non-dairy milk or protein solution. The diacetyl may produce a buttery flavor in the resulting non-dairy cheese.

It was found that single use direct vat cultures, such as MA11 and Flora Danica (FD), provide a fairly uniform but limited characteristic flavor and texture profile when used to make soft fresh (SF using MA11) and soft ripened (SR using MA11 & FD) cheeses. To allow a much greater array of flavor and texture capability, individual bacterial strains were isolated and characterized from commercial preparations, e.g., Flora Danica and MA11. These isolated strains can be combined in new and varied combinations and in various proportions to create a much greater range of flavor and texture possibilities.

In general, the dominant sugar in dairy milk is lactose, which is not present in non-dairy milks. When controlled amounts of bacteria, e.g., controlled amounts of one or more isolated isolated strains of the invention are incorporated in non dairy cheese replicas that comprise one or more sugars, specific combinations of sugars and bacterial strains can alter the taste and texture profiles of the resulting non-dairy cheese replicas in unexpected ways. Such specific combinations can be used to prepare cheese replicas with a controlled flavor profile, e.g., to prepare cheese replicas that accurately mimic the flavor of specific dairy cheeses such as, by way of non-limiting example only, process cheese, swiss cheese, string cheese, ricotta, provolone, parmesan, muenster, mozzarella, jack, manchego, blue, fontina, feta, edam, double Gloucester, camembert, cheddar, brie, asiago and Havarti.

The desired flavor and texture profile can be selected to mimic the flavor and texture of a specific dairy cheese. By way of example only, by selecting and adding a controlled amount of one or more isolated bacterial strains of the invention and optionally selecting and adding a controlled amount of one or more sugars, a user can create a non-dairy cheese replica that mimics the flavor and texture profiles of e.g., process cheese, swiss cheese, string cheese, ricotta, provolone, parmesan, muenster, mozzarella, jack, manchego, blue, fontina, feta, edam, double Gloucester, camembert, cheddar, brie, asiago and Havarti.

The texture and flavor profile of the non-dairy cheese can be ascertained by any method known in the art or described herein.

To generate dairy-like flavor in replicas or other non-dairy products, or a flavoring solution/paste to add to non-dairy products, particular stains can be used to generate cheesy, buttery, creamy, milky or other desired flavor compounds. See Table C for non-limiting examples of dairy flavor compounds that can be produced. Table C also provides examples of how to create the indicated flavor compound in non-dairy replicas.

TABLE C

| Compounds | Smell type | Bacteria to create | Additives, starting material |
|---|---|---|---|
| 2-methyl butanal | cocoa, coffee, nutty | TA61 | Calcium ions, proline in yeast extract media |
| 3-methyl butanal | chocolate, peachy, fatty | SX with MD88 | Pea Vicilin with coconut milk and yeast extract |
| acetoin | sweet buttery, creamy, dairy milky, fatty | MD88 or TA61 MD88 MD88 or TA61 | soy milk (plus pyruvate) yeast extract media plus maltose xanthine, citrate, pyruvate in yeast extract media |
| diacetyl | buttery, creamy, milky | MD88 or TA61 TA61 or MD88 | xanthine, citrate, pyruvate yeast extract media soy milk (plus pyruvate) |
| 2,3-hexanedione | Creamy, buttery, fruity, caramellic | MD88 | citrate with <50 mM glucose in yeast extract media |
| Hexanoic acid methyl ester | fruity pineapple | MD88 | yeast extract media |
| 2-methyl butanoic acid | Fruity, acidic with a dairy buttery and cheesey nuance | SX | Valine + >20 mM glucose |
| 3-methyl butanoic acid | Cheesey, dairy, creamy, fermented, sweet, waxy | SX Brevibacterium | Leucine + >20 mM glucose (alpha-ketoglutarate gives a further increase) Oxalate + yeast extract media |
| butyrolactone | Milky, creamy with fruity peach-like afternotes | MD88 or TA61 | >20 hours culturing soymilk |
| methional | musty tomato, potato, mold ripened cheeses | MD88 | Methionine added to soymilk, Pea vicilin or yeast extract |
| dimethyl trisulfide butanoic acid | sulfurous, savory cheesy, dairy, creamy, sharp | brevibacterium Clostridium Butyricum Brevibacterium SX | Methionine starches, corn steep liquor cultured in anaerobic Oxalate + yeast extract media Pea Vicilin + coconut milk + yeast extract |
| 2-heptanone | cheese, fruity, coconut | MD88 or TA61 | soymilk no added sugar with shaking |
| 2-undecanone | waxy, fruity with creamy cheese like notes | MD88 | Methionine or Leucine added to yeast extract media |
| 2-nonanone | green, herbal, cheesy, fresh | MA11 | $CuSO_4$ or Alanine in yeast extract media |
| propanoic acid | acidic and dairy-like | Brevibacterium | Oxalate + yeast extract media |
| 2-methyl propanoic acid | rancid butter | Brevibacterium SX | Oxalate + yeast extract media Valine + yeast extract media |
| hexanoic acid | sour fatty sweat cheese | SX | >5 mM glucose in yeast extract media with coconut oil |
| octanoic acid | fatty waxy rancid oily vegetable cheesy | SX | >5 mM glucose in yeast extract media with coconut oil |
| ethyl butanoate | Fruity, sweet | | |
| 2-butanone | acetone-like, fruity, butterscotch | TA61 | Ile, thiamine, Magnesium ions, or ascorbic acid in yeast extract media |
| Acetic acid | sour | SX | <glucose in all systems |
| decanoic acid | rancid sour fatty goaty | SX followed by MD88 or TA61 | Pea vicilins + coconut milk (with yeast extract) |
| Methyl Isobutyl Ketone | herbal, fruity and dairy nuances | SX followed by MD88 | Pea vicilins + coconut milk (with yeast extract) |
| gamma-octalactone | sweet, coconut, waxy, creamy, tonka, dairy, fatty | SX + TA61 | Pea vicilins + coconut milk (with yeast extract) |
| delta-octalactone | Sweet, fatty, coconut, tonka, tropical dairy | SX + TA61 | Pea vicilins + coconut milk (with yeast extract) |
| gamma-nonalactone | coconut, creamy, waxy, fatty milky | SX + MD88 | Pea vicilins + coconut milk (with yeast extract) |

TABLE C-continued

| Compounds | Smell type | Bacteria to create | Additives, starting material |
|---|---|---|---|
| 5-Hydroxy-4-octanone | buttery | SX followed by TA61 | soymilk |
| Ethyl octanoate | sweet, waxy, fruity and pineapple with creamy, and fatty | SX + MD88 | yeast extract media with coconut milk |
| 2-ethyl-1-Hexanol | sweet, fruity, fatty | TA61 | Vitamin B12, Riboflavin, Thiamine, CoenzymeA, or Ketoglutarate in yeast extract |

It will be appreciated that many different types of bacteria can make buttery compounds. MD88 and TA61 are both very good at producing buttery compounds in non-dairy media and cheese replicas. They both can create the buttery compounds 2,3-butandione, acetoin, and 2,3-hexanedione in soymilk, purified pea proteins, purified soy proteins, purified moong proteins, and yeast extract medias. Additionally, LLC, LLL, and SX also can create buttery compounds in replicas. Additionally, greater refinement of flavor can come from controlling each concentration of the butter compound; in soymilk MD88 produces more acetoin while TA61 produces more diacetyl.

In some embodiments, buttery notes can be enhanced by selecting particular strains (e.g., LLBD, LM, LF2, LF5, and *Streptococcus thermophilus*) and/or selecting particular sugars to use (e.g., glucose, fructose, or sucrose). In some embodiments, the buttery notes are associated with increased levels of volatile flavor compounds. The volatile flavor compounds can be, e.g., acetoin, 2,3-butanedione, and butanoic acid. In some embodiments, the volatile flavor compounds can be, e.g., 2-heptanone, nonanal, butanol, 1-hexanol, 2-heptanone, 4-methyl, Ethyl acetate, or 2-nonanone.

In some embodiments, buttery notes can be decreased by selecting and adding a controlled amount of LM.

In some embodiments, said buttery flavor can be decreased by selecting one or more sugars from the group consisting of glucose, fructose, sucrose and maltose.

SX and *Brevibacterium* are particular good at generating cheesy compounds, including 3-methyl-butanoic acid, 2-methyl butanoic acid, and 2-methyl propanoic acid. SX and *Brevibacterium* can also be used to generate free fatty acids, including butanoic acid, propionic acid, dodecanoic acid, undecanoic acid, nonanoic acid, octanoic acid, and hexanoic acid, when cultured in the presence of fats. When SX is cultured in the presence of coconut oil, short and medium chain length free fatty acids are created. TA61 can also created additional types of cheese flavor compounds including 2-heptanoic and 2,4-heptadienal in non-dairy replicas. There are sulfur compounds including but not limited to dimethyl trisulfide and methional that are important in providing characteristic flavor to particular cheeses that can be generated in non-dairy medias by SX and *Brevibacterium*.

Other bacterial cultures, including LR, can drive floral flavor production and creamy notes can be created in replicas by LBB. In some embodiments, fruity notes are enhanced by selecting strains from the group consisting of LLBD, LM, LLL, LLC, LF2, LF5, and *Streptococcus thermophilus* strains. In some embodiments, fruity notes are enhanced by selecting sugars from the group consisting of glucose, fructose, sucrose, and maltose.

In some embodiments, sour notes are enhanced by selecting strains from the group consisting of LLBD and LM strains. In some embodiments, sour notes are enhanced by selecting sugars from the group consisting of glucose, maltose and sucrose. In some embodiments, sour notes are associated with increased levels of volatile flavor compounds. The volatile flavor compounds can be, e.g., acetic acid, 2-methylbutanoic acid, hexanoic acid, propionic acid, and octanol.

In other embodiments, sour notes are enhanced by selecting strains from the group consisting of LLL, LLC, and LM. In particular embodiments, sour notes are enhanced by selecting sugars from the group consisting of glucose and sucrose. In some embodiments, the sour notes are characterized by increased levels of volatile flavor compounds. The volatile flavor compounds can be, e.g., nonanal or butanoic acid.

In some embodiments, floral notes can be enhanced by selecting strains from the group consisting of LLL, LLC and LM. In some embodiments, floral notes can be enhanced by selecting sugars from the group consisting of glucose, fructose, maltose and sucrose. In some embodiments, the floral notes are due to increased levels of volatile flavor compounds, e.g., nonanol.

In some embodiments, sweet notes are enhanced by selecting a LLBD strain. In particular embodiments, sweet notes are enhanced by addition of sugars. In some embodiments, sugars are added to a final concentration of 0-150 mM. In some embodiments, sugars are added to a final concentration of about 10, 20, 30, 40, 50, 60, 70, 80, 90, 100, 110, 120, 130, 140, or 150 mM. In some embodiments, the sugars are glucose, maltose, fructose or sucrose.

In some embodiments, the sweet flavor of non dairy cheeses comprising LLC, LLL, LM and LLBD can be enhanced by addition of sugars. The sugars can be, e.g., glucose, maltose, fructose, sucrose, or any combination thereof. In some embodiments, the increased sweet flavor is due to increased levels of volatile flavor compounds. In some embodiments, the volatile flavor compound is butanoic acid.

In some embodiments, strains can be selected to enhance citrus flavor notes of non-dairy cheeses. In some embodiments, enhanced citrus flavor notes are due to increased levels of volatile flavor compounds, e.g., nonanal, limonene, and 1-octanol.

In some embodiments, strains can be selected to enhance mushroom flavor notes of non-dairy cheeses. In some embodiments, enhanced mushroom flavor notes are due to increased levels of volatile flavor compounds, e.g., 1-octene-3-ol, 1-hexanol, and 1-heptanol.

In some embodiments, the addition of bacteria decreases and or masks undesirable flavors including soy flavor, beany flavor, planty flavor, grassy flavor, and astringency. As described herein, the addition of SX decreased or masked the "soy" and "green" flavor and aroma of the replicas; the addition of leucine to the SX culture caused an even larger reduction in the "soy" notes. Growth of MD88 in replicas quickly decreases benzaldehyde, an off taste in soymilk. The soy (green, cereal) aroma present in soymilk and other plant derived material decreases as the coconut milk percentage increases in the cultured material. Characteristic undesirable aromas: Pentenols, Pentanol, 2-pentyl-furan, and 1-Hexanol, also decrease with an increasing coconut milk percentage. Samples were evaluated and compared by a 2-6 members of a trained sensory panel.

A limitation of currently available nut milk-based cheeses is the presence of undesirable nutty flavor in the cheese. The nutty flavor can detract from the taste profile of the cheese and make the cheese seem non dairy-like. Therefore, in one aspect, the invention provides a nut-milk based cheese replica with a reduced or undetectable nutty flavor, and methods of making the same. In some embodiments, the method comprises contacting a nut milk with a controlled amount of *Lactococcus* bacteria and a controlled amount of a sugar. In some embodiments, the nutty flavor is reduced by the selection of one or more isolated strains described herein. In some embodiments, the nutty flavor is reduced by the selection of one or more isolated strains selected from the group consisting of LLL, LLC, LM, and LLBD. In some embodiments, the nutty flavor is reduced by selecting sugars from the group consisting of glucose, fructose, sucrose and maltose. In some embodiments, the reduced nutty flavor is associated with decreased levels of volatile flavor compounds. In some embodiments, said flavor compounds are benzaldehyde or 2-methyl-2-propanol.

The non-dairy cheese culture can be made from different sugar sources including but not limited to glucose, fructose, maltose, sucrose, and or galactose. The cultured material can be made into a solid like cheese or used as a liquid cultured material.

Replicas can also be flavored by adding artificial or natural flavors in either as a single compound or as complex product mixtures. Fatty acids (between 0.001%-0.5%) can be added to replicas, and these replicas are described by trained flavor scientists as being more cheesy with the addition of fatty acids. Compounds added to the replica cheese include but are not limited to 2,3 butanedione, acetoin, butanoic acid, 5,6 decenoic acid, y-heptalactone, y-hexalactone, y-octalactone, y-decalactone, y-nonanoiclactone, y-undecalactone, δ-decalactone, δ-dodecalactone, δ-nonanoic lactone, δ-octalactone, gamma-nonanoic lactone, gamma-undecalactone, gamma-decalactone, delta-tetradecalactone, S-methyl thiopropionate, delta-tridecalactone, delta-tetradecalactone, δ-tetradecalactone, butyl butyryllactate, isovaleric acid, 2-undecanone, valeric acid, 2-heptanone, 2-methyl butyraldehyde, 2-nonanone, 2-methyl butanoic acid, decanoic acid, methional, octanoic acid, 2-methyl butanal, 3-methyl butanal, ethyl-butanoate ester, hexanoic acid, and octanoic acid. Complex mixtures include but are not limited to coconut cream, yeast extract, molasses, fruit extracts, masking agents, cream flavor boosters, and miso. Flavor compounds can increase the cheesy, buttery, malty, creamy, coconut, milky, whey, and fruity taste. When present in cheese replicas these compounds increase the preferences of the cheese replica, and can be described by trained flavor scientists as more cheesy, more buttery, more creamy, more complex and with an increase in dairy notes has described by trained flavor scientists. The addition of flavor compounds can also decreases the off notes, including but not limited to planty, beany, nutty and sour notes in replicas. The concentrations of flavor compounds added to the replicas can be from 0.1% to 0.000001% vol/wt of the final cheese replica. Complex flavor mixtures can be added from 10% to 0.01%. Flavor compounds can be added to cheese replicas made from bacterial cultured milks or other starting materials or acid coagulated milks or other starting materials. The flavor compounds added to the replicas can be complementally to the flavors generated by the microbes. The flavor compounds can also be added to the non-dairy milk before coagulation, so the bacteria can use the flavor compound to generate additional compounds.

Control of Flavor and Texture Using Enzymes

One or more enzymes can be used alone or in combination any one the culturing methods and additives described to help modulate the flavor, texture, and/or melting profile, comprising contacting a non-dairy cheese source with one or more isolated and purified enzymes. The enzymes can be added before solidification, after solidification but before the whey is drained, or after whey is drained. Surprisingly, adding trace amounts of one or more isolated and purified enzymes (e.g., proteases, lipases, and/or amylases) greatly enhanced the texture, flavor, and/or meltability of the resulting non-dairy cheese replica, as determined by blind taste test or by the detection of volatile odorants by, e.g., GCMS. Using such enzymes also controls flavor production by microbial cultures (e.g., when soymilk is pre-treated with amylases, TA61 produces much more diacetyl).

In the nut milk cheeses or other non-dairy cheese replicas, the presence, type, amount, and the timing of addition of the protease can control the flavor profile as has determined by blinded taster testers and GCMS. By way of example only, plant based cheese replicas with proteases were judged as having a more liked flavor profile, a more complex flavor profile, a flavor profile that tasted more like dairy cheese, and in some cases indistinguishable to dairy cheese. In some cases plant based cheese replicas with lipases were judged as having more liked flavor profile, a more complex flavor profile, and a flavor profile that tastes more like dairy cheese. In some cases plant based cheese replicas with lipases and proteases were judged as having more liked flavor profile, a more complex flavor profile, and a flavor profile that tastes more like dairy cheese.

Particular proteases or combinations of proteases and lipases created distinct flavor profile that tasters described as particular types of dairy products. The addition of proteases also controls particular flavor notes, including but not limited to buttery, sweet, fruity, floral, nutty, and sour. In the cheese replicas the presence, the type, the amount, and the timing of addition of the protease can control buttery flavor as determined by blinded taste testers and GCMS. The addition of proteases to non-dairy cheese replicas, particularly papain and aspartic protease, are significantly more buttery than the same non-dairy cheese without any proteases, as determined by blind taste testers. This is supported by GCMS data that shows the addition of proteases can greatly increase the production of compounds that create the buttery flavor in dairy cheeses, including diacetyl and acetoin. The contribution of specific added proteases and/or lipases to a flavor note profile of a non-dairy cheese replica can be ascertained using any of the methods described herein, e.g., taste test and/or GCMS.

In some embodiments, the enzyme is aspartic protease. In some embodiments, the enzyme is papain. In some embodiments, the enzyme is not rennet. In some embodiments, the enzyme is a protease or peptidase. In general, a protease or peptidase is an enzyme that conducts proteolysis, that is, catalyzes the hydrolysis of peptide bonds that link amino acids together into peptide chains. The protease can be a serine protease, a threonine protease, an asparagine protease, a mixed protease, a cysteine protease, an aspartate protease, or a metalloprotease. The protease can be an exopeptidase, e.g., an aminopeptidease or carboxypeptidase, or the protease can be an endopeptidase, e.g., a trypsin, a chymotrypsin, pepsin, papain, cathepsin G, or elastase. The protease can be any protease selected from the group consisting of pepsin A, nepenthesin, walleye dermal sarcoma virus retropepsin, Ty3 transposon peptidase, Gypsy transposon peptidase, Osvaldo retrotransposon peptidase, retrotransposon peptidase, cauliflower mosaic virus-type peptidase, bacilliform virus peptidase, thermopsin, signal peptidase II, spumapepsin, Copia transposon peptidase, Ty1 transposon peptidase, presenilin 1, impas 1 peptidase, type 4 prepilin peptidase 1, preflagellin peptidase, gpr peptidase, omptin, DNA-damage inducible protein 1, HybD peptidase, PerP peptidase, skin SASPase, sporulation factor SpoIIGA, papain, bleomycin hydrolase, calpain-2, poliovirus-type picornain 3C, enterovirus picornain 2A, foot-and-mouth disease virus picornain 3C, cowpea mosaic comovirus-type picornain 3C, hepatitis A virus-type picornain 3C, parechovirus picornain 3C, rice tungro spherical virus-type peptidase, nuclear-inclusion-a peptidase, adenain, potato virus Y-type helper component peptidase, chestnut blight fungus virus p29 peptidase, chestnut blight fungus virus p48 peptidase, sindbis virus-type nsP2 peptidase, streptopain, clostripain, ubiquitinyl hydrolase-L1, legumain, caspase-1, metacaspase Yca1, pyroglutamyl-peptidase I, murine hepatitis coronavirus papain-like peptidase 1, murine hepatitis coronavirus papain-like peptidase 2, hepatitis C virus peptidase 2, ubiquitin-specific peptidase 14, tymovirus peptidase, carlavirus peptidase, rabbit hemorrhagic disease virus 3C-like peptidase, gingipain R, gamma-glutamyl hydrolase, rubella virus peptidase, foot-and-mouth disease virus L-peptidase, porcine transmissible gastroenteritis virus-type main peptidase, porcine reproductive and respiratory syndrome arterivirus-type cysteine peptidase alpha, equine arteritis virus-type cysteine peptidase, equine arteritis virus Nsp2-type cysteine peptidase, beet necrotic yellow vein furovirus-type papain-like peptidase, calicivirin, bacteriocin-processing peptidase, dipeptidyl-peptidase VI, beet yellows virus-type papain-like peptidase, amidophoshoribosyltransferase precursor, acyl-coenzyme A:6-aminopenicillanic acid acyltransferase precursor, hedgehog protein, staphopain A, Ulp1 peptidase, separase, D-alanyl-glycyl peptidase, pestivirus Npro peptidase, autophagin-1, YopJ protein, PfpI peptidase, vaccinia virus I7L processing peptidase, YopT peptidase, HopN1 peptidase, penicillin V acylase precursor, sortase A, sortase B, gill-associated virus 3C-like peptidase, African swine fever virus processing peptidase, Cezanne deubiquitinylating peptidase, otubain-1, IdeS peptidase, CylD peptidase, dipeptidase A, AvrRpt2 peptidase, pseudomurein endoisopeptidase Pei, pestivirus NS2 peptidase, AgrB peptidase, viral tegument protein deubiquitinylating peptidase, UfSP1 peptidase, ElaD peptidase, RTX self-cleaving toxin, L,D-transpeptidase, gamma-glutamylcysteine dipeptidyl-transpeptidase, prtH peptidase, OTLD1 deubiquitinylating enzyme, OTU1 peptidase, ataxin-3, nairovirus deubiquitinylating peptidase, acid ceramidase precursor, LapG peptidase, lysosomal 66.3 kDa protein, McjB peptidase, DeSI-1 peptidase, USPL1 peptidase, scytalidoglutamic peptidase, pre-neck appendage protein, aminopeptidase N, angiotensin-converting enzyme peptidase unit 1, thimet oligopeptidase, oligopeptidase F, thermolysin, mycolysin, immune inhibitor A peptidase, snapalysin, leishmanolysin, bacterial collagenase V, bacterial collagenase H, matrix metallopeptidase-1, serralysin, fragilysin, gametolysin, astacin, adamalysin, neprilysin, carboxypeptidase A1, carboxypeptidase E, gamma-D-glutamyl-meso-diaminopimelate peptidase I, cytosolic carboxypeptidase 6, zinc D-Ala-D-Ala carboxypeptidase, vanY D-Ala-D-Ala carboxypeptidase, Ply118 L-Ala-D-Glu peptidase, vanX D-Ala-D-Ala dipeptidase, pitrilysin, mitochondrial processing peptidase beta-subunit, eupitrilysin, leucyl aminopeptidase, aminopeptidase I, membrane dipeptidase, glutamate carboxypeptidase, peptidase T, Xaa-His dipeptidase, carboxypeptidase Ss1, carnosine dipeptidase II, O-sialoglycoprotein peptidase, beta-lytic metallopeptidase, lysostaphin, methionyl aminopeptidase 1, aminopeptidase P, IgA1-specific metallopeptidase, tentoxilysin, aminopeptidase S, glutamate carboxypeptidase II, IAP aminopeptidase, aminopeptidase Ap1, aminopeptidase T, hyicolysin, carboxypeptidase Taq, anthrax lethal factor, deuterolysin, fungalysin, isoaspartyl dipeptidase, FtsH peptidase, glutamyl aminopeptidase, cytophagalysin, pappalysin-1, pox virus metallopeptidase, Ste24 peptidase, HtpX peptidase, Oma1 peptidase, dipeptidyl-peptidase III, S2P peptidase, sporulation factor SpoIVFB, archaelysin, D-aminopeptidase DppA, BlaR1 peptidase, prtB g.p., enhancin, glycyl aminopeptidase, IgA peptidase, StcE peptidase, PSMD14 peptidase, JAMM-like protein, AMSH deubiquitinating peptidase, peptidyl-Asp metallopeptidase, camelysin, murein endopeptidase, imelysin, Atp23 peptidase, tryptophanyl aminopeptidase 7-DMATS-type peptidase, ImmA peptidase, prenyl peptidase 2, Wss1 peptidase, microcystinase MlrC, PrsW peptidase, mpriBi peptidase, NleC peptidase, PghP gamma-polyglutamate hydrolase, chloride channel accessory protein 3, IMPa peptidase, MtfA peptidase, NleD peptidase, TYPE ENZYME, nodavirus peptide lyase, tetravirus coat protein, Tsh-associated self-cleaving domain, picobirnavirus self-cleaving protein, YscU protein, reovirus type 1 coat protein, poliovirus capsid VP0-type self-cleaving protein, intein-containing V-type proton ATPase catalytic subunit A, intein-containing replicative DNA helicase precursor, intein-containing chloroplast ATP-dependent peptide lyase, DmpA aminopeptidase, chymotrypsin A, glutamyl peptidase I, DegP peptidase, lysyl peptidase, streptogrisin A, astrovirus serine peptidase, togavirin, IgA1-specific serine peptidase, flavivirin, subtilisin Carlsberg, kexin, prolyl oligopeptidase, dipeptidyl-peptidase IV, acylaminoacyl-peptidase, glutamyl endopeptidase C, carboxypeptidase Y, D-Ala-D-Ala carboxypeptidase A, D-Ala-D-Ala carboxypeptidase B, D-Ala-D-Ala peptidase C, peptidase Clp, Xaa-Pro dipeptidyl-peptidase, Lon-A peptidase, cytomegalovirus assemblin, repressor LexA, signal peptidase I, signalase 21 kDa component, TraF peptidase, lysosomal Pro-Xaa carboxypeptidase, hepacivirin, potyvirus P1 peptidase, pestivirus NS3 polyprotein peptidase, equine arteritis virus serine peptidase, prolyl aminopeptidase, PS-10 peptidase, sobemovirus peptidase, luteovirus peptidase, C-terminal processing peptidase-1, tricorn core peptidase, penicillin G acylase precursor, dipeptidyl-peptidase 7, HetR peptidase, signal peptide peptidase A, protein C, archaean signal peptide peptidase 1, infectious pancreatic necrosis birnavirus Vp4 peptidase, dipeptidase E, sedolisin, rhomboid-1, SpoIVB peptidase, nucleoporin 145, lactoferrin, influenza A PA peptidase, EGF-like module containing mucin-like hormone receptor-like 2, Ssy5 peptidase, picornain-like cysteine peptidase, murein tetrapeptidase LD-carboxypeptidase, PIDD auto-processing protein unit 1, Tellina virus 1 VP4 peptidase, MUC1 self-cleaving mucin, dystroglycan, gpO peptidase, *Escherichia coli* phage K1F endosialidase CIMCD self-cleaving protein, White bream virus serine peptidase, prohead peptidase gp21, prohead peptidase, CARD8 self-cleaving protein, prohead peptidase gp175, destabilase, archaean proteasome, beta component, Hs1V component of HslUV peptidase, glycosylasparaginase precursor, gamma-glutamyltransferase 1, ornithine acetyltransferase precursor, polycystin-1, collagenase, protein P5 murein endopeptidase, Lit peptidase, homomultimeric peptidase, yabG protein, microcin-processing peptidase 1, AIDA-I self-cleaving autotransporter protein, and Dop isopeptidase.

In specific embodiments, the protease is papain, bromelain, AO protease, figin, rennet, protease type XXI from *Streptomyces griseus*, a protease from *Bacillus licheniformis*, a protease from *Aspergillus oryzae*, a protease from *Bacillus amyloliquefaciens*, a protease from *Aspergillus saitoi*, a thermolysin from *Bacillus thermoproteolyticus rokko*, Subtilisin A, protease type X, or a fungal protease type XIII.

In some embodiments, the enzyme is a lipase. The lipase can be any enzyme that catalyzes the hydrolysis of lipids. The lipase can break down fats and release fatty acids. The release of fatty acids can modulate the aroma, flavor profile, and texture profile of the resulting non-dairy cheese replica. The lipase may be derived from an animal source, or may be derived from a non-animal source. The animal source can be, e.g., a calf, a kid (goat), or a lamb. The non-animal source can be a plant source, or can be a bacterial source, a yeast source, or fungus. For example, the source can be from a *Lactococcus* species, a *Pseudomonas* species, an *Aspergillius* species, a *Penicillium* species such as *Penicillum roqueforti*, *Rhizopus*, a *Lactobacillus* species, a *Malassezia globusa* species, a *Mucor miehei* species, or a *Candida* species, e.g., *Candida rugosa*. The non-animal source can be a genetically modified organism that expresses a lipase.

The lipase can be a bile salt dependent lipase, a pancreatic lipase, a lysosomal lipase, a hepatic lipase, a lipoprotein lipase, a hormone-sensitive lipase, a gastric lipase, an endothelial lipase, a pancreatic lipase-related protein 2, a phospholipase, a pregastric esterase, or a pancreatic lipase related protein. Exemplary lipases are described in U.S. Pat. Nos. 3,973,042, 7,622,290, 7,666,618, 8,012,732, 7,931,925, 7,407,786, 7,052,879, and WIPO Patent Application No. WO/2004/113543, all of which are hereby incorporated by reference. Other exemplary lipases include, e.g., AK, Lipase G, Lipase PS, Lipase A, PC lipase and WG lipase.

The lipase can be a commercially available lipase. Exemplary lipases that are commercially available include Italase, often used to make mild-flavored cheeses such as, e.g., mozzarella, asiago, feta, provolone, blue cheese, and queso fresco, and Capilase, which is often used to make sharp-flavored cheese such as, e.g., provolone, romano, and parmesan cheese.

The added enzyme can account for 0.00001-0.005%, 0.001-0.01%, 0.01-0.1%, 0.05-1%, 0.1-2%, or 0.5-5% of the non-dairy cheese source by weight or volume. Preferably, the added enzyme can account for 0.00001-0.1% of the non-dairy cheese source by weight or volume.

In some embodiments, the protease is papain. In some embodiments, 0.001-0.01% of papain is added to the non-dairy cheese source. In particular embodiments, the non-dairy cheese source is a protein solution that comprises purified moong protein. In more particular embodiments, the protein solution with added protease is solidified by a heat/cool method. In some embodiments, addition of papain improves the softness and creaminess of the resulting non-dairy cheese replica.

In some embodiments, addition of one or more proteases improves texture by improving creaminess while maintaining stability of the cheese replica shape, e.g., the cheese replica remains firm enough to dice. In some embodiments, a non-dairy cheese replica prepared with added protease or lipase rates as significantly better in a blind taste test than a comparable non-dairy cheese replica made without protease or lipase. Proteases in some cases significantly improve the texture of the cheese due to an increase in creaminess of the cheese, as judged by blind taste testers. In some cases the proteases decrease the firmness of the cheeses, as determined by texture analyses. In some cases the proteases increase creaminess without decreasing the firmness of the cheese. In some cases the non-dairy cheese replicas comprise one or more added lipases but no added protease, while in other embodiments they replicas comprise one or more added lipases and one or more added proteases.

One or more enzymes can be contacted with the non-dairy cheese source before solidifying or after solidifying (before the whey is drained, or after the whey is drained). In some embodiments, the flavor and/or texture profile is altered depending on whether the enzyme(s) are added before or after solidifying. In some embodiments, the enzyme(s) are added during the solidification process. In some embodiments, addition of the enzyme(s) during the solidification process results in a non-dairy cheese replica with a softer texture than a comparable non-dairy cheese replica prepared by adding the enzyme(s) at another step in the cheesemaking process. In some embodiments, the enzyme(s) are added after solidification and after the whey is removed from the curd. In some embodiments, the non-dairy cheese source is a nut milk contacted with a controlled amount of bacteria, and one or lipases and/or proteases are added after solidifying but before the whey is drained. By way of example only, adding the enzyme(s) after the crosslinking step, while the curd is forming in a soft fresh cheese replica made with almond and macadamia milk with 0.47% transglutaminase, and 0.03% MA11 cultures resulted in a softer texture as compared to addition of the enzyme(s) before curdling has begun or after whey is drained from the curd. By way of other example only, addition of 0.004% rennet or 0.02% papain to the non-dairy cheese source before the non-dairy cheese source is curdled to a gel or after the whey is drained from the curd results in a firmer texture than when enzymes were added as the non-dairy milk is curdled.

In some embodiments, the addition of one or more proteases and/or one or more lipases can be used to enhance flavor notes in the resulting non-dairy cheese replica. The timing of adding the protease(s) and or lipase(s) at any step of the cheesemaking process (e.g., before solidification, after solidification but before whey is drained, or after whey is drained) can be adjusted to enhance desired flavor notes of the resulting cheese replica. Any of the flavor notes described herein can be enhanced by selecting individual protease(s) and/or lipase(s) and by controlling the timing of adding the protease(s) and/or lipase(s). The enhanced flavor notes can be due to the increased release of specific volatile compounds as described herein. In some cases the flavor profile of the non-dairy cheeses changed without changes in the texture of the cheese.

By way of example only, cheese replicas created with 0.02% papain added after solidifying (either before or after the whey was drained) was significantly rated as more buttery than cheese replicas created without proteases or cheese replicas created when the proteases were added before solidifying. By contrast, aspartic protease added before solidifying, produced the most butter flavor, but in all cases the amount of butter flavor was greater than the control without proteases. See Example 2. The addition of proteases can greatly increase the production of compounds that create the buttery flavor in dairy cheeses, including diacetyl and acetoin, as ascertained by GCMS.

In some embodiments, the protein solution is contacted with a controlled amount of microbes as described herein. In some embodiments, the protein solution is admixed with a non-dairy milk, or a cream fraction, or a skim fraction, or a mixture comprising an isolated cream and skim fraction. Exemplary non-dairy milks, cream fractions, skim fractions, and methods of making are described herein. In some embodiments, the protein solution is contacted with one or more enzymes. In some embodiments, the one or more enzymes comprise a protease and/or lipase. Exemplary proteases and lipases are described herein.

In another aspect, the invention provides a non-dairy cheese replica and methods of preparing the same, comprising isolating a cream fraction, and solidifying the cream fraction. In some embodiments, a cheese replica may be made from about 0.1.%, 0.2%, 0.3%, 0.4%, 0.5%, 0.75%, 1%, 2%, 3%, 4%, 5%, 7.5%, 10%, 12.5%, 15%, 17.5%, 20%, 30%, 40%, 50%, 60%, 70%, 80%, 90%, more than 90%, or 100% cream fraction. In some embodiments, a cheese replica may be made from about 0.1-1%, 0.5-5%, 2-10%, 5-15%, or 10-20%, 15-30%, 20-50%, 30-60%, 50-80%, 60-90%, or 80-100% cream fraction.

The method may further comprise adding controlled amounts of one or more fats to the non-dairy cheese source to create an emulsion.

By way of example only, some non-dairy cheese replicas were prepared by adding 0%-50% fat to the non-dairy cheese source to create the emulsion, then solidifying the emulsion by protein denaturation, e.g., by heating. In some embodiments, the controlled amounts of one or more fats are added before solidifying, or after solidifying. In some embodiments, the controlled amount of one or more fats are added after solidifying and after draining the whey. By way of other example only, some cheese replicas made from protein denaturation have 0% to 50% fat added after solidification by denaturation, or 0% to 50% fat added after draining the whey. After the formation of a gel either protein denaturation or crosslinked, whey can be drained to increase the total fat in the cheese replica, further draining and aging the cheese can reduce the moisture content to increase the total fat of the cheese replicas.

In some embodiments, the addition of 5-20% unsaturated fats to enzyme crosslinked gels increased the firmness of the gel.

In some embodiments, addition of saturated fats from 5%-50% increased the firmness of the cheese replicas.

In some embodiments, cheese replicas made with cream fraction have an improved texture profile characterized by increased firmness significantly enhanced creaminess, as compared to cheese replicas made without any fat or with unsaturated or saturated oil added. The use of fat decreases the moisture content of the cheese.

In some embodiments, the type of fat added to the cheese replicas also determines the fat retention in the heat cool cheeses and crosslinked cheeses. The cheese replicas can be made with controlled fat retention through aging and heating by using different fat types and different forms of fats. The amount of fat retention was also dependent of the types of proteins in the cheese gels, for example pea-globulins has greater fat retention than the same amount of soy protein.

In some embodiments, cheese replicas made with the addition of fats, can also modulate the melt-ability of the cheese. The addition of fat can cause a greater change in viscosity when the non-dairy cheese is heated.

Modulating Taste/Texture/Melting Profile by Adding Salts or Divalent Cations

In dairy cheese, the interaction of calcium ions with casein molecules control the physical properties of the cheese. However, in non-dairy cheeses, no casein is present, so the impact of adding divalent cations to non-dairy cheeses and the impact of adding melting salts are unknown. It was found that the physical properties of the cheese replica can be further controlled by adding mono or divalent cations, e.g., $Fe^{2+}$, $Mg^{2+}$, $Cu^{2+}$, or $Ca^{2+}$ (e.g., $CaCl_2$, $CaSO_4$), adding melting salts such as, e.g., sodium citrate, trisoidum phosphate, sodium hexameta phosphate, or disodium phosphate, or any combination thereof. The cation can be added to the non-dairy cheese source at any stage of the cheesemaking process, such as, e.g., before solidifying, after solidifying, or after draining the whey. Cations can be added at the same time as melting salts or at different times.

In heat/cool gels, divalent cations, e.g., $CaCl_2$, and/or $CaSO_4$ at 0.01% to 5% concentration can be added to a non-dairy cheese source. Exemplary non-dairy cheese sources include, e.g., non-dairy cream fractions, purified proteins, non-dairy milks, e.g., nut milks, protein fat emulsions, or any combination thereof. The resulting cheese replica exhibited improved meltability upon heating as compared to a comparable cheese replica made without the addition of divalent cations and/or melting salts. The improved meltability was characterized by reduced granulation, increased viscosity and increased expansion of the surface area upon heating. For example, a heat cool cheese replica made from 6% soy (7S and 11S), 0.03% MA11, and 1% glucose, did not melt. However, the addition of 1% melting salts (sodium citrate, trisodium phosphate, sodium hexameta phosphate, and/or disodium phosphate) after draining the whey, caused the resulting cheese replica to melt. For the above example, the addition of sodium hexamet phosphate had the greatest affect. In addition, even greater melting can be seen with the addition of divalent cation like $CaCl_2$ added with the emulsion before heat cooling.

Impact of Divalent Cations on Creaminess

Adding divalent cations also can improve the texture profile of a cheese replica. For example, adding 1 mM $CaSO_4$ to cheese replicas prepared from a protein solution of pea globulins before crosslinking with 0.5%-2% transglutaminase improved creaminess as compared to a comparable cheese replica made without addition of $CaSO_4$. This effect of $CaSO_4$ on creaminess was also observed with nut milk based cheeses and cheeses made from a RuBisCo protein solution.

Melting salts added to non-dairy cheeses also can modulate the firmness of the resulting cheese replica. Melting salts added before or after solidifying by heat cooling increases the firmness of the resulting cheese replica. In some cases, adding melting salts can cause a cheese replica that has been melted to become solid at room temperature. Melting salts added to non-dairy cheese replicas therefore can be used to improve the melting profile of a firmer cheese replica. For example, a protein denaturation cheese replica made with 4% moong protein, 30% palm oil, 1% glucose, and 0.03% MA11 resulted in a soft gel at room temperature that becomes liquid upon heating. When 3% sodium citrate is added to this cheese and heated, the cheese shows an increase in viscosity change, indicating an increase in melting and upon cooling forms a firmer cheese at room temperature.

It is understood that the invention provides methods of controlling the flavor profile, texture profile, melting profile, and/or stretching profile of a non-dairy cheese replica by selecting a specific combination of the following compositions and methods as described herein: non-dairy cheese source, method of solidifying, addition of one or more microbes, addition of one or more proteases and or lipases, addition of one or more fats, addition of one or more melting salts and/or cations, and varying the timing of adding microbes, fats, melting salts, proteases, lipases, or cations at specific stages of the cheesemaking process. Specific embodiments and examples are described herein.

Methods of Solidifying

In another aspect, the invention provides cheese replicas and methods of making the same. In some embodiments, the method comprises solidifying a non-dairy cheese source (e.g., a non-dairy milk) (e.g., forming a gel). In some embodiments, the non-dairy milk is capable of retaining a shape after said solidifying. There are many ways in which the non-dairy cheese source can be solidified, including using enzymes, heat denature, forming cold gels, forming coacervate, liquid separation, acids, change in ionic strength, high pressure processing, solvents, chaotropic agents, or disulfide bond reducers as described in this section.

Enzymes (or chemicals) can be used to crosslink non-animal (e.g., plant based) proteins or non-dairy cream fractions, with or without emulsified fats or oils, sugars, and cultures. The resulting crosslinked cheese-replicas can have bacteria cultures added or not, and the timing of addition can be either before or after the crosslinking step. In some embodiments, solidifying involves a process of cross-linking components (e.g., polypeptides, also referred to as proteins herein) in the non-dairy cheese source. In some embodiments, cross-linking comprises contacting the non-dairy cheese source with a cross-linking enzyme, thereby creating crosslinks between polypeptide chains. The cross-linking enzyme can be a transglutaminase, tyrosinase, lipoxygenase, protein disulfide reductase, protein disulfide isomerase, sulfhydryl oxidase, peroxidase, hexose oxidase, lysyl oxidase, or amine oxidase.

In some embodiments, the cross-linking enzyme is a transglutaminase. Transglutaminases are a family of enzymes that catalyze the formation of a covalent bond between a free amine and the gamma-carboxyl group of glutamine thereby linking proteins together. For example, transgluaminases catalyze crosslinking of e.g., lysine in a protein or peptide and the gamma-carboxamide group of a protein- or peptide-glutamine residue. The covalent bonds formed by transglutaminase can exhibit high resistance to proteolytic degradation.

Many types of transglutaminase can be used in various embodiments of the invention. Acceptable transglutaminases for crosslinking include, but are not limited to, *Streptoverticillium mobaraense* transglutaminase, an enzyme that is similar to a transglutaminase from *Streptoverticillium mobaraense*, other microbial transglutaminases, transglutaminases produced by genetically engineered bacteria, fungi or algae, Factor XIII (fibrin-stabilizing factor), Keratinocyte transglutaminase (TGM1), Tissue transglutaminase (TGM2), Epidermal transglutaminase (TGM3), Prostate transglutaminase (TGM4), TGM X (TGM5), TGM Y (TGM6), TGM Z (TGM7), or a lysyl oxidase.

The timing of adding the cultures, the type of cultures, and amount of cultures change the pH of the emulsion, and therefore the activity of transglutaminase and the final texture of the cheese. In addition, changing the pH of the solution with the addition of acid or base, and overall buffering capacity of the emulsion alters the crosslinking ability and the final texture of the cheese-replica.

In some embodiments the present invention provides for a composition comprising a non-dairy milk and a *Streptoverticillium mobaraense* transglutaminase, an enzyme is similar to a transglutaminase from *Streptoverticillium mobaraense*, other microbial transglutaminases, transglutaminases produced by genetically engineered bacteria, fungi or algae, Factor XIII (fibrin-stabilizing factor), Keratinocyte transglutaminase (TGM1), Tissue transglutaminase (TGM2), Epidermal transglutaminase (TGM3), Prostate transglutaminase (TGM4), TGM X (TGM5), TGM Y (TGM6) and/or TGM Z (TGM7). In some embodiments the enzyme used for cross-linking is not Factor XIII (fibrin-stabilizing factor), Keratinocyte transglutaminase (TGM1), Tissue transglutaminase (TGM2), Epidermal transglutaminase (TGM3), Prostate transglutaminase (TGM4), TGM X (TGM5), TGM Y (TGM6), TGM Z (TGM7), or lysyl oxidase.

Transglutaminases can be produced by *Streptoverticillium mobaraense* fermentation in commercial quantities or extracted from animal tissues. Additionally, a transglutaminase (TGM) of the present invention may be isolated from bacteria or fungi, expressed in bacteria or fungi from a synthetic or cloned gene. In some particular embodiments, a transglutaminase is obtained from a commercial source, for example in the form of Activa™ from Ajinmoto Food Ingredients LLC.

In some embodiments, a transglutaminase is added at an amount between 0.0000001-0.001%, 0.0001-0.1%, 0.001-0.05%, 0.1-2%, 0.5-4%, or greater than 4% by weight/volume. In some embodiments, a transglutaminase is added at amounts greater than 0.1% and up to 10%.

In some embodiments, cross-linking by a transglutaminase can be done at temperatures ranging from 10-30° C., 20-60° C., 30-70° C., or 50-100° C. Transglutaminase cross-linking can occur for 10 minutes-24 hours.

In some embodiments between 0.1 and 20 units (U) of transglutaminase is added per 1 mL of non-dairy milk. In some embodiments about 0.1, 0.5, 1, 1.5, 2, 2.5, 3, 5, 7, 10, 15, or 20 U of transglutaminase is added per 1 mL of non-dairy milk. In some embodiments after the transglutaminase is added, a heated incubation occurs, for example in a 100° F. water bath. The heated incubation can be at a temperature optimized for the enzyme function. In some embodiments the temperature is about 65, 70, 75, 80, 85, 90, 95, 100, 105, 110, 115, 120 or 125° F. In some embodiments, enzymatic cross-linking does not comprise contacting the non-dairy cheese source with glutaminase and transglutaminase. Transglutaminase crosslinking has been done at room temperature, and up to 65° C., for 10 minutes to 24 hours.

In some embodiments, solidifying comprises inducing protein denaturation. In some embodiments, denaturation is induced by heating the mixture, followed by cooling the mixture. In some embodiments, denaturation is induced by heating the mixture to a temperature between 30-35, 32-40, 37-45, 40-50, 45-55, 50-60, 55-65, 60-70, 65-75, 70-80, 75-85, 80-95, 90-100° C., or above 100° C. In some embodiments, denaturation is induced by heating the mixture for about 10-20, 15-30, 25-40, 30-50, 40-70 seconds or about 1-3, 2-5, 3-8, or 5-20 minutes. In some embodiments, the mixture is allowed to cool after heating. For example, proteins (e.g, purified or fractionated plant proteins such as from peas, moong, soy, RuBisCO, etc), preferably at concentrations >1%, can be homogenized with oils (such as canola oil, sunflower oil, palm oil or oil bodies from seeds such as sunflower) at 0.1-60% concentration. The emulsion can be subjected to a heat-cool cycle wherein it is heated to a temperature of 45-100° C. for 5-60 minutes and then cooled to less than 30° C. (e.g., 20-25° C.). The resulting gel can be incubated at a temperature ≤30 C., preferably for 2-16 hours and then drained through cheesecloth. The drained curds are ready to be shaped and aged or processed further by heating or pressing.

In some embodiments, solidifying comprising forming a coacervate using one or more plant proteins. Coacervation is the process during which a homogeneous solution of charged polymers undergoes a phase separation to result in a polymer-rich dense phase (the 'coacervate') and a solvent-rich phase (supernatant). Protein-polysaccharide coacervates have been used in the development of biomaterials. See, for example, Boral and Bohidar (2010) *Journal of Physical Chemistry B*. Vol 114 (37): 12027-35; and Liu et al., (2010) *Journal of Agricultural and Food Chemistry*, Vol 58:552-556. Formation of such coacervates is driven by associative interactions between oppositely charged polymers. However, as described herein, coacervates can be formed using proteins (e.g., plant proteins comprise one or more pea proteins, chickpea proteins, lentil proteins, lupine proteins, other legume proteins, or mixtures thereof). In general, a coacervate can be formed by acidifying a low ionic strength solution (e.g., a buffered solution at or below 100 mM sodium chloride) comprising one or more isolated and purified plant proteins such as pea legumins or vicilins (e.g., a vicilin fraction comprising convicilins), a combination of both vicilins and legumins, or unfractionated pea proteins to a pH of 3.5 to 5.5. (e.g., pH 4 to 5). Under these conditions, the proteins separate out of solution and the mixture can be centrifuged to cleanly separate out the coacervate. This coacervate, unlike a precipitate, is a viscous material that can be stretched by pulling and that melts on heating. The process can be carried out in the presence of oils (up to 40%, e.g., palm or other oil), to form a creamy material. By varying the composition of the solution (ratio of vicilin:legumin, type and amount of oil used) the properties, such as melting and rheology, of the coacervate can be tuned as desired. Further, emulsifying salts such as disodium phosphate or trisodium pyrophosphate can be included in the initial mixture prior to acidification to improve flow characteristics of the coacervate (make less viscous, likely due to increased water retention in the coacervate). The resulting coacervate may be used as-is or in cheese replicas or processed further by cross-linking of proteins, or subjected to a heat-cool cycle or high pressure processing to obtain a firmer cheese replica. and used, for example, to prepare cheese replicas with stretching properties, or to prepare firm cheese replicas.

In some embodiments, solidifying comprises forming a cold set gel to avoid denaturation or the breakdown of any heat-labile components (e.g., volatile flavor molecules such as diacetyl can be lost from the food matrix upon heating; lactic acid bacterial cultures commonly used to coagulate milks and/or impart flavor as cheeses age will not survive the heating step). Hence, processes that can induce gelation without heating of such labile components are important in the development of cheeses. See, Ju and Kilara A. (1998) *J. Food Science*, Vol 63(2):288-292; and Maltais et al., (2005) *J. Food Science*, Vol 70 (1): C67-C73) for general methodologies for forming cold set gels. In general, cold set gels are formed by first heat denaturing a protein solution below its minimum gelling concentration (dependent on pH and type of protein, typically <8% (w/v) at pH 6-9 for globular plant proteins such as pea proteins). The protein solution can be heated to a temperature above the denaturation temperature of the protein under conditions where it does not precipitate out of solution (0-500 mM sodium chloride, pH 6-9). The solution can be cooled back to room temperature or below, and any heat-labile components (including fats at 0-50% (v/v), flavor compounds, enzymes, and bacterial cultures) that need to be incorporated into the gel can be added just prior to the addition of salt. Gelation can be induced by increasing the ionic strength using, for example, calcium chloride or sodium chloride (e.g., 5-100 mM), and incubating at or below room temperature to allow for gel formation (typically minutes-hours). The concentration of the salt needed to induce gel formation is dependent on the nature of the protein, its concentration, and the pH and ionic strength of the solution. The resulting gel is a soft material, with a yogurt-like texture, that can be used as a cheese replica as-is or processed further to obtain other cheese replicas.

Additional denaturation procedures are possible in additional embodiments of the invention. Acids, change in ionic strength, high pressure processing, solvents, chaotropic agents, or disulfide bond reducers can be used to denature the proteins in the non-dairy cheese source. In one embodiment urea is added to the non-dairy cheese source to form curds.

In some embodiments, solidifying results in the formation of solid curds and whey (resulting liquid that remains after curd is formed). In some embodiments, the curds are separated from the whey.

In some embodiments, solidifying comprises a combination of two or more methods. For example, solidifying can include crosslinking proteins and denaturation by heating followed by cooling. For example, a cold set gel can be crosslinked with transglutaminase to yield firmer gels or combined with other proteins such as soy, pea-legumins, pea-albumins, crude protein fraction from chick peas and lentils or materials (for example, fats or pea protein coacervates) to increase firmness and/or meltability.

In some embodiments, the non-dairy cheese source can be subjected to a shearing force during said solidifying. Said shear force can be used to cause protein components in said non-dairy cheese source to align, forming anisotropic fibers. Said formation of anisotropic fibers can be useful in creating a stretch cheese.

Formation of Gels by Crosslinking Proteins

In some embodiments, the cheese replica comprises a cross-linking enzyme. In some embodiments, the cross-linking enzyme is used to solidify the non-dairy cheese source into a gel equivalent to a cheese curd. See the above section re solidifying gels.

For example, a method is provided for preparing a non-dairy cheese replica, comprising isolating and purifying a soy protein (7S and 11S), moong, pea-globulin, pea albumins, pea vicilins, pea legumins, late embryogenesis abundant proteins such as dehydrins, lentil proteins, chickpea proteins, oleosins, RuBisCo, prolamins (including but not limited to pea, corn and sorghum), proteins with or without fat emulsions, and non-dairy cream fractions create cross-linked gels that are cheese-replicas, or any combination thereof, preparing a protein solution comprising any combination of said isolated and purified proteins, and cross-linking the proteins in the solution using transglutaminase. In some embodiments, the soy proteins are used as isolated fractions, such as the 2S globulins, the 7S globulins or the 11S globulins. In some embodiments only the 7S globulins are used as the soy protein.

For example, cross-linked non-dairy cheese replicas can be created using a protein solution comprising soy protein alone ranging from 0.65% or higher weight/volume, using pea-globulin alone, moong bean protein alone, pea-prolamin, or RuBisCo protein alone ranging from 1% or any higher weight/volume.

As another example, cross-linked non-dairy cheese replicas can be created using a protein solution comprising more than one isolated and purified protein. For example, cross-linked non-dairy cheese replicas can be made using soy (7S and 11S) plus peas-globulin (pea-G), or soy (2S, 7S and 11S) plus RuBisCo. In some embodiments, the ratio of soy (2S, 7S and 11S)/pea-globulin or soy (2S, 7S and 11S)/RuBisCo can be about 1:5, 1:4, 1:3, 1:2, 1:1, 2:1, 3:1, 4:1, 5:1. Cross-linked non-dairy cheese replicas can be made with a total protein amounts greater than 1%, at all possible ratios of the two proteins, including but not limited to 1% soy:4% pea-G, 2% soy:4% pea-G, 2% soy:6% pea-G, 4% soy:2% pea-G. Cross-linked non-dairy cheese-replicas can be made with soy (2S, 7S and 11S) plus RuBisCo with a total protein amounts greater than 1%, at all possible ratios of the two proteins. In some embodiments, the ratio of moong globulins/soy (7S and 11S) can be about 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, or 10:1. Cross-linked non-dairy cheese-replicas can be made with moong globulins plus soy (2S, 7S and 11 S) with a total protein amounts greater than 1%, at all possible ratios of the two proteins, including but not limited to 4% moong:1% soy, 4% moong:2% soy, 2% moong:4% soy, 6% moong:1% soy, 6% moong:2% soy, 8% moong:1% soy, 8% moong:2% soy, and 10% moong:1% soy. Cross-linked non-dairy cheese replicas can be made with moong protein plus peas-globulin. In some embodiments, the ratio of moong protein/pea-G can be about 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, or 10:1. In some embodiments, the non-dairy cheese replica can be made with a total protein amounts greater than 1%, at all possible ratios of the two proteins, including but not limited to 2% moong:4% pea, 4% moong:2% pea, 4% moong:4% pea, 6% moong:2% pea. Cross-linked non-dairy cheese-replicas can be made with any combination of plant based proteins, including total isolated protein, and fractioned protein with a total protein concentration of 1% or greater. Other examples of proteins used to made cheese replicas including prolamins, late embryonic abundant proteins that can be used alone or in combination of the above proteins.

In some embodiments, the cheese replica is made using cream fraction as a non-dairy cheese source, cross-linked by enzymatic cross-linking or by denaturation. For example, cross-linked non-dairy cheese-replicas have been made with cream fraction alone from 5% to 100%. Cheese replicas made from crosslinking the cream fraction can be modulated by the purification method of the cream fraction. For example, sunflower cream fraction purified with a high pH wash, crosslinks very well, forming firm curd that is white. In other cases, purification of the sunflower cream fraction from a urea wash, does not crosslink well, and more cross-linking enzyme or more cream fraction is required for curd formation. In even another case, sunflower cream fraction washed only at pH 7, can result in a green/brown colored cheese.

In some embodiments, the cheese replica is made using a non-dairy cheese source that comprises a cream fraction and a protein solution comprising one or more isolated and purified proteins. Cross-linked non-dairy cheese-replicas can be made with purified proteins and cream fraction. Cross-linked non-dairy cheese-replicas can be made with soy plus sunflower cream fraction, with amounts including but not limited to 0.6% soy (7S and 11S):20% cream, 2% soy (7S and 11S):20% cream, 4% soy (7S and 11S), 20% cream, 2% soy (7S and 11S):10% cream, 4% soy (7S and 11S):10% cream, and 4% soy (7S and 11S):30% cream. Cross-linked non-dairy cheese-replicas can be made with pea globulins plus cream, with amounts including but not limited to 4% pea globulins: 20% cream, 7% pea globulins: 20% cream, 7% pea globulins:10% cream, 4% pea globulins:10% cream, 10% pea globulins:20% cream. Cross-linked non-dairy cheese-replicas can be made with moong plus sunflower cream, with amounts including but not limited to 4% moong:20% cream, 6% moong:20% cream, 8% moong:20% cream, 8% moong:10% cream. Cross-linked non-dairy cheese-replicas can be made with multiple purified proteins plus cream fraction, for example 2.5% pea globulins:3% soy (7S and 11S):20% sunflower cream, 2% pea globulins:4% soy (7S and 11S):20% sunflower cream, 6% pea:2% soy (7S and 11S):10% sunflower cream fraction. Cheese-replicas made with purified proteins plus the addition of cream fraction can have an improved creamy texture as compared to cheese-replicas made with purified proteins alone or made with the cream fraction alone. For example, a cheese-replica made with 4-8% pea globulins plus 10-20% cream fraction, cross-linked by transglutaminase, results in a firm but creamy non-dairy cheese replica as compared to a comparable non-dairy cheese replica created with only purified proteins or the cream fraction alone, both of which result in a more granular cheese replica. Cheese-replicas made with purified proteins plus the addition of cream fraction can also hold oil well through aging. Such replicas can exhibit minimal to no oil leakage in aging studies lasting a week or more. By contrast, cheese replicas prepared from crosslinked washed cream fraction alone are firm and hold a cheese form, are able to be diced, but may exhibit oil leakage with aging. Surprisingly, it was found that addition of one or more isolated and purified proteins, even trace amounts of isolated and purified proteins lower than 1%, significantly minimizes oil leakage from the resulting cheese replica, as compared to a cheese replica made using cream fraction alone. Addition of 0.65% wt/volume or more of isolated and purified proteins to the cheese replica can significantly minimize oil leakage as compared to a replica that does not comprise isolated and purified proteins.

The invention also provides methods of creating a non-dairy cheese replica with improved melting profile. Some currently available non-dairy cheeses exhibit poor melting capabilities. Instead of exhibiting smooth melting, the non-dairy cheeses often curdle during heating and are unable to melt smoothly. In some embodiments, the method comprises solidifying a non-dairy cheese source by denaturation. By way of example only, the property of meltability can be imparted to cheese replicas prepared by mixing protein solutions mixed with one or more fats into an emulsion, then solidifying the emulsion by denaturation. Exemplary methods of denaturation are described herein. In some embodiments, a protein solutions, preferably at concentrations >5% protein, is homogenzied with one or more oils at a concentration between 0.1-60%. The resulting emulsion can be subjected to a heat-cool cycle wherein it is heated to a temperature of 45-100 C. for 5-60 minutes and then cooled back. The gel can be incubated at a temperature <=25 C., preferably for 2-16 hours and then optionally drained through cheesecloth. In some embodiments, the drained curds are ready to be shaped and aged or processed further by heating or pressing.

As described herein, unfractionated pea globulins do not form reversible gels between pH 4-9 and NaCl concentrations 0-1M. However, once fractionated (to >90% purity as judged by gel electrophoresis) into vicilin (+convicilin) and legumin, these proteins can form reversible gels under certain conditions. Once purified (to >90% purity as determined by gel electrophoresis), the 7S and 11 S proteins from peas could be used to obtain meltable gels under certain pH and NaCl conditions. Purified pea-7S proteins could be induced to form a meltable gel at pH7, 100 mM NaCl. On the other hand, purified pea-11S proteins formed meltable gels between pH 7-9 when NaCl concentration was 300 mM.

In some cases, cheese-replicas comprising proteins from plants sources other than soybeans (such as moong bean globulins, pea proteins etc) can be induced to form meltable gels by using them in combination with soy (7S and 11 S). The mixture, preferably at total protein concentrations of >5% (comprising >0.2% soy proteins) can then be emulsified with various oils or oil bodies and then taken through the heat-cool cycle described above (e.g., heating to 95° C. and cooling back to 25° C.) to form meltable gels. Melting salts are useful for helping form the meltable gel, as well as retaining meltability for specific protein+ oil mixture (depending on protein, not oil).

In some embodiments, the gels can be inoculated with microbial cultures to improve flavor, texture and/or appearance of the cheese-replica. Microbes, such as bacterial cultures (such as, e.g., *Lactococci, Lactobacilli, Streptococci*, and *Propionii* bacteria) or molds (such as *Penicillium*, or *Geotrichum*) can be added at 0-1% concentration to the non-dairy cheese source. The microbes can be combined with 0.5-3% sugars (such as glucose, fructose, maltose, sucrose etc) at any point during the cheese-making process. In some embodiments, the microbes and optionally sugars are added to the protein-fat emulsion during the cool-down phase of the heat-cool cycle, preferably when the mixture is at or below 40 C. The mixture can be held at this temperature for 1 hr and then cooled further before draining and shaping.

The meltability of the curds formed by denaturation, e.g., by a heat/cool cycle can also be modulated by adjusting the pH and/or ionic strength of the protein mixture. For example, protein solutions, preferably at concentrations >5%, can be induced to form meltable gels by heat-cool cycling (heating to 45-100 C. and then cooling down to <=30 C.) by maintaining pH of the solution between 3-9 and an ionic strength between 0-0.5M sodium chloride.

The appearance of curds formed by heat-cool method can also be modulated by pH and ionic strength of the solution. By way of example only, a solution of moong 8S globulins comprising 200 mM sodium chloride and kept at pH 8-9 form opaque curds greyish in color. However, when the ionic strength of the solution is lowered (50 mM sodium chloride), the appearance of the gel changes to a translucent white-light grey.

In some embodiments, various combinations of the heat-cool method and crosslinking (TG) are used to modulate the appearance, texture and meltability of the cheese-replicas. For example, a solution of 6% soy (7S and 11 S) can be subject to the heat-cool method to obtain curds that readily and reversibly melt. In addition, if transglutaminase (0.1%) is added to the curd at during the cool down phase, preferably at 40 C., the resulting curds are more granular in appearance and melt more controllably.

Stretching:

In some embodiments, the cheese replica is made to form stretchy strings upon heating ("stretchy cheese replica"). A stretchy cheese replica can be made, for example, by using mixtures that comprise isolated and purified plant proteins such as, e.g., pea, moong and soy globulins, albumins, prolamins (zeins, pea prolamins) and late embryonic stage abundant proteins (LEAs). Sources of these proteins include, by way of example only, cereal grains including, e.g., barley, wheat, legumes such as, e.g., moong, plants from the *Arabidopsis* genus, and *S. cereviseae*. These proteins can be used at varying concentrations, preferably >5%, in solution. The protein solution can be mixed with 0-60% fat to create an emulsion. In some embodiments, the protein solution comprises isolated and purified prolamins. In some embodiments, the prolamins are isolated from peas. The addition of these prolamins increases stretching.

The emulsion can be solidified by crosslinking or by heat-cooling or a combination of both crosslinking and heat-cooling. In some cases, 0-2% melting salts are used to improve meltability of the gels. In some cases, 0-1% microbial cultures could be added to improve texture and flavor of the cheese-replicas.

The stretchy cheese replica can be prepared using a number of non-dairy cheese sources, including but not limited to non-dairy cream fractions, purified proteins, non-dairy milk, e.g., nut milks, protein solutions comprising one or more isolated and purified proteins, emulsions of isolated proteins and isolated fats, or any combination thereof. In some embodiments, the non-dairy cheese source is a non-dairy milk isolated from plant sources with isolated and purified pea prolamin proteins, zein (purified corn prolamins) added therein. In some embodiments, the pea prolamins are added to achieve a concentration of 0.1-10%, or 0.5-8%. The addition of pea prolamins or zein to the non-dairy milk can improve stretchability of the resulting cheese replica, as compared to a cheese replica made with just non-dairy milk.

In some embodiments, stretching in cheese replicas can be improved by incorporating oacervates. Coacervates may be used as-is to form stretchable cheeses, or combined with other proteins with/without use of crosslinking enzymes such as transglutaminase to form cheese replicas with stretching properties.

Stretching also can be increased by adding starches, including but not limited to xanthan gum, carrageenan, cassia gum, konjac gum, methylcellulose and hydroxypropyl methylcellulose, hydroxypropyl, alginates, guar, locust bean gum, pectin and gum arabic. The gum may be added to achieve a final concentration of 0.01-4%, or 0.05-2%. In some embodiments, the gum is xanthan gum. Additing xanthan gum to the non-dairy cheese source can increase the stickiness of the curd after solidifying, which thus can increase the stretchability of the resulting cheese replica. Xanthan gum added from 0.05% to 2% to plant based emulsions including but not limited to non-dairy cream fractions, purified proteins, nut milks, protein fat emulsions, or a mixture of these components, increased the stickiness of the curd, allowing for the cheese to stretch. The addition of xanthan gum can increase stretching of an otherwise non-stretching cheese replica, or can increase the stretching of a stretchy cheese replica.

Hard Cheeses

In another aspect, the invention provides a method of preparing a firm cheese replica that mimics the texture, flavor, and firmness of a hard cheese, such as parmesan or Cheddar. In some embodiments, a non-dairy milk is inoculated with thermophilic bacteria cultures before solidifying into a gel. The temperature may be increased during the solidification to allow the curd to release more whey. The curd can be cut into smaller pieces, e.g., ½ inch squares. The smaller pieces can be allowed to acidify. The smaller pieces can be allowed to solidify for 10 minutes while still suspended in their own whey. After acidification, the curd can be broken into smaller pieces, e.g., pea-sized pieces by, for example, whisking. The temperature of the whey/coagulum can be increased by 2 degrees every five minutes until a desired curd temperature is reached. The desired internal temperature can be 50-200° F. The curd can be stirred, e.g., every 10 minutes to prevent reaggregating. The temperature can be raised to 125-130° F. The curds can be separated and drained to form a hard cheese replica. The hard cheese replica can optionally be aged.

The cheese replicas may be ripened in a way similar to traditional cheese. For example, surface mold may be allowed to grow to create a rind. In order to create a rind or color, the process may introduce certain bacteria to the cheese replicas in the ripening process. By way of example only, *Brevibacterium linens* can be introduced to produce an orange color and pungent aroma to the cheese replica.

In some embodiments, the cheese replica can have edible materials added (e.g. herbs, pepper, spices) on its surface to enhance flavor or add to the visual appeal of the product. In some embodiments the edible materials are embedded in the cheese replica.

The cheese replicas may be modified to have or not have a rind, may be coated in wax, and may have craters or veins typical to blue cheese. The cheese replicas may be spreadable, such as cream cheese. The cheese replicas can contain flavor additives, for example: truffle, mushrooms, nuts, herbs, chives, and other flavors.

In some embodiments, the cheese replica can be shaped. For example the cheese replica can be shaped in a basket or a mold. In some embodiments the cheese replica is pressed, for example with a weight. The pressing can help expel any additional liquid from the cheese replica.

In some embodiments the production of the cheese replica includes a waxing step. In one embodiment the waxing procedure is as follows: Cut food-grade paraffin wax into ½-inch pieces. Place in double boiler and heat wax to 210° F. Place cheese replicas in standard freezer for fifteen minutes to reduce temperature of cheese replicas to 33° F. Using 3-grams of melted wax per piece, brush wax onto cheese replicas one side at a time. Placed waxed cheese replicas onto clean waxed paper on aging racks. Age waxed cheese replicas in aging room at 36° F. with 75% humidity, for example for six months. In some embodiments the aging room is between 33-70° F. In some embodiments the humidity of the aging room is altered to aid in rind formation. In some embodiments the waxed cheese is stored for years, for example for 2 years or more.

In some embodiments the production of the cheese replica includes a smoking step. In some embodiments the cheese replica is cold smoked. In some embodiments the cheese replica is smoked at the curd stage or prior to the curd stage. In some embodiments the cheese replica is smoked after the cheese replica is formed. In some embodiment the smoking procedure is as follows: Soak wood chips for six hours. Drain chips of all water and place in smoking unit. Ignite smoker and as soon as chips have fully ignited, snuff out flames to create smoke-filled unit. Place cheese replicas on racks in smoker for five minutes per side. Remove from smoker and place on cooling racks. Place cheese replicas in cooling room for 24 hours, at 36° F. In various embodiments smoking times and cooling times and temperatures will be adjusted according to the particular cheese replica and particular desired taste profile.

EXAMPLES

Example 1: The Use of Enzymes to Improve Non-Dairy Cheese Replica Texture

Soft ripened (SR) cheese replicas were created with proteases and lipases added at different time points and evaluated for the ability of the proteases and lipases to modulate the texture of the replicas. Eighteen cheese replicas were made with pasteurized almond and macadamia nut milk (see Example 20). The nut milk was cultured with 0.03% MA11, 0.15% Flora Danica, 0.0045% *Geotrichum candidum*, 0.009% *Penicillium candidum*, and 0.007% *Debaryomyces hansenii* cultures, then crosslinked with 0.5% transglutaminase (ACTIVA TI, from Ajinomoto). Five different combinations of a protease and/or a lipase were examined, along with three controls without protease or lipase as follows: A=papain 0.02%, B=Fromase™ (an aspartic protease from *Rizomucor* with a similar specificity to chymosin from rennet), 0.004%, C=papain 0.01%+Fromase™ 0.002%, D=papain 0.02%+Lipase G 0.001%, E=papain 0.01%, PC lipase 0.0001% and F=control. The proteases and lipases were added at these three times: (i) with the cultures, (ii) after crosslinking had started (after TG hour), and (iii) after draining the whey.

Figure 2:
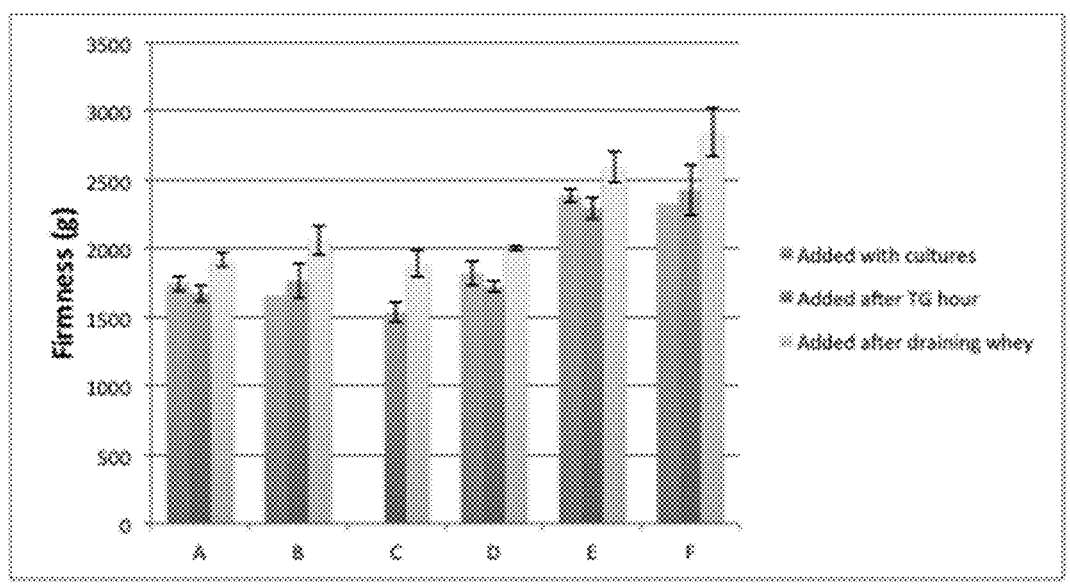
FIG. 2 is a bar graph of the average firmness of each of the soft ripened cheeses with the addition of proteases, as determined by the texture analyzes.

The cheese replicas were evaluated by blind taste testers and by texture analysis (see FIG. 1 and FIG. 2.). The tasters rated the cheese replicas from 1-5 as follows: 1: too soft, 2: creamy yet stays intact (e.g., wedge stays intact), 3: slightly too firm, 4: much too firm and 5: rubbery, and breakable. FIG. 1 depicts the average texture scores of the above cheese replicas as determined by taste testers. As shown in FIG. 1, the cheese replicas with added proteases (samples A-E, referred to as 1-5 in FIG. 1) were mostly rated as "creamy and wedge stays intact" and were significantly creamier and softer than cheese replicas without any proteases. The control replicas with no proteases were mostly rated as "much too firm." The data indicate the addition of proteases can increase the creaminess of the cheese replica.

The cheese replicas also were tested for firmness using a texture analyzer (texture Technologies XT plus). FIG. 2 depicts firmness of each of the soft ripened cheese replicas with the addition of proteases as determined by the texture analyzes. As shown in FIG. 2, the cheese replicas with proteases had a much softer texture than the cheese replicas without proteases. The data indicates the addition of proteases can decrease the firmness of the cheese replica. The data from the texture analyzer supports the data collected by taste testers.

Example 2: The Use of Enzymes to Improve Non-Dairy Cheese Replica Flavor (to Create Flavor that is Indistinguishable from a Comparable Dairy Cheese)

Soft fresh (SF) cheese replicas (Example 21) created with proteases and lipases added at different times during the creation of the cheese replicas were evaluated for the ability of the proteases and lipases to modulate the flavor of the non-dairy cheese replicas. Eighteen cheese replicas were made with pasteurized almond and macadamia nut milk as detailed in Example 1. Five different combinations of protease and/or lipase mixtures were examined, along with three controls without protease or lipase as follows: A=Fromase™ 0.004%, B=Papain 0.02%+Lipase G 0.001%, C=control (no protease or lipase), D=Papain 0.02%, E=Papain 0.01%+Fromase™ 0.002%, and F=Papain 0.01%+PC lipase 0.0001%. The proteases and lipases were added at these three times: with the cultures, after crosslinking had started, and after draining the whey.

Figure 3A:
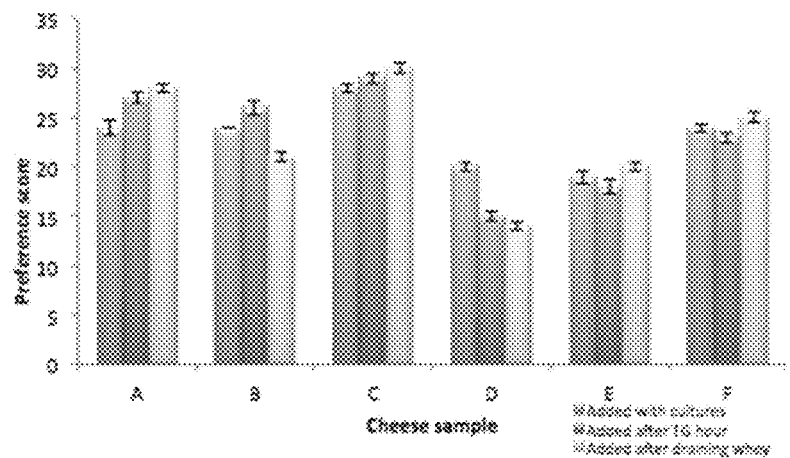
FIG. 3A and FIG. 3B are bar graphs of the average preference scores and flavor scores, respectively, for the cheese replicas made by varying proteases added and time of protease addition, as determined by taste testers.
Figure 3B:
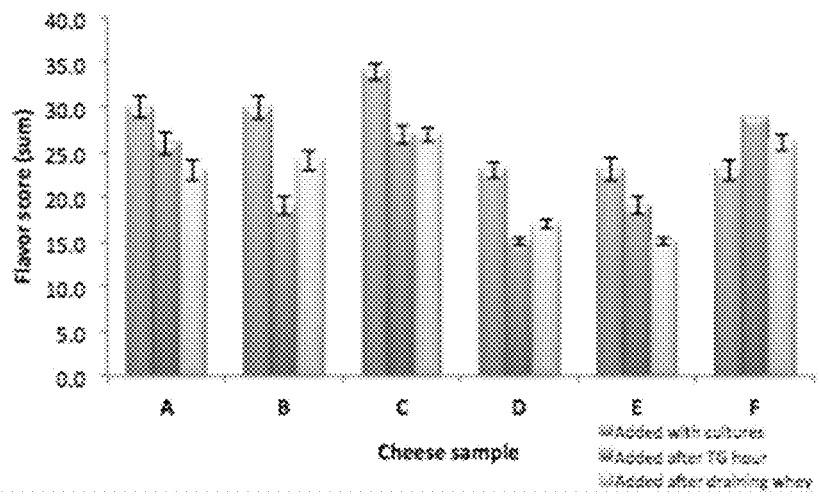

Blind taste testers and GCMS were used to evaluate the cheese replicas for a variety of flavors. FIG. 3A depicts the sum of the preference scores from 12 blind taste testers. Each test tester rated the cheese replica from 1-3, 1 being the favorite, 2 being all the rest, and 3 being the least favorite. FIG. 3B depicts the sum of the flavor scores from 12 blind taste testers. Each taste tester rated the cheese replicas from 1-5, 1 being the best flavor (sweet, fermented, fresh, little sharp, salt), 5 being the worst flavor (off flavors: nutty, plastic, metallic).

The tasters also rated the replicas for the following: how much they liked the flavor, their overall preferred cheese replica, the amount of acidity and the amount of buttery flavor. The rating was from 1-5, with 1 being the most liked for flavor or the overall favorite, or 1 being least amount for acidity or buttery flavor.

Overall preference: The least preferred cheese replicas were the three controls, which had no protease and lipases added; these were less liked than all of the cheese replicas that contained proteases and/or lipases and were significantly (p<0.05, two-tailed T-test) less liked than the cheese replicas that contained either papain 0.02%, or papain 0.01% and Fromase™ 0.002%. The most preferred cheese replica had papain at 0.02% added after draining the whey.

Flavor preference: The cheese replicas least liked for flavor were the three controls, which had no added proteases or lipases. These were less liked than all of the cheese replicas that contained proteases and/or lipases, and were significantly (p<0.05, two-tailed T-test) less liked than the cheese replicas that contained papain 0.02%, and the cheese replicas with papain 0.01% and Fromase™ 0.002%. The most preferred cheese replicas contained either papain at 0.02%, papain at 0.01% or papain 0.01% plus 0.002% Fromase™, added after draining the whey.

Figure 4:
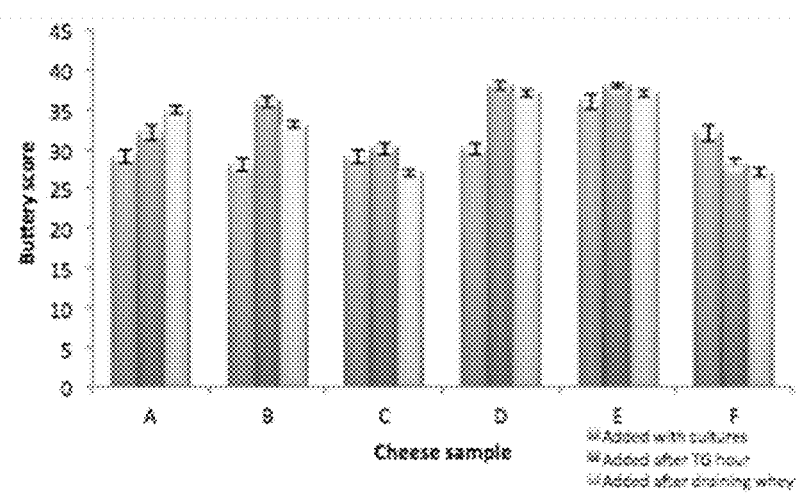
FIG. 4 is a bar graph of the average butteriness scores for the cheese replicas made by varying proteases added and time of protease addition, as determined by taste testers. Error bars are the standard deviation of the taste tester scores.

Buttery flavor: FIG. 4 depicts the butteriness score for the cheese replica as determined by taste testers. Each test tester rated the cheese replicas from 1-5, 1 being the least buttery (no butter taste), 3 (good amount of butter taste), and 5 (too much butter taste). The least buttery cheese replicas were the three controls, which had no added proteases or lipases. These were less buttery than the cheese replicas that contained proteases and/or lipases, and were significantly (p<0.05, two-tailed T-test) less buttery than the cheese replicas that contained papain 0.02% and papain 0.01% and Fromase™ 0.002%. The most buttery cheese replicas were created by adding either papain at 0.02%, papain 0.01% or 0.01% papain plus 0.002% Fromase™, after draining the whey.

Figure 5:
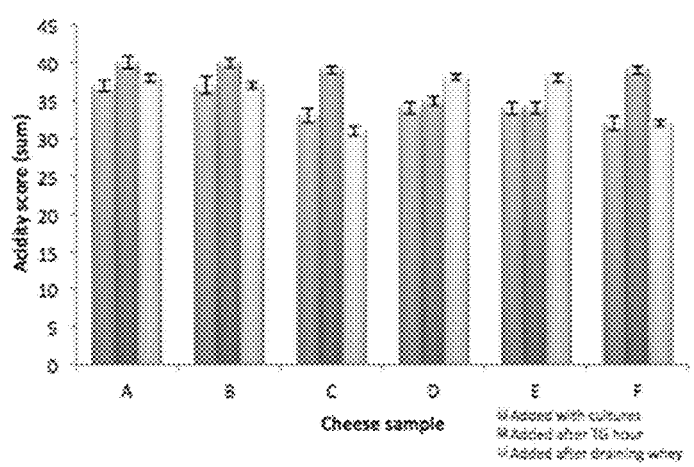
FIG. 5 is a bar graph of the average acidity scores for the cheese replicas made by varying proteases added and time of protease addition, as determined by taste testers.

Acidity: FIG. 5 depicts acidity scores of cheese replicas. Each test tester rated the cheese replicas from 1-5, 1 being the least acidity (no acidity), 3 (good amount of acidity), and 5 (too much acidity). The amount of acidity varied little among the samples.

The cheese replicas were also evaluated using GCMS. The volatile chemicals were isolated from the head space around the cheese replicas homogenized in 400 mM NaCl. These aroma chemicals were identified using GCMS, and the peaks further evaluated to identify the compounds in each cheese replica sample. This set of cheese replicas with and without proteases and lipases were compared for the chemical compounds in each sample to identify compounds created by the presence of protease and/or lipases. The control cheese replicas without any proteases or lipases were found to have the least amount of two known buttery compounds: 2, 3, butanedione and acetoin. The sample with papain at 0.02% added after draining the whey had the greatest amount of both 2, 3, butanedione and acetoin compared to all other samples. The amount of 2, 3, butanedione in this sample was 30 fold higher than its control with no added proteases or lipases, and acetoin was greater than 10-fold higher in the sample containing papain added after draining the whey, compared to the control. The GCMS results were consistent with the tasting results, which showed that adding papain at 0.02% after draining the whey resulted in the most buttery tasting cheese replica. Table 1 depicts the relative amounts of buttery compounds identified by GCMS that vary among the samples with different proteases and lipases, and that also vary depending on when in the cheese-replica-making process the proteases and lipases are added. The amount of each flavor component is shown using a qualitative scale. Where there is no symbol, the molecule was present below detection levels. The number of + signs designates the relative amount of the target molecule detected in the experiment, where ++++ is more than +++ and significantly more than +.

TABLE 1

| | Timing of adding proteases and lipases | | |
|---|---|---|---|
| | with cultures | after TG | after draining |
| 2,3,Butanedione | | | |
| A = FromaseTM 0.004% (samples: 1, 7, 13) | + | +++ | ++ |
| B = Papain 0.02% + Lipase G 0.001% (samples: 2, 8, 14) | +++ | + | + |
| C = control (no proteases or lipases), (samples: 3, 9, 15) | | | |
| D = Papain 0.02%, (samples: 4, 10, 16) | +++ | ++ | +++++ |
| E = Papain 0.01% + FromaseTM 0.002% (samples: 5, 11, 17) | +++ | +++ | +++ |
| F = Papain 0.01% + PC lipase 0.0001% (samples: 6, 12, 18) | ++++ | +++ | ++++ |
| Acetoin | | | |
| A = FromaseTM 0.004% (samples: 1, 7, 13) | + | ++++ | ++ |
| B = Papain 0.02% + Lipase G 0.001% (samples 2, 8, 14) | ++ | + | + |
| C = control (no proteases or lipase), (samples 3, 9, 15) | | | |
| D = Papain 0.02%, (samples: 4, 10, 16) | ++ | ++ | +++++ |
| E = Papain 0.01% + FromaseTM 0.002% (samples: 5, 11, 17) | ++ | +++ | +++ |
| F = Papain 0.01% + PC lipase 0.0001% (samples: 6, 12, 18) | +++ | ++ | ++++ |

Example 3: Selection of Desired Lactic Acid Bacteria

Twenty-one (21) individual bacterial strains were isolated from the commercial products MA11, MA14, MA19 and Flora Danica. These mixed direct vat cultures were plated on non-selective media and screened by PCR with primers (Table 3) that were designed specifically to distinguish among the various strains (Table 2, where LLL refers to *Lactococcus lactis lactis*, LLC refers to *Lactococcus lactis cremoris*, LM refers to *Leuconostoc mesenteroides*, and LLBD refers to *Lactococcus lactis biovar diacetylactis*. Table 2 depicts the individual isolated strains from the starter cultures. The first column identifies the source of the isolated strains, and the first row depicts the bacterial subspecies classification of the individual strains. In some cases it was exploited that certain strains, e.g., LLC, grew poorly on certain media (e.g., LB+ glucose) and the smallest colonies were selected for PCR analysis.

TABLE 2

List of isolated bacterial strains

| Source | LLL | LLC | LM | LLBD | Other |
|---|---|---|---|---|---|
| MA11 | LF5 LF7 | LF2 | | | |
| MA14 | LF24LF27 LF40 | LF43 | | | |
| MA19 | LF28 | LF33 | | | |
| Flora Danica | LF16 LF50 LF17 | LF15 LF54LF55 | LF21LF53 | LF13 LF14 LF49 | LF51 undefined species of lactococcus |

Table 3 depicts the primers used for sequence analysis of the isolated strains. Primer sets 1-3 (primer 1 pair, SEQ ID NOs: 1-2; primer 2 pair, SEQ ID NOs: 3-4; primer pair 3, SEQ ID NOs. 5-6) were used in preliminary identification of LLL, LLC and LLBD strains. Primer pair 4 (SEQ ID NOs. 5 and 6) was used to identify LM strains.

TABLE 3

List of primers

| Primer | Forward primer (5'→3') | Reverse primer (5'→3') |
|---|---|---|
| Primer 1 | TATGAAAGGAACTTATCTTA AAGTT | ATTTTCAATCTCCATTTTTA GAGT |
| Primer 2 | ATTCTTGATTTCAAAAAACC TGATT | AAATTGATTGAAGTCGGTCAA AAGT |
| Primer 3 | CAAAGTTCTTTGACATTATG TTG | CTAATGATGATTTAGATATGA TGAC |
| Primer 4 | CCAGACTCCTACGGGAGGCA GC | CTTGTGCGGGCCCCCGTCAAT TC |

Strains were further identified by sequencing the PCR products and by carrying out more extensive whole genome sequence analysis. Phenotypic analysis included: growth on Reddy's selective medium, pH profile in nut media, sugar fermentation, GCMS, and the tasting of curd and cheese replicas produced with individual strains. Cheese replica tastings were blinded to the tasters and carried out multiple times. The tasting results were evaluated for statistical significance.

Figure 6:
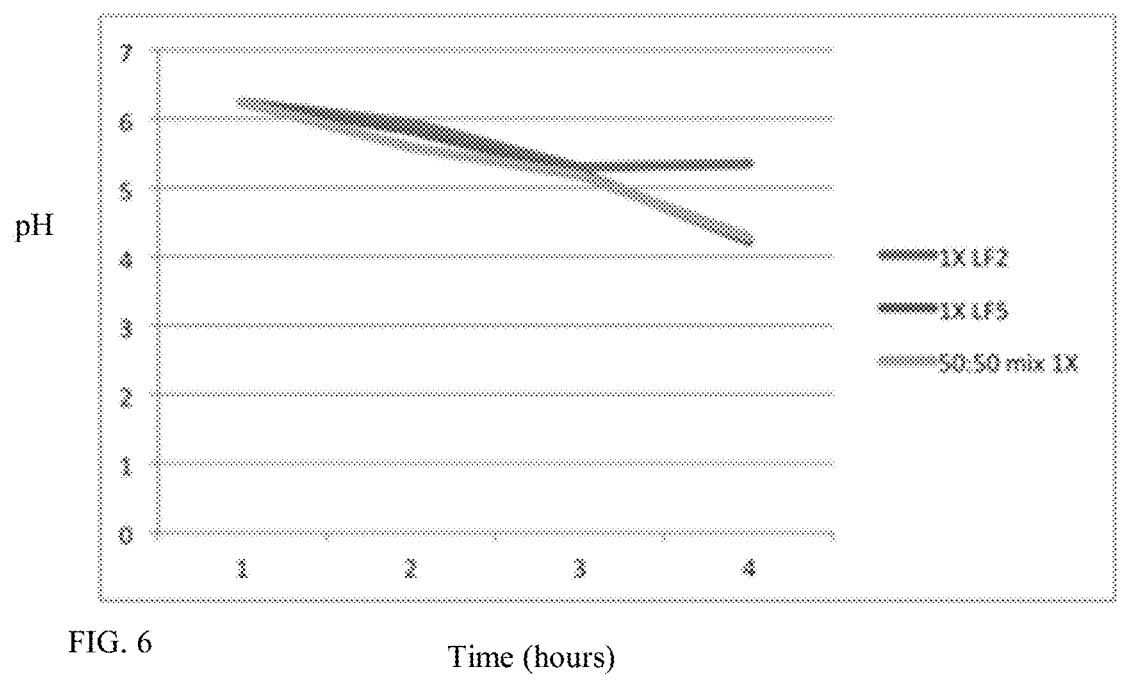
FIG. 6 is a line graph depicting the effect of individual LF2 and LF5 bacterial strains on the pH of filtered nut media.

The effect of selected strains on pH of filtered nut media was also tested. Nut media was incubated with LF2, LF5, or a 1:1 ratio of LF2 and LF5 strains for at least 17 hours, and the pH sampled at different time points. FIG. 6 depicts the effect of LF2 and LF5 strains on pH of filtered nut medium. LF2 (an LLC isolated from MA11) lowered the pH in filtered nut medium from 6.25 to 5.35 at T 17 h, whereas LF5 (an LLL isolated from the same commercial mix) lowered the pH to 4.23 in the same time period.

Example 4: The Use of Specific Lactic Acid Bacteria to Produce Desired Flavors The individual strains identified in Example 3 were used to make SF cheese replicas (see Example 21). Combinations of LF2, LF5 and LF7 (including ⅓ each) and combinations of LF2 and LF5 (including ½ each) were liked as well or better than MA11 in blind curd and cheese replica tastings.

A 50:50 mixture of LF2:LF5 was tested over a 4x range of bacterial cell concentration at inoculation, from $1.5 \times 10^8$ cfu/ml-$3.8 \times 10^7$ cfu/ml per strain, and found to result in the same final pH (4.3) as MA11 (at an inoculum concentration of $3 \times 10^8$ cfu/ml). Tasters found no significant flavor difference among samples in this inoculum range.

In blind taste tests, SR cheese replicas (see Example 20) made with isolated strains of LLL, LLC, LLBD and LM (e.g., a mixture of LF2, LF5, LF21 and LF14) were as well liked as or preferred to samples made with Flora Danica (FD).

SF cheese replicas (Example 21) also were prepared using individual strains to better characterize the flavor and texture profiles contributed by each strain. The results of the taste test/texture preference tests are depicted in Table 4.

TABLE 4

Texture and flavor of cheese replicas made with various starter cultures and isolated bacterial strains

| Strain | Average Texture Score | Predominant Flavors | Less Dominant Flavors |
|---|---|---|---|
| LLBD (MD88) | 2 | Buttery = nutty | Sour |
| LM (LM57) | 1.11 | Buttery = sour | Nutty = sweet > floral = woody |
| LF2 (LLC) | 1.44 | Sour > buttery > nutty | Bitter = sweet |
| LF5 (LLL) | 1.67 | Sour > buttery = nutty | sweet |

Predominant = more than 50% of tasters scored the flavor as present; Less dominant = a third or more of the tasters scored the flavor as present. Texture was scored on a scale of 1-5, where 1 = softest, and 2 = ideal texture for a SF cheese replica.

Some of the observations in the tasting studies included:

Cheese replicas made with LM alone had a much softer texture than cheese replicas made with LLBD alone.

Cheese replicas made with LM alone had a predominantly sour flavor. Samples also were quite buttery, but not as much so as those made with LLBD alone. Other prominent flavors in cheese replicas made with LM alone included nutty, sweet, floral and woody.

Cheese replicas made with LLBD alone had a predominantly buttery taste. They also were sour, but less so than samples made with LM. LLBD samples also had a nuttier and sweeter flavor than cheese replicas made with LM. Other prominent LLBD flavors included fruity and floral.

Cheese replicas made with LLC may have more bitter and sour flavors than those made with LLL alone.

Example 5: Effect of Added Sugars on Flavor Production in SF Cheese Replicas SF cheese replicas were prepared using the standard SF recipe (see Example 21). Each coagulation was inoculated with either LM57 (LM, commercial product) or MD88 (LLBD, commercial product). Sugar (glucose, fructose, sucrose, or maltose) at 20 mM final concentration was added to each sample except for the no added sugar control. Nut milk formula is about 55 mM sucrose with negligible amounts of glucose, fructose, and maltose. SF cheese replicas were taste tested by 10 individuals blinded to the identity of the cheese replicas.

Table 5 depicts a listing of cheese replica samples and their respective bacterial/sugar experimental conditions.

TABLE 5

List of cheese replica samples and description

| Sample | Description |
|---|---|
| A | LM57 no added sugar |
| B | LM57 + 20 mM Glucose |
| C | LM57 + 20 mM Fructose |

TABLE 5-continued

List of cheese replica samples and description

| Sample | Description |
|---|---|
| D | LM57 + 20 mM Sucrose |
| E | LM57 + 20 mM Maltose |
| F | MD88 no added sugar |
| G | MD88 + 20 mM Glucose |
| H | MD88 + 20 mM Fructose |
| I | MD88 + 20 mM Sucrose |
| J | MD88 + 20 mM Maltose |

Tasters were asked to score one point for each flavor tasted from the following categories: buttery, nutty, sweet, sour, fruity, floral, bitter, earthy and nutty. For example, a cheese replica judged to be buttery by all ten tasters would receive a score of 10. Flavor scores for each sample are summarized in Tables 6A & 6B. Combined flavor scores for each strain, irrespective of added sugar, are shown in Table 6C.

TABLE 6A

Effect of added sugar on flavors produced by LM

| Flavor | no added sugar | glucose | fructose | sucrose | maltose |
|---|---|---|---|---|---|
| buttery | 8 | 7 | 4 | 6 | 4 |
| nutty | 4 | 2 | 3 | 4 | 2 |
| sweet | 4 | 1 | 1 | 2 | 4 |
| sour | 8 | 8 | 9 | 7 | 8 |
| fruity | 0 | 1 | 1 | 1 | 2 |
| floral | 3 | 1 | 1 | 2 | 2 |
| bitter | 1 | 1 | 0 | 1 | 0 |
| earthy | 2 | 2 | 0 | 1 | 0 |
| woody | 3 | 1 | 2 | 2 | 0 |

TABLE 6B

Effect of added sugar on flavors produced by LLBD

| Flavor | no added sugar | glucose | fructose | sucrose | maltose |
|---|---|---|---|---|---|
| buttery | 6 | 9 | 9 | 8 | 9 |
| nutty | 6 | 5 | 6 | 5 | 3 |
| sweet | 2 | 6 | 3 | 5 | 3 |
| sour | 4 | 4 | 4 | 3 | 4 |
| fruity | 2 | 2 | 1 | 1 | 2 |
| floral | 2 | 3 | 1 | 1 | 0 |
| bitter | 1 | 1 | 1 | 1 | 6 |
| earthy | 1 | 1 | 1 | 0 | 2 |
| woody | 0 | 0 | 0 | 1 | 1 |

TABLE 6C

Flavors produced by LM (LM57) and LLBD (MD88), irrespective of added sugars

| Flavor | LM | LLBD |
|---|---|---|
| buttery | 29 | 41 |
| nutty | 15 | 25 |
| sweet | 12 | 19 |
| sour | 40 | 19 |
| fruity | 5 | 8 |
| floral | 9 | 7 |
| bitter | 3 | 4 |
| earthy | 5 | 5 |
| woody | 8 | 2 |

Figure 7:
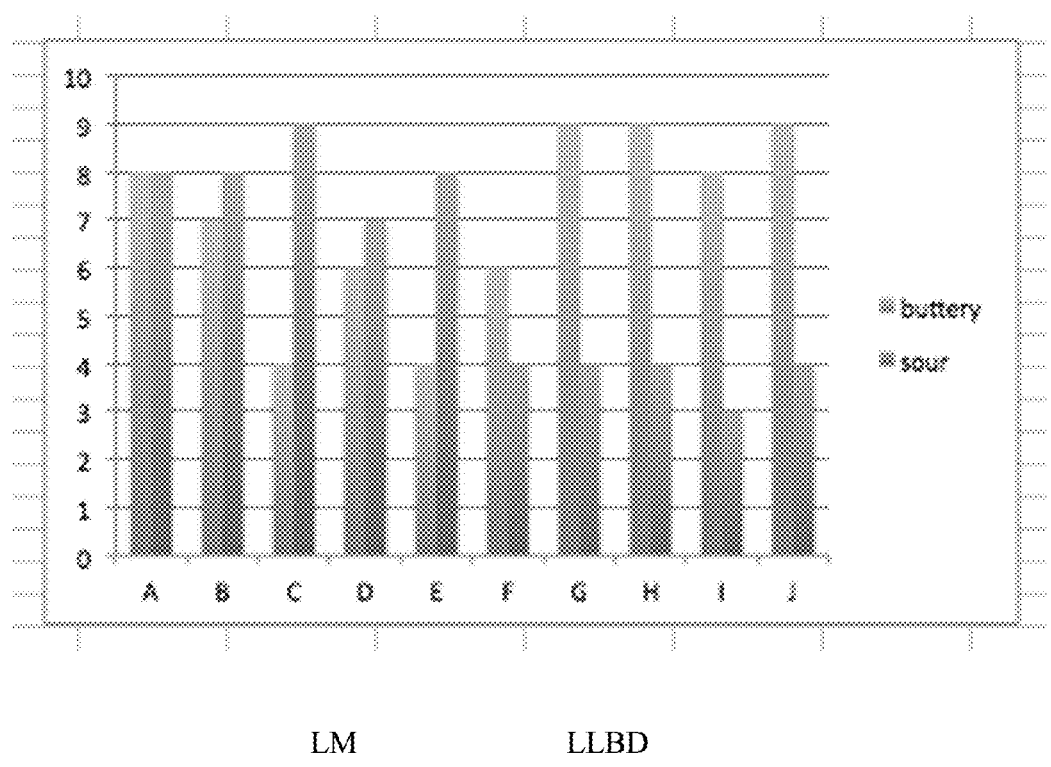
FIG. 7 is a bar graph depicting buttery and sour flavor scores for individual LM and LLBD samples.
Figure 8:
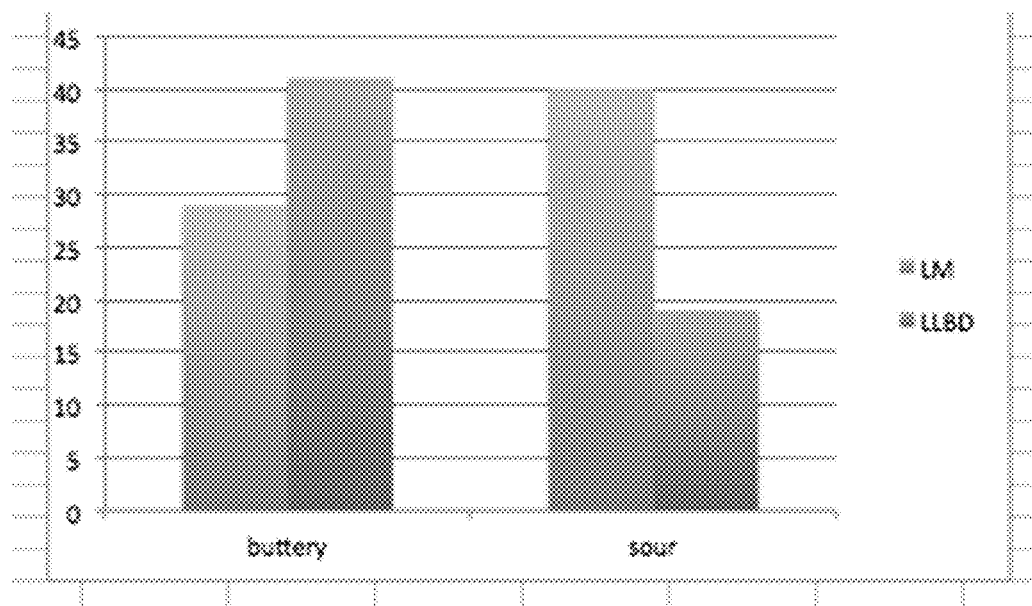
FIG. 8 is a bar graph depicting the combined buttery and sour flavor scores for LM and LLBD samples.

The predominant flavors that the tasters detected were buttery, sour, nutty and sweet. A number of differences were observed between LM and LLBD samples. Both sample sets scored high for buttery flavor, but the presence of added sugar affected butteriness differently, uniformly increasing this flavor in LLBD samples but tending to decrease it in LM samples (FIG. 7, see Table 5 for a description of each sample). Samples cultured with LM were rated more sour than samples made with LLBD, and sourness was relatively unaffected by the presence of added sugar. FIG. 8 shows the combined buttery and sourness scores irrespective of added sugar.

Figure 9:
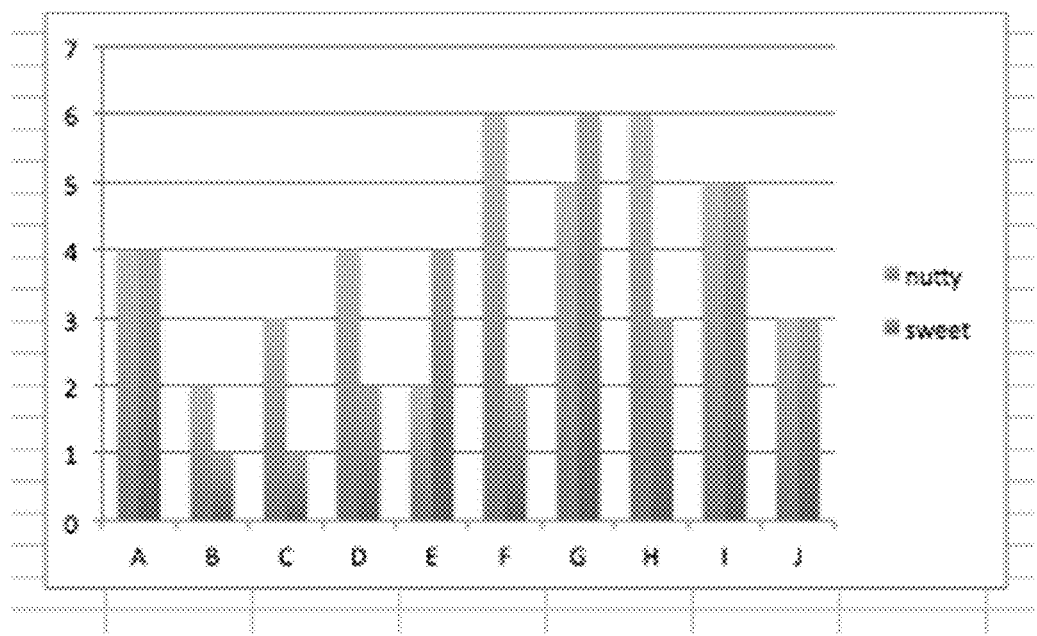
FIG. 9 is a bar graph depicting nutty and sweet flavor scores for individual LM and LLBD samples.
Figure 10:
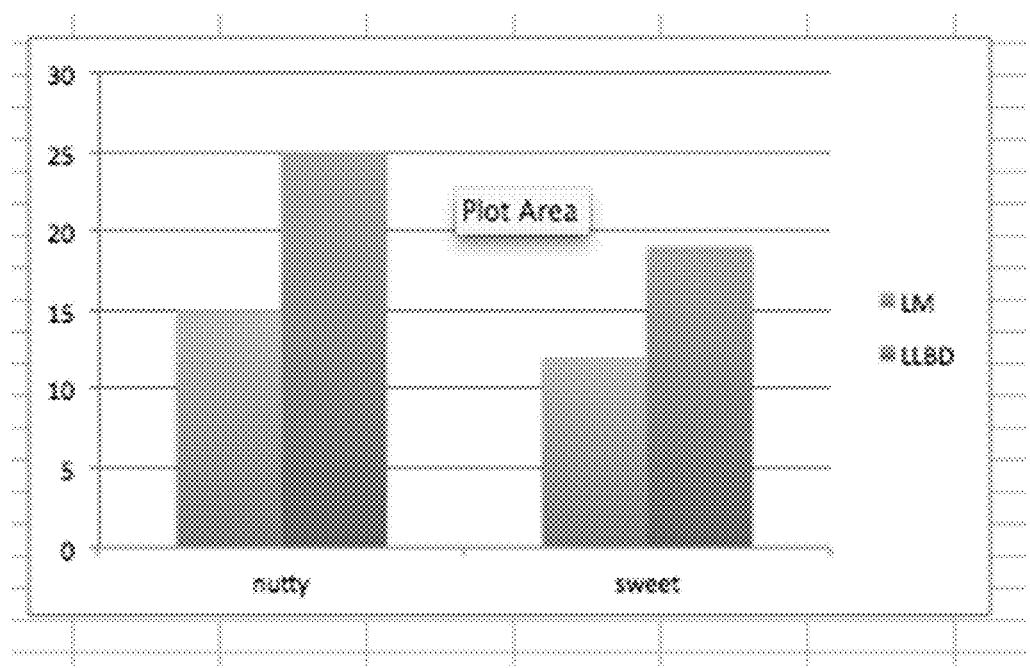
FIG. 10 is a bar graph depicting the combined nutty and sweet flavor scores for LM and LLBD samples.
Figure 11:
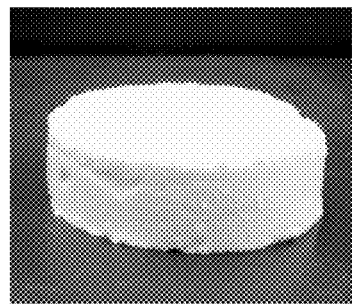
FIG. 11 depicts a cheese replica prepared using crosslinked isolated proteins.

Likewise differences were observed between the two strains for nuttiness and sweetness. Overall, samples made with LM are less nutty and less sweet than samples made with LLBD (see FIGS. 9 & 10).

Each cheese replica was subjected to analysis by GC-MS. The results are summarized in Table 7.

TABLE 7

| Volatile flavor compound | Sugar | LLBD | LM |
|---|---|---|---|
| Octane | All conditions | − | − |
| Ethanol | +Maltose | +++ | ++ |
| Ethanol | No added sugars | ++ | + |
| 2,3-Butanedione | All conditions | + | ++ |
| Acetoin | No sugar or +sucrose | +++ | ++ |
| Acetoin | +other sugars | +++ | + |
| Butanoic acid | All conditions | +++ | ++ |
| 2-heptanone | No added sugars | − | − |
| 2-heptanone | +Glucose | +++ | + |
| Nonanol | No added sugars | − | + |
| Nonanol | +Glucose | − | ++ |
| Acetic Acid | +Sucrose or +maltose | ++++ | +++ |
| Acetic Acid | No added sugars | −++++ | ++ |
| Acetic Acid | +Glucose | −++++ | + |
| Acetic Acid | +Frucose | −++++ | + |
| 1,3-Butanediol | All conditions | −+++ | ++ |

From these data, the following conclusions were reached:

Sourness: Cheese replicas made with LM alone have a predominantly sour flavor. Samples made with LLBD are also sour, but less so than those made with LM. Acetic acid was produced by both LLBD and LM: more was produced by LLBD than LM. Although sucrose and maltose increased acetic acid production by LM and glucose and fructose reduced it, sugar did not seem to affect the tasters' perception of sour flavor. It is likely that acetic acid is not the only sour flavor compound produced by these strains.

Butteriness: Both LM and LLBD samples have prominent buttery flavors, with LLBD overall more buttery than LM. There are three buttery flavor compounds produced by both strains: 2,3-butanedione, acetoin, and butanoic acid. LM produces more 2,3-butanedione, and LLBD produces more acetoin and butanoic acid. Glucose, fructose and maltose decrease the amount of acetoin produced by LM, and tasters likewise found samples made with fructose and maltose to be the least buttery. Overall added sugar appears to increase butteriness for LLBD samples.

LLBD samples also have a nuttier and sweeter flavor than cheese replicas made with LM. Sweetness may increase with LLBD with added sugar.

Example 7: Titration of Nut Milk Cream and Skim Fractions to Make Cheese Replicas Typically, the nuts milks are prepared from a 55:45 mixture of almond milk to macadamia milk with the following recipe:

49.45% almond skim
22.40% macadamia skim 5.12% almond cream (which is ~59% fat) (see Example 1 of WO 2013/010037)

23.02% macadamia cream (which is ~63% fat)

This recipe contains 28% cream (5.12% almond cream plus 23.02% mac cream). The percentage of fat in this formulation is approximately 17.5 g fat/100 g formula.

The ratio of almonds to macadamias was changed to 78:22 (23.6% almond skim, 7% almond cream, 4.7% macadamia nut skim, 4% macadamia nut cream), maintaining 28% cream, and carried out blind tastings. SF cheese replicas made with this formulation were liked as much as the 45:55 mix, and were indistinguishable in flavor and texture.

Example 8: Control of Fat Retention

Cheese replicas were made with different types and different amounts of fat and compared for their ability to retain fat. The cheese replicas were all made with a 4% solution of moong 8S protein homogenized with each of the following: the sunflower cream fraction from 5-40%, sunflower oil from 5-40%, or palm oil from 5-40%, each emulsion was heated to 95° C. and then cooled back to 30° C. At 30° C., 0.03% MA11 and 1% glucose was added to both samples. The mixtures were then incubated at 25° C. overnight, followed by the non-gelled liquid being drained through cheesecloth.

All the cheese replica gels were compared for their ability to retain fat at room temperature and upon heating up to 100° C. The non-dairy cheese replicas with 4% moong protein, and the sunflower cream fraction (all tested amounts from 5% to 40%) had no fat leakage at room temperature, and no fat leakage upon heating to 100° C. The cheese replica gels made with 4% moong protein, and 10% to 40% sunflower oil all had fat leakage at room temperature, and even greater oil leakage upon heating. Oil leakage was seen for cheese replica gels made with 4% moong protein, and 5% sunflower oil upon heading. The cheese replica gels made with 4% moong protein and 20% to 40% palm oil all had fat leakage at room temperature, and even greater oil leakage upon heating. Oil leakage was seen for cheese gels made with 4% moong protein, and 10% palm oil upon heating.

Example 9: Purification of Desired Proteins

All steps were carried out at 4° C. or room temperature. Centrifugation steps were at 8000 g for 20 mins, 4° C. or room temperature. The flour is suspended in a specific buffer, the suspension is centrifuged and the supernatant is microfiltered through a 0.2 micron PES membrane and then concentrated by ultrafiltration on a 3 kDa, 5 kDa, or 10 kDa molecular weight cutoff PES membrane on a Spectrum Labs KrosFlo hollow fiber tangential flow filtration system.

Once fractionated, all ammonium sulfate precipitate fractions of interest were stored at −20° C. until further use. Prior to their use in experiments, the precipitates were resuspended in 10 volumes of 50 mM K Phosphate buffer, pH 7.4, +0.5 M NaCl. The suspensions were centrifuged and the supernatants microfiltered through a 0.2 micron PES membrane and then concentrated by ultrafiltration on a 3 kDa, 5 kDa, or 10 kDa molecular weight cutoff PES membrane on a Spectrum Labs KrosFlo hollow fiber tangential flow filtration system. Protein composition at individual fractionation steps was monitored by SDS-PAGE and protein concentrations were measured by standard UV-Vis methods.

(i) Pea-albumins: Dry green or yellow pea flour was used as a source of pea albumins. The flour was suspended in 10 volumes of 50 mM sodium acetate buffer pH 5 and stirred for 1 hr. Soluble protein was separated from un-extracted protein and pea seed debris by either centrifugation (8000 g, 20 minutes) or filtration through a 5 micron filter. Supernatant or filtrate, respectively, was collected. To this crude protein extract, solid ammonium sulfate was added to 50% wt/v saturation. The solution was stirred for 1 hour and then centrifuged. To the supernatant from this step, ammonium sulfate was added to bring to 90% wt/v saturation. The solution was stirred for 1 hour, and then centrifuged to collect the pea albumin proteins in the pellet. The pellet was stored at −20° C. until further use. Protein was recovered from the pellet and prepared for use as described above, with the exception that final buffer can contain 0-500 mM sodium chloride.

In some embodiments, the flour was suspended in 10 volumes of 50 mM NaCl, pH 3.8 and stirred for 1 hour. Soluble protein was separated from un-extracted protein and pea seed debris by centrifugation (8000 g, 20 minutes). The supernatant was collected and filtered through a 0.2 micron membrane and concentrated using a 10 kD molecular weight cutoff PES membrane.

(ii) Pea-globulins: Dry green pea flour was used to extract pea globulin proteins. The flour was suspended in 10 volumes of 50 mM potassium phosphate buffer pH 8 and 0.4M sodium chloride and stirred for 1 hr. Soluble protein was separated from pea seed debris by centrifugation. The supernatant was subjected to ammonium sulfate fractionation in two steps at 50% and 80% saturation. The 80% pellet containing globulins of interest was stored at −20° C. until further use. Protein was recovered from the pellet and prepared for use as described above.

iii) Soybean 7S and 11S globulins: Globulins from soybean flour were isolated by first suspending lowfat/defatted soy flour in 4-15 volumes of 10 (or 20) mM potassium phosphate pH 7.4. The slurry was centrifuged at 8000 rcf for 20 mins or clarified by 5 micron filtration and the supernatant was collected. The crude protein extract contained both the 7S and 11S globulins. The solution then was 0.2 micron filtered and concentrated using a 10 kDa molecular weight cutoff PES membrane on a Spectrum Labs KrosFlo hollow fiber tangential flow filtration system or by passing over anion-exchange resin prior to use in experiments. The 11S globulins were separated from the 7S proteins by isoelectric precipitation. The pH of the crude protein extract was adjusted to 6.4 with dilute HCl, stirred for 30 min-1 hr and then centrifuged to collect the 11S precipitate and 7S proteins in the supernatant. The 11S fraction was resuspended with 10 mM Potassium phosphate pH 7.4 and the protein fractions were microfiltered and concentrated prior to use.

Soybean proteins also can be extracted by suspending the defatted soy flour in 4-15 volumes (e.g., 5 volumes) of 20 mM sodium carbonate, pH 9 (or water, pH adjusted to 9 after addition of the flour) or 20 mM potassium phosphate buffer pH 7.4 and 100 mM sodium chloride to decrease off-flavors in the purified protein. The slurry is stirred for one hour and centrifuged at 8000×g for 20 minutes. The extracted proteins are ultrafiltered and then processed as above or alternatively, the supernatant was collected and filtered through a 0.2 micron membrane and concentrated using a 10 KDa cutoff PES membrane.

(iv) Moong bean 8S globulins: Moong bean flour was used to extract 8S globulins by first suspending the flour in 4 volumes of 50 mM KPhosphate buffer pH 7 (+0.5M NaCl for lab scale purifications). After centrifugation, proteins in the supernatant were fractionated by addition of ammonium sulfate in 2 steps at 50% and 90% saturation respectively.

The precipitate from the 90% fraction contained the 8S globulins and was saved at −20° C. until further use. Protein was recovered from the pellet and prepared for use as described above.

Moong bean globulins also can be extracted by suspending the flour in 4 volumes of 20 mM sodium carbonate buffer, pH 9 (or water adjusted to pH 9 after addition of the moong flour) to reduce off-flavors in the purified protein fractions. The slurry is centrifuged (or filtered) to remove solids, ultrafiltered and then processed as described above.

(v) Late embryogenesis abundant proteins: Flour (including but not limited to moong bean and soy flour) was suspended in 20 mM Tris-HCl, pH 8.0, 10 mM NaCl, and stirred at room temperature for 1 hour then centrifuged. Acid (HCl or acetic acid) was added to the supernatant to a 5% concentration (v/v), stirred at room temperature then centrifuged. The supernatant was heated to 95° C. for 15 minutes, and then centrifuged. The supernatant was precipitated by adding Trichoroacetic acid to 25%, centrifuged, then washed with acetone. Heating and acid wash steps can be carried out in the reverse direction as well.

(vi) Pea-Prolamins: Dry green pea flour was suspended in 5× (w/v) 60% ethanol, stirred at room temperature for one hour, then centrifuged (7000 g, 20 min) and the supernatant collected. The ethanol in the supernatant was evaporated by heating the solution to 85° C. and then cooling to room temperature. Ice-cold acetone was added (1:4 v/v) to precipitate the proteins. The solution then was centrifuged (4000 g, 20 min), and protein recovered as the light-beige colored pellet.

(vii) Zein-Prolamins: Corn protein concentration or flour was suspended in 5× (w/v) 60% ethanol, stirred at room temperature for one hour, then centrifuged. Ethanol in supernatant was evaporated with heat, and then the solution is centrifuged, and the protein recovered as the pellet.

(viii) RuBisCO was fractionated from alfalfa greens by first grinding leaves with 4 volumes of cold 50 mM potassium phosphate buffer pH 7.4 buffer (0.5M NaCl+2 mM DTT+1 mM EDTA) in a blender. The resulting slurry was centrifuged to remove debris, and the supernatant (crude lysate) was used in further purification steps. Proteins in the crude lysate were fractionated by addition of ammonium sulfate to 30% (wt/v) saturation. The solution was stirred for 1 hr and then centrifuged. The pellet from this step was discarded and additional ammonium sulfate was added to the supernatant to 50% (wt/v) ammonium sulfate saturation. The solution was centrifuged again after stirring for 1 hr. The pellet from this step contains RuBisCO, and was kept at −20° ° C. until used. Protein was recovered from the pellet and prepared for use as described above.

RuBisCO also can be purified by adjusting the crude lysate to 0.1M NaCl and applying to an anion exchange resin. The weakly bound protein contaminants are washed with 50 mM KPhosphate buffer pH 7.4 buffer+0.1M NaCl. RuBisCO was then eluted with high ionic strength buffer (0.5M NaCl).

RuBisCO solutions were decolorized (pH 7-9) by passing over columns packed with activated carbon. The colorants bound to the column while Rubisco was isolated in the filtrate.

RuBisCO solutions were also alternatively decolorized by incubating the solution with FPX66 (Dow Chemicals) resin packed in a column (or batch mode). The slurry is incubated for 30 mins and then the liquid is separated from the resin. The colorants bind to the resin and RuBisCO was collected in the column flow-through.

In some embodiments, RuBisCO was isolated from spinach leaves by first grinding the leaves with 4 volumes of 20 mM potassium Phosphate buffer pH 7.4 buffer+150 mM NaCl+0.5 mM EDTA) in a blender. The resulting slurry was centrifuged to remove debris, and the supernatant (crude lysate) was filtered through a 0.2 micron membrane and concentrated using a 10 KDa cutoff PES membrane.

In some embodiments, RuBisCO was extracted from alfalfa or wheatgrass juice powder by mixing the powder with 4 volumes of 20 mM potassium Phosphate buffer pH 7.4 buffer+150 mM NaCl+0.5 mM EDTA) in a blender. The resulting slurry was centrifuged to remove debris, and the supernatant (crude lysate) was filtered through a 0.2 micron membrane and concentrated using a 10 KDa cutoff PES membrane.

(xi) Oleosin. Sunflower oil bodies were purified from sunflower seeds. Sunflower seeds were blended in 100 mM sodium phosphate buffer pH 7.4, 50 mM sodium chloride, 1 mM EDTA at 1:3 wt/v. Oil-bodies were collected by centrifugation (5000 g, 20 min), and resuspended at 1:5 (wt/v) in 50 mM sodium chloride, 2M urea and stir for 30 min, 4° C. 2M urea wash and centrifugation steps were repeated. Oil-bodies collected by centrifugation were resuspended in 100 mM sodium phosphate buffer pH 7.4, 50 mM sodium chloride. Centrifugation and washing steps were repeated once more, and the final washed oil-bodies fraction was obtained from a last centrifugation step. Oil-bodies were resuspended at 10% wt/w in 100 mM sodium phosphate buffer pH 7.4, 50 mM sodium chloride, 2% wt/v vegetable oil fatty acid salts, homogenized at 5000 psi and incubated at 4° C. for 12 hr. Solution was centrifuged (8000 g, 30 min), top layer removed and soluble fraction collected. SDS-PAGE analysis suggested that oleosins are a major protein present in the soluble fraction. Oleosin concentration was 2.8 mg/ml.

(ix) Pea total proteins: Dry green or yellow pea flour was used to extract total pea proteins. The flour was suspended in 10 volumes of 20 mM potassium phosphate buffer pH 8 and 100 mM sodium chloride and stirred for 1 hr. Soluble protein was separated from pea seed debris by centrifugation. The supernatant was collected and filtered through a 0.2 micron membrane and concentrated using a 10 kDa cutoff PES membrane.

(x) Pea vicilin and Pea legumin: Dry green or yellow pea flour was used to extract total pea proteins as described above. The crude pea mixture obtained thereof was fractionated into pea vicilin and pea legumin using ion-exchange chromatography. Material was loaded on Q Sepharose Fast-Flow resin and fractions were collected as salt concentration was varied from 100 mM to 500 mM NaCl. Pea vicilin was collected at 350 mM sodium chloride while pea legumin was collected at 460 mM sodium chloride. The collected fractions were concentrated using a 10 KDa cutoff PES membrane.

(xi) Amaranth flour dehydrins: Amaranth flour was suspended in 5 volumes of 0.5 M sodium chloride, pH 4.0 and stirred for 1 hr. Soluble protein was separated from unextracted protein and lentil seed debris by centrifugation (8000 g, 20 minutes). The supernatant was collected and filtered through a 0.2 micron membrane and concentrated using a 3 kDa cutoff PES membrane. Further enrichment of dehydrins from this fraction was obtained by boiling the concentrated protein material, spinning at 8000 g for 10 minutes and collecting the supernatant.

Example 10: Addition of Bacterial Cultures to Meltable Gels Comprising Purified Proteins Meltable gels were made with bacterial cultures by subjecting a mixture comprising 2% pea globulins and 4% soy proteins to homogenization. The emulsion was heated to 95° C., held at 95° C. for 15 minutes and then cooled back to room temperature, then 0.03% *Lactococcus lactis* culture and 1% glucose was added at 30° C. during the cool-down phase. The gel was allowed to incubate at 25° C. overnight and drained to obtain a gel that melts reversibly at 70° C.

Example 11: Preparation of Cream Fraction for Use in Cheese Replicas

A cream fraction was created by blending sunflower seeds into 5 times the weight to volume of a solution of 40 mM potassium phosphate pH 8, with 400 mM NaCl and 1 mM EDTA, then cooled to 20° C. The resulting slurry (slurry 1) was centrifuged. The top cream layer was removed from slurry 1 and blended in the same buffer, then heated for 1 hour at 40° C., the lower aqueous layer is the skim fraction. The resulting slurry (slurry 2) was cooled down then centrifuged; the cream layer was removed from slurry 2 and mixed with 5 times the weight to volume of 100 mM sodium carbonate pH 10 with 400 mM NaCl, then centrifuged to obtain slurry 3. The top layer from slurry 3 was then mixed with 5 times the weight to volume of water and centrifuged again. The resulting cream was very creamy white, and described by taste testers as has having no bitter tasting, a neutral taste, and having an excellent mouth feel.

Example 12: Creation of Melting Cheeses Replicas with Isolated Soy Proteins

A 6% solution of soy protein (7S+11 S globulins) was homogenized with 20% sunflower oil and the emulsion was heated to 95° C. and then cooled back to 25° C. The mixture was incubated at temperatures <25° C. overnight and then drained through cheesecloth. The resulting gel melted reversibly, i.e., melts on heating and sets on re-cooling. The gel can be poured into molds for shaping.

A gel comprising 4% moong globulins was induced to melt upon heating if unfractionated soy protein at 0.6% was added to the mixture before the gel formed, i.e., before the heat-cool cycle (heating to 95° C., holding at 95° C. for 15 minutes, and cooling back to 25° C.) was applied.

A gel comprising 2% pea globulins was induced to melt upon heating if soy protein at 4% concentration was added to the mixture before forming the gel with a heat-cool cycle as described above.

Example 13: Meltable Gels Comprising Isolated Proteins without Soy Proteins

A soy-free meltable gel was made from moong 8S globulins at a concentration at 7% in a solution at pH 8 when the concentration of sodium chloride was maintained at 80 mM and the solution was subjected to a heat-cool cycle (heating to 95° C. and cooling back to 25° C.). The gel reversibly melted.

A solution of moong 8S globulins at pH 7.4 and 50 mM sodium chloride also formed a gel that reversibly melts after applying a heat-cool cycle (heating to 95° C. and cooling back to 25° C.).

Example 14: Non-Dairy Melting Cheese Replicas, by Adding Melting Salts and Cations In this example, a 4% solution of moong 8S protein was homogenized with 20% palm oil and the emulsion was heated to 95° C. and then cooled back to 30° C., and 0.03% MA11, and 1% glucose was added. The mixture was incubated at 25° C. overnight and then the gelled and non-gelled liquid (i.e., the whey) were separated by draining through cheesecloth. The resulting cheese replica gel was very soft at room temperature and did not melt upon heating as indicated by no change in viscosity reversibly. The addition of 3% sodium citrate after draining the whey caused the cheese replica gel to melt, with the cheese replica gel becoming liquid upon heating and increasing in firmness upon cooling to room temperature. The resulting cheese replica gel can be poured into molds for shaping.

In this example, two samples were compared, with and without $CaCl_2$; one sample was a 6% solution of soy protein (7S and 11 S) mixed with 1 mM $CaCl_2$, and the other was a 6% solution of soy protein (7S and 11 S) without $CaCl_2$. Both samples were heated to 95° C. and then cooled back to 30° C. At 30° C., 0.03% MA11 and 1% glucose were added to both samples. The mixtures were then incubated at 25° C. overnight, followed by separation of the gelled material from the non-gelled liquid by draining the non-gelled liquid through cheesecloth. The resulting gels were solid at room temperature and did not melt upon heating, i.e., no change in viscosity. The addition of 1% melting salts (sodium citrate, trisodium phosphate, sodium hexameta phosphate, or disodium phosphate) added after draining the whey caused both cheeses to change viscosity upon heating to some extent, with both cheese replicas being firm at room temperature. The cheese replica gels with $CaCl_2$ with the melting salts had a large increase in viscosity. In particular, the addition of 1% salt hexametaphosphate to the $CaCl_2$ containing cheese replica gel, resulted in the gel becoming meltable as it became liquid upon heating. Upon cool down, all of the cheese replica gels were firm at room temperature.

Example 15: Non-Dairy, Non-Soy Melting Cheese Replica, by the Addition of Fat In this example, two samples were compared, with and without saturated fat. One sample was a 6% solution of rubisco mixed with 20% palm oil, and the other was a 6% solution of rubisco without palm oil. Both samples were heated to 95° C. and then cooled back to 30° C. At 30° C., 0.03% MA11 and 1% glucose were added and the mixture was then incubated at 25° C. overnight. The cheese replica gels were compared for firmness and meltablity. The resulting gel without palm oil was very soft and had no viscosity change upon heating. The sample with 6% rubisco and 20% palm oil was a gel at room temperature, and upon heating increased the viscosity to become liquid and then re-solidified once cooled again. The addition of saturated fat allowed for a non-melting gel to be made into a melting cheese replica. This also was observed when saturated fat was added to moong protein cheese replica gels.

Example 16: Creation of Non-Dairy Stretchy Cheese Replicas Using Isolated Proteins In this example, two samples were compared, with and without prolamins purified from pea flour; one sample was a 4% solution of soy protein (7S and 11S), 2% pea-globulin, mixed with 2% pea-prolamins, and the other sample was a 6% solution of soy protein (7S and 11 S) mixed with 2% pea-globulin; both samples were heated to 95° C. and then cooled back to 30° C. At 30° C., 0.03% MA11 and 1% glucose were added to both samples. The mixtures were then incubated at 25° C. overnight, followed by separation of the gelled material from the non-gelled liquid by draining the non-gelled liquid through cheesecloth. The resulting cheese replica gels were both solid at room temperature, with the cheese replica gel containing prolamins being firmer. Both gels also melted upon heating, as shown with an increase in viscosity. There was no noticeable different in the viscosity of the samples upon heating, but there was a greater change in viscosity for the prolamin sample upon cooling as it was firmer at room temperature. Upon heating, the cheese replica with prolamins had an increase in the interactions between the molecules. As a portion of the cheese replica with prolamins was pulled away from the rest of the sample, it showed stretching, due to rest of the gel retaining its intermolecular interactions. These stretching properties were not seen in the sample without prolamins.

Example 17: Creation of Stretchy Non-Dairy Cheese Replicas Using Polysaccharides Cheese replicas were compared with and without 0.5% xanthan gum. One sample was a 4% solution of soy protein (7S and 11 S), 2% pea-globulin, mixed with 2% pea-prolamins, and 0.5% xanthan gum; another was a 4% solution of soy protein (7S and 11 S), 2% pea-globulin, and mixed with 2% pea-prolamins; another was a 4% solution of soy protein (7S and 11 S), 2% pea-globulin; the last sample was a 4% solution of soy protein (7S and 11 S), 2% pea-globulin and 0.5% xanthan gum. All samples were heated to 95° C. and then cooled back to 25° C. The mixtures were then incubated at 25° C. overnight, then drained through cheesecloth to separate gelled material from non-gelled liquid. The resulting cheese replicas gels were all gelled at room temperature, with the gel containing prolamins and/or xanthan gum being firmer than the others. All the gels melted upon heating, as shown with an increase in viscosity. Upon heating, it was also shown that the two cheese replicas with xanthan gum had an increase in the interactions between the molecules, greater than the cheese replicas with no xanthan gum. As in Example 16, the cheese replicas with prolamins exhibited stretching properties.

Example 18: Creation of Cheese Replicas Using Crosslinked Isolated Proteins

A cheese replica was made from an emulsion of 4% pea-globulins, 20% sunflower cream fraction, and 1% glucose, by heating to 24° C., then adding MA11 at 0.03% and incubating for 1 hour. After the incubation, the heat was increased to 38° C., and 0.6% transglutaminase was added and the temperature held at 38° C. for 1 hour. The mixture in the vat/beaker was held at room temperature for 12 hours to allow the mixture to coagulate. After 12 hours, the final curd had a pH of 4.2. The whey then was drained from the curd through butter muslin, and then the curd was whisked and spooned into mold forms and held at room temperature for 1 hour. After 24 hours at room temperature, the cheese replicate was removed from the mold form and stored at 4° C.

Example 19: Method of Making Hard Cheese Replicas

The non-dairy milk was inoculated with thermophilic cultures before formation of the gel. During formation of the gel, the temperature was slowly increased to allow the curd to release more whey. The curd was cut into ½ inch squares and allowed to acidify for 10 minutes still suspended in its own whey. After 10 minutes the curd was stirred with a large whisk breaking it up into pea sized pieces. At that time the internal temperature of the whey/coagulum was increased by 2 degrees every five minutes by heating in a waterbath until the desired internal temperature (130° F.) was reached. The curd was stirred every 10 minutes to assure that it was not reaggregating. The curds were then separated and drained to form a hard cheese replica. The hard cheese replica was then aged.

Example 20: Method of Making a Soft Ripened Cheese Replica

The following is the standard recipe used throughout the examples to make soft ripened (SR) cheese replica. The standard pasteurized milk mixture that was used has 28% cream, made from 55% almonds and 45% Macadamia. The milk is heated to 90±3° F., then Florica Danica, Mesophilic Starter (MA11, LF2, LF5, LF7, LF21, MD88 or other cultures), *Geotrichum candidum*, *Penicillium candidum*, and *Debaromyces hansenii* cultures were allowed to hydrate on top of milk for 5 minutes before it is stirred into the milk. Proteases and/or lipases (dissolved in water) can be added at this step. The milk containing the cultures was held at 90±3° F. for 90 minutes. After an hour, the pH of the formula usually drops to 5.6±0.2. After the hour, the circulator was adjusted to 110° F., and transglutaminase (dissolved in water right before use) was added. The formula was stirred until completely and evenly mixed into the milk and left unstirred for the rest of the coagulation. Once the formula reached 100° F., the circulator was turned off, and the formula was kept in the waterbath for 10 minutes. Proteases and/or lipases (dissolved in water) also can be added at this step. At that point, the vat/beaker was taken from the water and covered with plastic wrap to coagulate for 12 hours at room temperature.

After 12 hours, the final curd had a pH of 4.4. The curd was cut into 1 inch squares, and allowed to sit for 5 minutes. The whey was then drained from the curd through butter muslin, usually resulting in 50% curd and 50% whey. Proteases and/or lipases (dissolved in water) also can be added to the curd at this step. The curd was whisked for 5 minutes, spooned into the micro-perforated mold forms to the desired weight, and then allowed to sit at room temperature for 1 hour. After an hour, a cover was placed on the curd on each mold form. The curd was allowed to drain for an additional 1 hour at room temperature in the mold form, and then the curd in the mold form was pressed for 24 hours at 36° F. After the pressing time, the cheese replicas were brined in their mold forms (time is dependent on the size of the piece, 6 oz cheese replica=20 mins).

Cheese replicas still in their mold forms were fully immersed in preheated saturated brine at 50° F. After brining, the molds were placed on a draining rack and returned to 36° F. for 24 hours. Each cheese replica then was removed from its mold and placed on a draining mat and returned to 36° F. for 24 hour. After 24 hours, the cheese replica was transferred from 36° F. to a dry yeasting room for three days at 60° F., with 75% humidity. After three days, the cheese replica was transferred from a draining mat to an aging mat. The mat was placed on an aging rack, and moved to a ripening room at 50° F., with 90% humidity and continuous airflow. Every two days, the cheese replica was turned and the mat replaced. After seven days, the cheese replica was transferred directly onto an aging rack, allowing maximum aeration for seven more days, or until mold coverage was complete. After mold coverage was complete, the cheese replica was moved to 36° F. for sixteen hours. The cheese replica was then wrapped in perforated paper. Cheese replicas can be tasted two weeks later.

Example 21: Method of Making a Soft Fresh Cheese Replica

The following is the standard recipe used throughout the examples to make soft fresh (SF) cheese replicas. The standard pasteurized milk used to make SF cheese replica has 28% cream, made from 55% almonds and 45% Macadamia. The milk was heated to 83±3° F., then MA11 or other bacterial cultures were added (cultures are allowed to hydrate on top of milk for 5 minutes before it is stirred into the milk). Proteases and/or lipases (dissolved in water) can be added at this step. The milk containing the cultures was held at 83±3° F. for 1 hour. After an hour, the pH of the formula usually drops to 5.6±0.2. After the hour, the circulator was adjusted to 110° F., and transglutaminase (dissolved in water right before use) was added. The formula was stirred completely and evenly into the milk and left unstirred for the rest of the coagulation. Once the formula reached 100° F. (it takes 50±10 minutes to reach temperature), the circulator was turned off, and the formula was kept in the waterbath for 10 minutes. Proteases and/or lipases (dissolved in water) also can be added at this step. At that point the vat/beaker was removed from the waterbath and covered with plastic wrap and allowed to coagulate for 12 hours at room temperature. After 12 hours the final curd has a pH of 4.4±0.1 (if normal formula). The curd was cut into 1-inch squares, and allowed to sit for 5 minutes. The whey was then drained from the curd through butter muslin, usually resulting in 50% curd and 50% whey. The proteases and/or lipases (dissolved in water) also can be added to the curd at this step. The curd was whisked for 5 minutes, spooned into the mold forms to the desired weight, and then let to sit at room temperature for 1 hour. After an hour, a cover was placed on the curd and 600 g of weight on each mold form were added. The curd was allowed to drain for an additional 1 hour at room temperature in the mold form. The curd in the mold form was then pressed for 24 hours at 36° F. After the pressing time, the cheese replicas were brined in their mold forms (time is dependent on the size of the piece, 8 oz cheese replica=10 mins). Cheese replicas in their mold forms were placed back at 36° F. with their cover but without the weight. After 24 hours, the cheese replicas were removed from their mold forms and placed at 36° F. on draining mats. After another 24 hours, the cheese replicas were placed on a clean tray and the entire tray was wrapped with plastic wrap, and maintained at 36° F. until tasting.

Example 22: Preparation of a Blue Cheese Replica

Standard pasteurized nut milk has 28% cream, made from 55% almonds and 45% macadamia nuts. The milk is heated to 83±3° F., then MA11 and *Penicillium roquefortii* are added (cultures are allowed to hydrate on top of milk for 5 minutes before it is stirred into the milk). The proteases and/or lipases (dissolved in water) can be added at this step. The milk containing the cultures is held at 83±3° F. for 1 hour. After an hour, the pH of the formula usually drops to 5.6±0.2. After the hour, the circulator is adjusted to 110° F., and transglutaminase (dissolved in water right before use) is added. The formula is stirred completely and evenly into the milk and left unstirred for the rest of the coagulation. Once the formula reaches 100° F. (it takes 50±10 minutes to reach temperature), the circulator is turned off, and the formula stays in the waterbath for 10 minutes. The proteases and/or lipases (dissolved in water) can be added at this step. At that point the vat/beaker is taken from the water and covered with plastic wrap and allowed to coagulate for 12 hours at room temperature. After 12 hours the final curd has a pH of 4.4±0.1 (if normal formula). The curd is cut into 1 inch squares, and allowed to sit for 5 minutes. The whey is then drained from the curd through butter muslin, usually resulting in 50% curd and 50% whey. Proteases and/or lipases (dissolved in water) also can be added to the curd at this step. The curd is whisked for 5 minutes, spooned into the mold forms to the desired weight, and then let to sit at room temperature for 1 hour. After an hour, the follower is placed on the curd and 600 g of weight on each mold form are added. The curd is allowed to drain for an additional 1 hour at room temperature in the mold form. The curd in the mold form is then pressed for 36 hours at 36° F. After the pressing time, the cheese replicas are brined in their mold forms (time is dependent on the size of the piece, 8 oz cheese replica=10 mins). Cheese replicas in their mold form are place back at 36° F. with their topper but without weight. The cheese replica forms will be aged at 36° F. for 2 days then the salt rub will be applied to the exterior of the cheese replicas each day for a 3 day period. The cheese replicas are then matured for 20 days at 41° F. The cheese replica is then pierced with a small needle several times into the pressed cheese replica to allow the mold to innoculate in these holes and spread through out the interior surface of the cheese replica. This process is repeated on the 30th day of maturation. At that point, the cheese replica is to age for another 5 months at 40° F. The drying room will be kept at 46 to 53° F. and the ripening room will be held at 35 to 50° F.

Example 23: Preparation of a Blue Cheese Replica

A nut milk composed of 60% almond milk and 40% macadamia milk, having a fat content of 14.2%, was pasteurized. The pH of the milk after pasteurization was 6.4. The milk was heated to 81° F. and individual microbial cultures (LF2 (LLC), MD88 subculture (LLBD), LF5 (LLL), *Penicillium roquetforti* and *Debaryomyces hansenii*) were added at one time. After incubating at 81° F. for 1 hour, the pH of the milk ranged from 5.9 to 6.0. The temperature of the milk was raised to 100° F., and a transglutaminase (ACTIVA TI, from Ajinomoto), hydrated in a 2 to 1 ratio water to enzyme and allowed to sit for 5 minutes, was added to the 100° F. milk. The enzyme was stirred in gently and the milk was held for 1 hour at 100° F. without stirring. The heat was turned off and the milk allowed to sit covered for 4 hours to form a strong coagulation. After the 4 hours, the pH of the milk was about 5.8. There was a strong resilient gel formed before cutting the curd into ½ inch squares and left to heal for 15 minutes in the whey with a pH of 5.9.

The curd was stirred with a large whisk to just break up the curd for about 60 seconds. The temperature of the curd then was increased 2 degrees every 5 minutes until about 120° F. with stirring every 10 minutes to insure no further matting of the curd occurred. Once the target temperature was reached, the curd was separated and firm, and had a pH of about 5.6. The curd was put into a tightly woven linen draining bag and hung at room temperature for 8 hours, then placed in a sterilized stainless steel bowl and 1% Kosher salt was added and distributed evenly. After salting the curd, it was ladled into cylindrical molds on plastic draining mats, and allowed to drain for 12 hours, with flipping once every hour for 6 hours. At this point, the forms were salted lightly on all sides and put back into the molds, then put into a yeasting room at 42° F. and 75% relative humidity (RH) for 5 days, turning the forms 2× per day. The forms then were moved to the molding room at 51° F. and 90% RH, and punctured multiple times with a stainless steel needle to increase oxygen flow to the center. The cheese replica was maintained under these conditions for 3 weeks to encourage yeast and mold growth to occur. After 3 weeks, the yeast and mold were washed off the exterior of the forms with a 5% salt solution and wrapped in perforated foil. The cheese replica was kept in a cold aging room at 38° F. for a minimum of 30 days for cold aging to occur. After aging, the cheese replicas can be wrapped in new foil or plastic wrap to prohibit mold growth on the exterior.

Blue cheese replica crumbles were formed in a similar fashion, except that the curd was spread out on mats and put into a 51° F. and 90% RH aging environment to allow the yeast and mold to grow and stabilize the natural microflora. The curd was then aged in the molding room for 3 weeks and packaged in air tight containers to cut off oxygen flow and stop the bluing process.

Example 24: Preparation of a Washed Rind Cheese Replica

The milk (pasteurized milk has 28% cream, made from 55% almonds and 45% macadamia nuts) was heated to 83±3° F., then MA11, yeast, *Micrococci, Coryneform* bacteria and *Geotrichum candidum* were added (cultures were allowed to hydrate on top of milk for 5 minutes before being stirred into the milk). The proteases or lipases (dissolved in water) can be added at this step. The milk containing the cultures was held at 83±3° F. for 1 hour. After an hour, the pH of the formula usually drops to 5.6±0.2. After the hour the circulator was adjusted to 110° F., and transglutaminase (dissolved in water right before use) was added. The formula was stirred until completely and evenly mixed into the milk and left unstirred for the rest of the coagulation. Once the formula reached 100° F., the circulator was turned off, and the formula was left in the waterbath for 10 minutes. The proteases or lipases (dissolved in water) also can be added at this step. At that point the vat/beaker was taken from the water and covered with plastic wrap to coagulate for 12 hours at room temperature. After 12 hours the final curd has a pH of 4.4±0.1 (if normal formula). The curd was cut into 1-inch squares, and let to sit for 5 minutes. The whey was then drained from the curd through butter muslin, usually resulting in 50% curd and 50% whey. The proteases and lipases (dissolved in water) also can be added at this step to the curd. The curd was whisked for 5 minutes, spooned into the mold forms to the desired weight, and then allowed to sit at room temperature for 1 hour. After an hour, a cover was placed on the curd and 600 g of weight on each mold form were added. The curd was allowed to drain for an additional 1 hour at room temperature in the mold form. The curd in the mold form was then pressed for 36 hours at 36° F. After the pressing time, the cheese replicas were brined in their mold forms (time is dependent on the size of the piece, 8 oz cheese replica=10 min). Cheese replicas in their mold form were place backed at 36° F. with their cover but without weight. The cheese replica forms were aged at 36° F. for 2 days. The cheese replica forms were brined in a saturated brine and allowed to drain for 48 hours at 36° F. After the 48 hour period the cheese replicas were brushed with a solution of *Brevibacterium linens* and 5% salt solution for two weeks turning the forms every two days. After that time, the washing of the form was decreased. Once the *Brevibacterium linens* was visible on the rind, the washing was reduced to 2× per week. After that period, the rind was brushed with a solution of yeast and water to help dry out the rind with help from good fresh air movement as the cheese replicas age.

The drying room temperature for washed rind cheese replica was 57 to 64° F. and the ripening room temp was 52 to 57° F. The cheese replicas were wrapped in breathable paper and aged for an additional 60 days at 35° F. or higher.

Example 25: Use of Citrate in Yeast Extract Media to Develop "Buttery" Flavors A 2-dimensional matrix of glucose concentrations vs. citrate concentrations was set up with MD88 (LLBD) to evaluate the relationships between citrate and glucose and the production of "buttery" compounds (e.g., acetoin and 2,3-butanedione). The yeast extract media (YEM) used was composed of 0.5% yeast extract (Flavor House, Inc, Item # X11020) and 20 mM Potassium Phosphate buffer, pH 7.0. This YEM was inoculated with 0.005% (w/v) MD88 lyophilysate (Danisco CHOOZIT, Item # MD088 LYO 50 DCU). Glucose and citrate stocks were added to 9 volumes of YEM with MD88 in such a way to create a 3×3 matrix of [Glucose] vs. [Citrate]. Glucose was added to this media at 200 mM, 50 mM, or 10 mM, and citrate was added as trisodium citrate hydrate at 50 mM, 10 mM, or 2 mM. All media samples were incubated for 17 hours at 30° C. with 200 rpm shaking Cultured samples were smelled by a trained flavor scientist and analyzed by GCMS. Table 8 provides the recorded aroma descriptions and the GCMS data for each sample after the 17-hour aerobic incubation. A "buttery" aroma could be smelled in all samples down to 2 mM Citrate and this aroma was stronger with higher glucose concentrations. All samples with 10 mM glucose had a very mild aroma and higher pH suggesting poorMD88 growth at this glucose concentration.

TABLE 8

Aromas and pH of each sample

| [Glucose](mM)/[Citrate] (mM) | pH | Aroma |
|---|---|---|
| 200/2 | 4 | yeasty, light butter |
| 200/10 | 4 | buttery, pungent/sharp sour |
| 200/50 | 4.5 | buttery, strong sour |
| 50/2 | 4 | media, light butter |
| 50/10 | 4 | buttery, sour |
| 50/50 | 7 | buttery, sour, light almonds |
| 10/2 | 5.5 | bready, light butter |
| 10/10 | 6.5 | bready, yeasty |
| 10/50 | 7.5 | light media |

Figure 12:
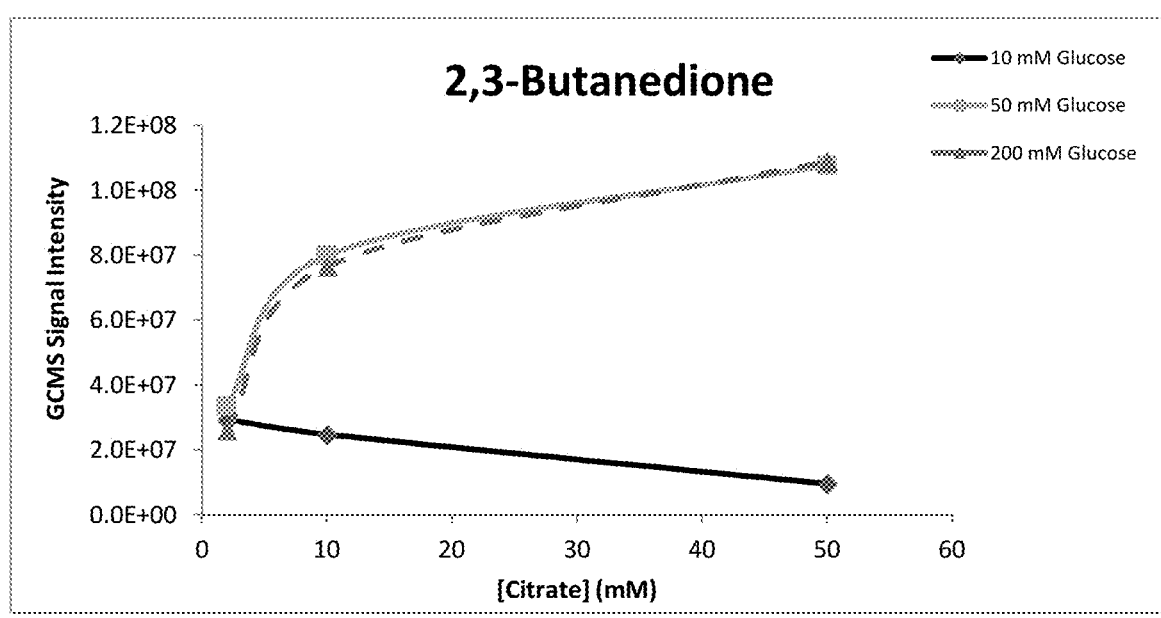
FIG. 12 is a line graph depicting the concentration of 2,3-butanedione detected in each sample with 10 mM, 50 mM, or 200 mM glucose and increasing concentrations of citrate.
Figure 13:
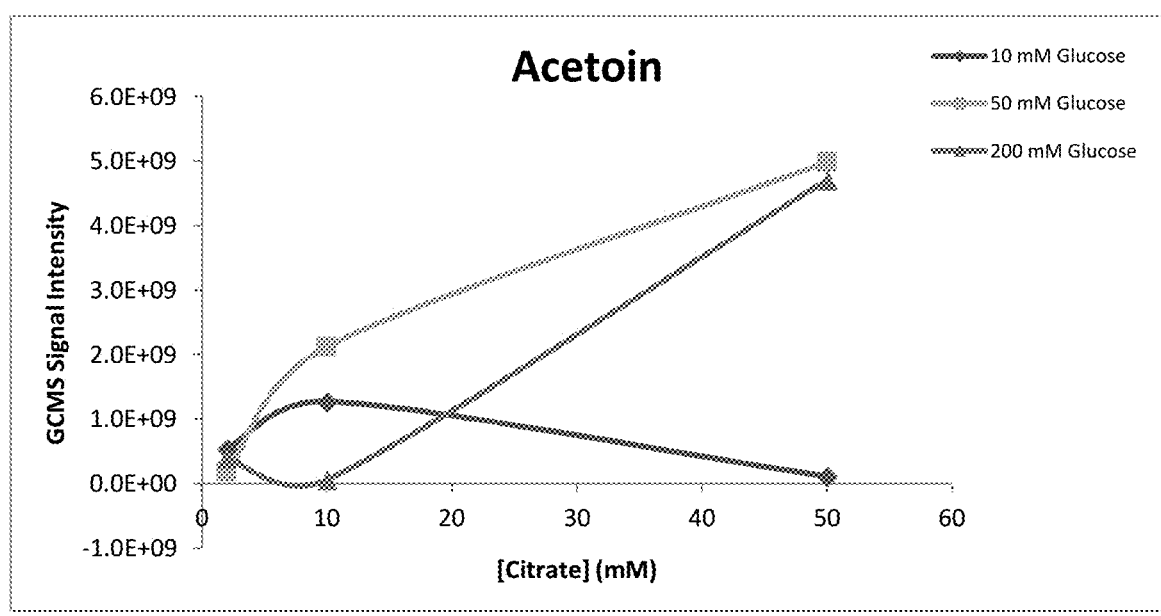
FIG. 13 is a line graph depicting the concentration of acetoin detected in each sample with 10 mM, 50 mM, or 200 mM glucose and increasing concentrations of citrate.
Figure 14:
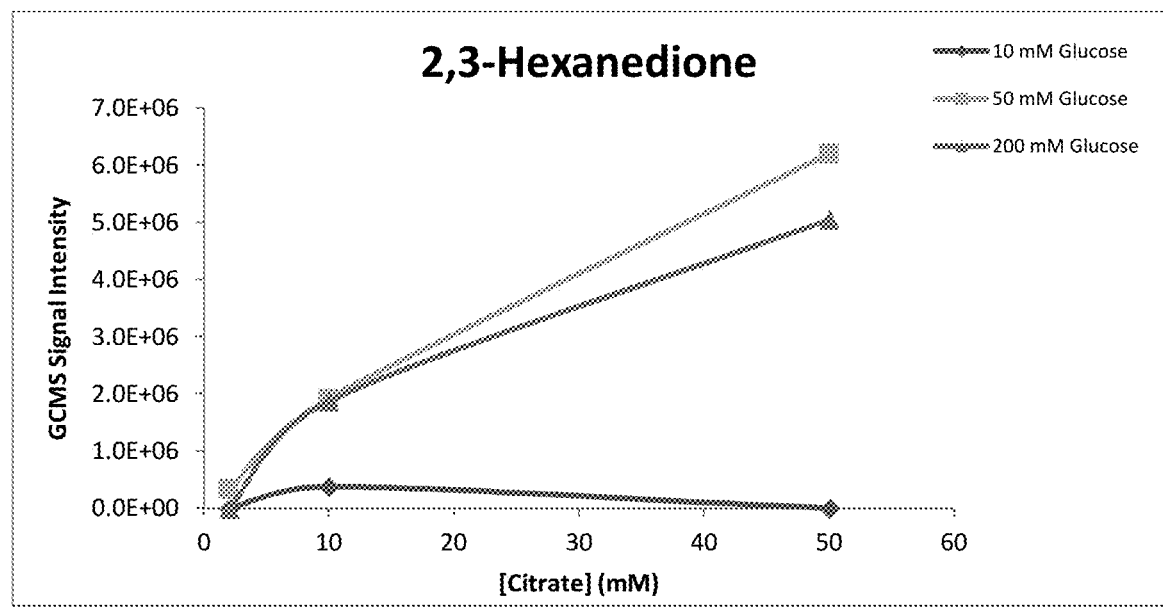
FIG. 14 is a line graph depicting the concentration of 2,3-hexanedione detected in each sample with 10 mM, 50 mM, or 200 mM glucose and increasing concentrations of citrate.

GCMS was used to detect the different volatile compounds present in each sample using a solid phase microextraction (SPME) fiber containing polydimethylsiloxane (PDMS) to adsorb volatile compounds from the sample headspace. Five mL volumes of each sample in glass GCMS vials were sealed and the volatile compounds were extracted from the headspace for 12 mins at 50° C. while samples were agitated at 500 rpm. The GCMS data for "buttery" aroma compounds (2,3-butandione, acetoin, and 2,3-hexanedione) support the aroma descriptions. All three compounds increased with increasing citrate concentration and glucose concentrations over about 25 mM. At 10 mM Glucose, MD88 did not grow well and therefore could not produce any aroma compounds. See, FIGS. 12-14.

Figure 15:
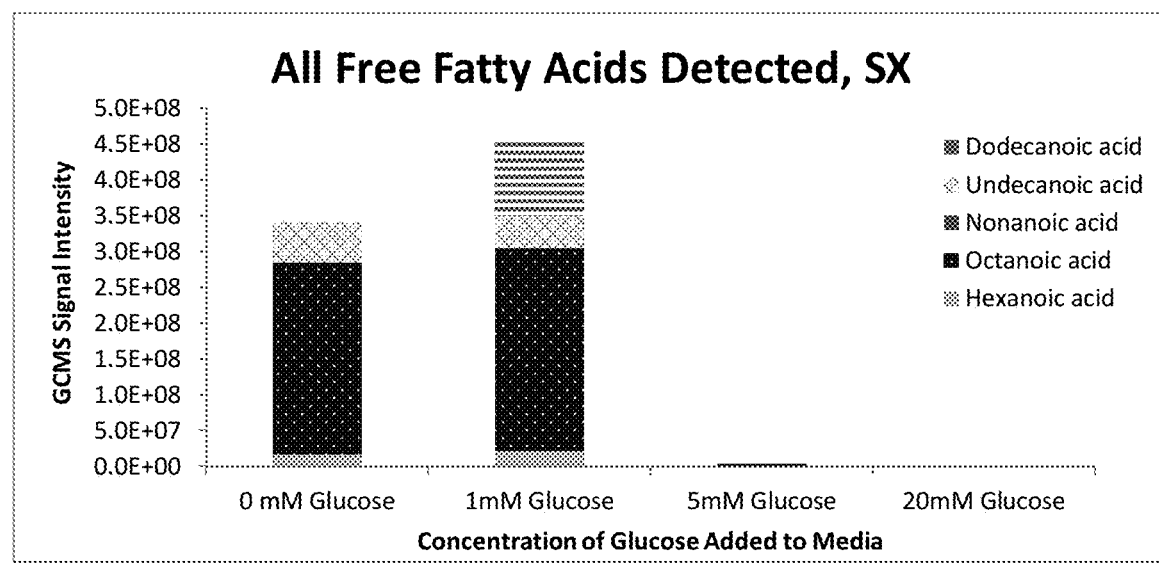
FIG. 15 is a bar graph depicting the signal intensity of free fatty acids as detected by GCMS in samples cultured with SX.
Figure 16:
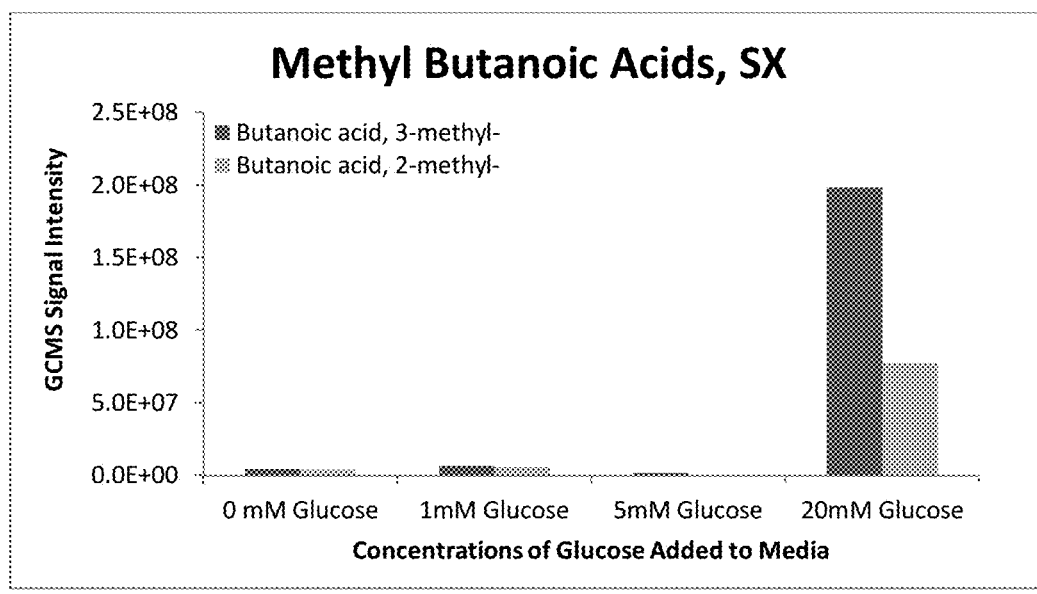
FIG. 16 is a bar graph depicting the signal intensity of 2-methyl and 3-methyl butanoic acids as detected by GCMS in samples cultured with SX.
Figure 17:
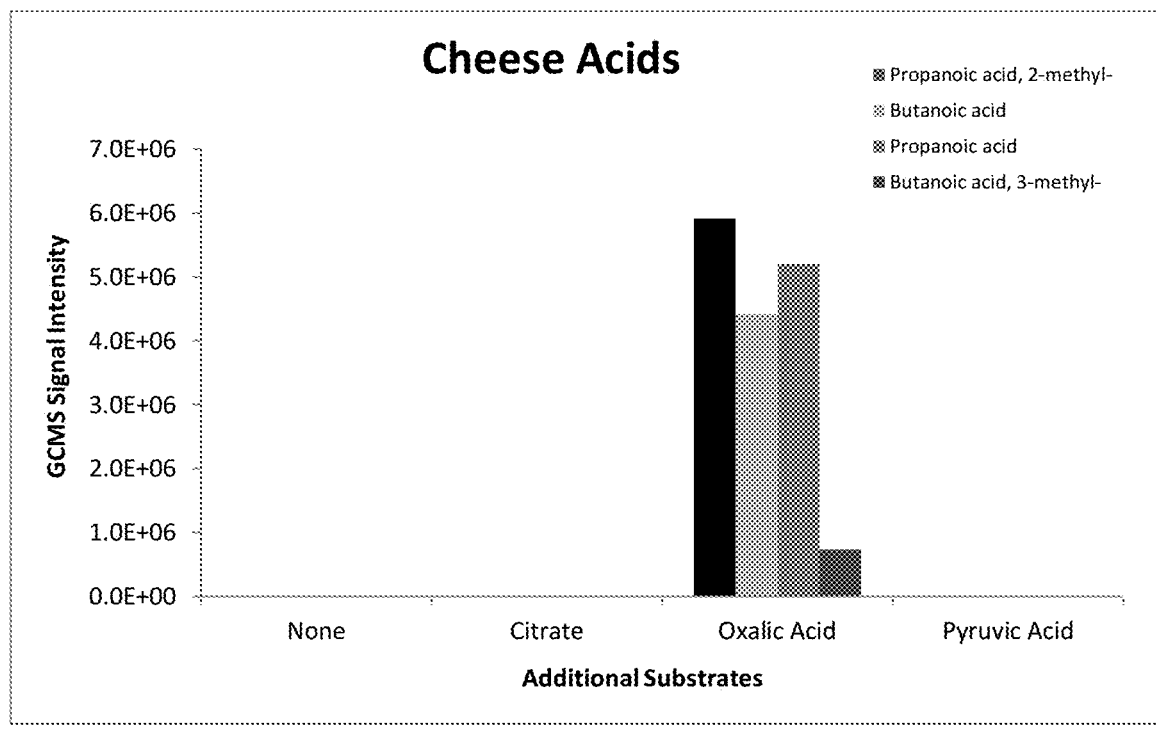
FIG. 17 is a bar graph depicting the signal intensity of the cheese acids (butanoic acid, propanoic acid, 3-methyl butanoic acid, and 2-methyl propanoic acid) as detected by GCMS in *Brevibacterium* cultured yeast extract media with additional substrates (citrate, oxalic acid, or pyruvate).
Figure 18:
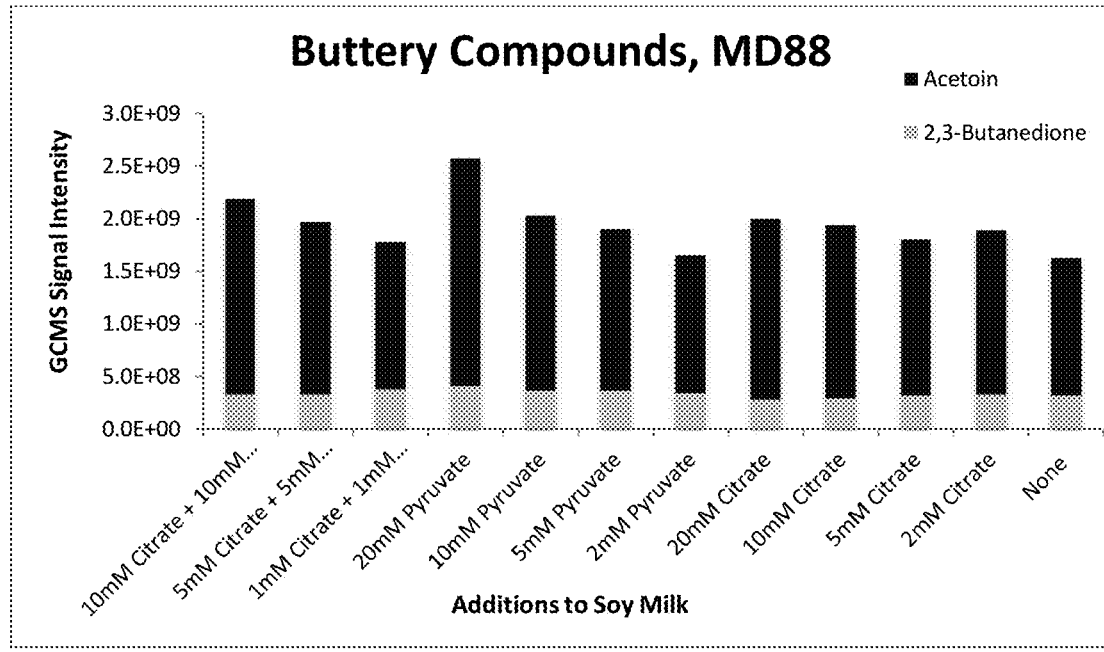
FIG. 18 is a bar graph depicting the signal intensity of "buttery"' compounds (acetoin and 2,3-butanedione) as detected by GCMS in soymilk samples cultured with MD88.
Figure 19:
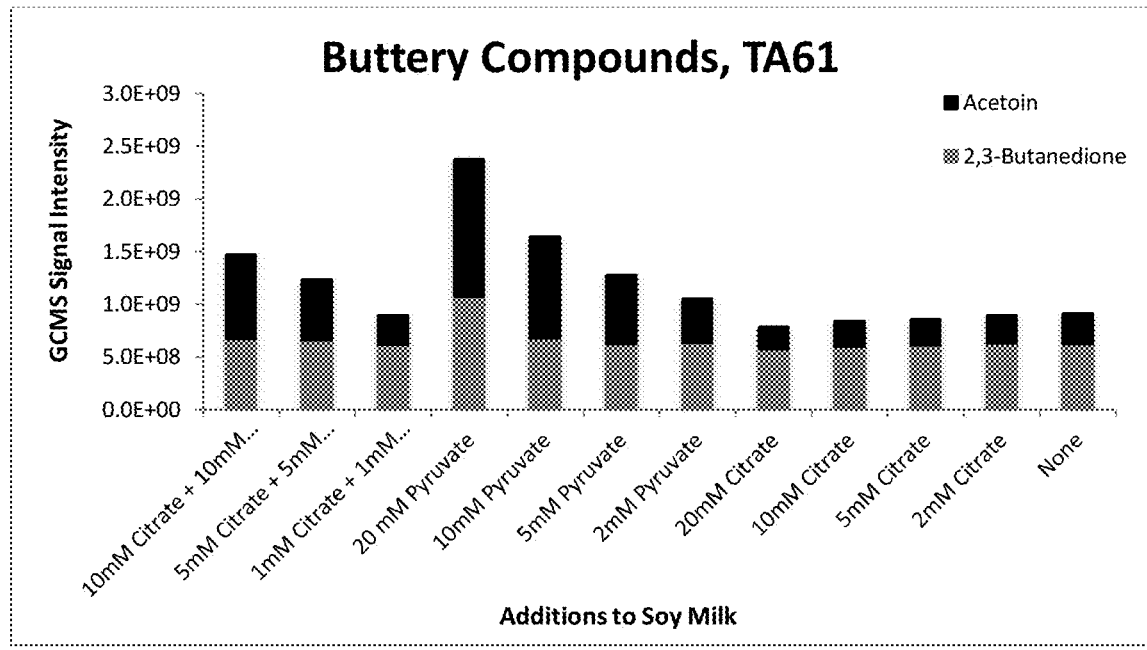
FIG. 19 is a bar graph depicting the signal intensity of "buttery"' compounds (acetoin and 2,3-butanedione) as detected by GCMS in soymilk samples cultured with TA61.

Example 26A: Use of *Staphylococcus* Xylosus to Develop "Cheesy" Flavors in Yeast Extract Media Three different microbes were cultured in YEM with 5% Refined Coconut Oil at 4 different glucose concentrations to determine if microbial growth in a low carbon environment could promote lipid degradation to free fatty acids. The YEM was composed of 0.5% yeast extracts (Flavor House, Inc, Item # X11020) and 20 mM potassium phosphate buffer, pH 7.0 which was sterile filtered and then combined with warm coconut oil. The whole mixture was sonicated to create a homogenous emulsion. The emulsified media mix was distributed to glass vials and sets were spiked with different glucose concentrations: 20 mM, 5 mM, 1 mM, or 0 mM. Each glucose gradient set then was inoculated with 0.005% (w/v) MD88 (CHOOZIT, Item # MD088 LYO 50 DCU), 0.005% (w/v) TA61 (CHOOZIT, Item # TA 61 LYO 50 DCU), or 5×10$^7$ cells/mL of *Staphylococcus xylosus* (SX) (in-house isolation). Samples inoculated with MD88 or SX were incubated at 30° C. with 200 rpm of shaking for 19 hours. Sample inoculated with TA61 were incubated at 37° C. with 150 rpm of shaking for 19 hours. Cultured samples were then smelled by two individuals, the pH measured, and analyzed by GCMS (SPME fiber sampling of headspace). Table 9 contains the recorded aroma descriptions for each sample after the 19-hour aerobic incubation. The samples inoculated with SX were the most interesting. At higher glucose concentrations the samples smelled fermented and fruity, while at lower glucose concentrations the samples smelled waxy and plastic suggesting the presence of free fatty acids. These observations were supported by the GCMS data which detected C6:0, C8:0, C9:0 & C11:0 free fatty acids in samples with 0 mM and 1 mM Glucose. See FIG. 15. At 20 mM Glucose, SX produced 2-methyl-butanoic acid and 3-methyl-butanoic acid, which are described in literature to have fermented, fruity, and cheesy aromas. See, FIG. 16.

TABLE 9

Aromas of each sample and the final pH of each sample

| Media Condition (SX) | pH | Aroma Results 1 | Aroma Results 2 |
|---|---|---|---|
| 20 mM Glucose | 5.5 | fruity, fermented, brothy | sweaty(butyric acid-like), feety-apricot |
| 5 mM Glucose | 7 | brothy, slight waxy | bready, potato |
| 1 mM Glucose | 5.5 | cheesy, plastic/waxy | waxy (C10:0) |
| 0 mM Glucose | 4.5 | plastic/waxy | lighter waxy, slight fruity noticed |

Example 26B: Use of *Brevibacterium* to Develop "Cheese" Flavors in Yeast Extract Media

*Brevibacterium* was cultured in YEM with several different keto-acids to determine if *Brevibacterium* will synthesize free fatty acids from keto-acids. The YEM was composed of 0.5% yeast extract (Flavor House, Inc, Item # X11020), 20 mM Potassium Phosphate buffer, pH 7.0, and 50 mM Glucose. Separate volumes were spiked with 10 mM of Pyruvic Acid (Sigma, Cat #10736), 10 mM trisodium citrate (QC Unlimited, LLC), or 10 mM Oxalix acid (Sigma, Item #194131). All samples were inoculated with 0.02% (w/v) *Brevibacterium/Corynebacteriae* (CHOOZIT, Item # LR LYO 10D) and incubated at 30° C. with 200 rpm of shaking for 22 hours. Cultured samples were then smelled, pH measured, and then analyzed by GCMS (SPME fiber sampling of headspace). Table 10 provides the recorded aroma descriptions by a trained flavor scientist for each sample after the 22-hour aerobic incubation. The sample with oxalic acid added was described and "goaty" and "waxy" which are characteristic odors of short chain free fatty acids. This observation was further supported by the GCMS data showing butanoic acid, propanoic acid, 3-methyl butanoic acid, and 2-methyl propanoic acid ("cheese" acids) only in the sample with oxalic acid.

TABLE 10

Aroma descriptions and measured pH values for *Brevibacterium* samples

| Sample Name | Aroma | pH |
|---|---|---|
| Pyruvic Acid | brothy, rotten | 6 |
| Citrate | earthy, musty, mushroom | 7 |
| Oxalic Acid | brothy, mushroom, goaty, waxy (aged cheese-like) | 4.5 |
| None | fermented, brothy, malty | 7 |

Example 27: Use of Pyruvic Acid and Ta61 to Enhance "Buttery" Flavors in Cultured Soymilk MD88 and TA61 were cultured in soy milk with varying concentrations of trisodium citrate and/or pyruvic acid to determine the affects on "buttery" aroma compound production. The soy milk (WestSoy, Unsweetened, Organic) was supplemented with 20% Coconut Milk (Sprouts, Premium), 50 mM Glucose, and 50 mM Sodium Chloride. Two separate volumes of soy milk media were inoculated with either 0.01% (w/v) MD88 (CHOOZIT, Item # MD088 LYO 50 DCU) or 0.01% (w/v) TA61 (CHOOZIT, Item # TA 61 LYO 50 DCU). Each set was divided into 12 volumes and spiked with: Na3-Citrate (QC Unlimited, LLC) at 20 mM, 10 mM, 5 mM, or 2 mM; Pyruvic Acid (Sigma, Cat #10736) at 20 mM, 10 mM, 5 mM, or 2 mM; and Citrate and Pyruvate at 10 mM & 10 mM, 5 mM & 5 mM, 1 mM & 1 mM; one sample was spiked with neither. Samples inoculated with MD88 were incubated at 30° C. for 24 hours, and samples inoculated with TA61 were incubated at 37° C. for 24 hours. After incubation, the samples were smelled by a trained flavor scientist, tasted, the pH measured, and then analyzed by GCMS (SPME fiber sampling of headspace). Tables 11 and 12 contain the recorded aroma and flavor descriptions for each sample after the 24-hour incubation. Soymilk samples inoculated with TA61 had a stronger buttery aroma in comparison to samples inoculated with MD88. The most "buttery" TA61 samples were those spiked with only low concentrations of pyruvate or citrate; a higher pyruvate concentration resulted in a more "creamy" aroma. The addition of higher citrate concentrations also resulted in more sour and astringent tasting samples. The GCMS results from each sample set show that only the addition of pyruvate to soymilk cultured with TA61 increase the acetoin production. The addition of citrate to soymilk does not significantly enhance the production of buttery aroma compounds by MD88 or TA61 in soymilk. Similarly, the addition of pyruvate to soymilk has no effect on acetoin or 2,3-butanedione production by MD88.

TABLE 11

Measured pH, and aroma and flavor descriptions of each MD88 cultured sample.

| Samples with MD88 | Aroma | pH | Taste |
|---|---|---|---|
| No Addition | butter, coconut, cream, light green | 4.5 | sour, creamy, soymilk |
| 2 mM Citrate | butter, sour, cream | 4.5 | sour, creamy, soymilk |

TABLE 11-continued

Measured pH, and aroma and flavor descriptions of each MD88 cultured sample.

| Samples with MD88 | Aroma | pH | Taste |
|---|---|---|---|
| 5 mM Citrate | creamy, butter, light cereal | 4.5 | sour, creamy, soymilk |
| 10 mM Citrate | creamy, wheat, light butter | 4.5 | sour, astringent, soymilk taste |
| 20 mM Citrate | creamy, light butter, wheat | 4.5 | sour, astringent, citrus, soymilk |
| 2 mM Pyruvate | buttery, sour, light green | 4.5 | sour, creamy, soymilk |
| 5 mM Pyruvate | malty, wheat | 4.5 | sour, soymilk |
| 10 mM Pyruvate | sour, light butter, wheat | 4.5 | sour, soymilk |
| 20 mM Pyruvate | sour, creamy, wheat | 4.5 | sour, soymilk |
| 1 mM Pyruvate, 1 mM Citrate | butter, creamy, wheat | 4.5 | light sour, soymilk |
| 5 mM Pyruvate, 5 mM Citrate | butter, cream | 4.5 | sour, soymilk |
| 10 mM Pyruvate, 10 mM Citrate | sour, slight citrus, light butter, wheat | 4.5 | sour, soymilk |

TABLE 12

Measured pH, and aroma and flavor descriptions of each TA61 cultured sample.

| Samples with TA61 | Aroma | pH | Taste |
|---|---|---|---|
| 0 mM Citrate or Pyruvate | butter, soy | 4 | sour, cream, soymilk |
| 2 mM Citrate | butter, soy | 4 | sour, soymilk |
| 5 mM Citrate | butter, cream, wheat | 4 | sour, soymilk |
| 10 mM Citrate | creamy, light butter, wheat | 4 | sour, citrus, soymilk |
| 20 mM Citrate | cream, wheat | 4 | sour, citrus, soymilk |
| 2 mM Pyruvate | butter, creamy | 4 | sour, soymilk |
| 5 mM Pyruvate | buttery, cream, sweet, wheat | 4 | sour, soymilk |
| 10 mM Pyruvate | creamy, light butter, wheat | 4 | sour, soymilk |
| 20 mM Pyruvate | cream, sweet, wheat | 4 | sour, soymilk |
| 1 mM Pyruvate, 1 mM Citrate | buttery, creamy | 4 | sour, soymilk |
| 5 mM Pyruvate, 5 mM Citrate | cream, butter, sweet | 4 | very sour, soymilk |
| 10 mM Pyruvate, 10 mM Citrate | sweet, cream, wheat | 4 | very sour, citrus, soymilk |

Figure 20:
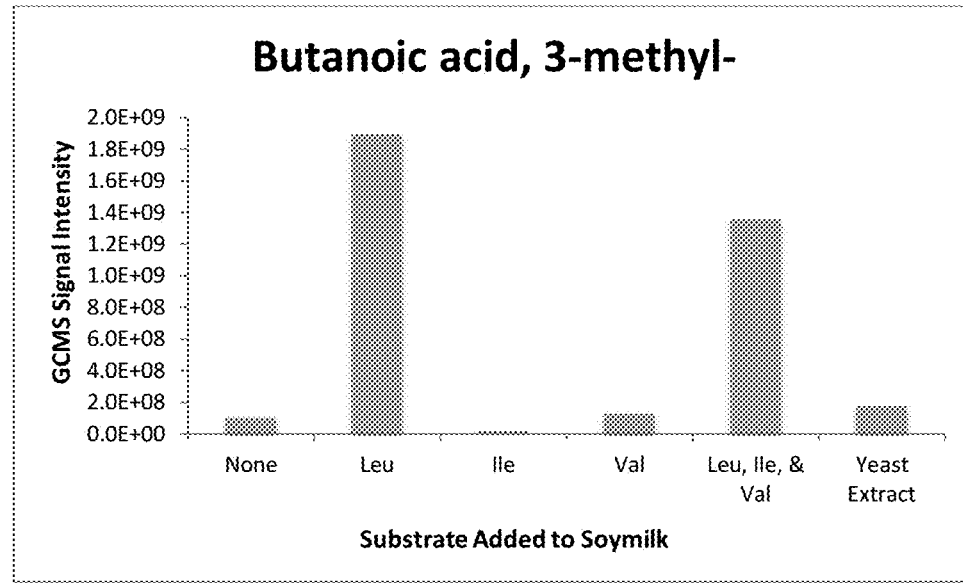
FIG. 20 is a bar graph depicting the signal intensity of 3-methyl-butanoic acid, as detected by GCMS, produced by SX in soymilk with various branched chain amino acids supplemented.
Figure 21:
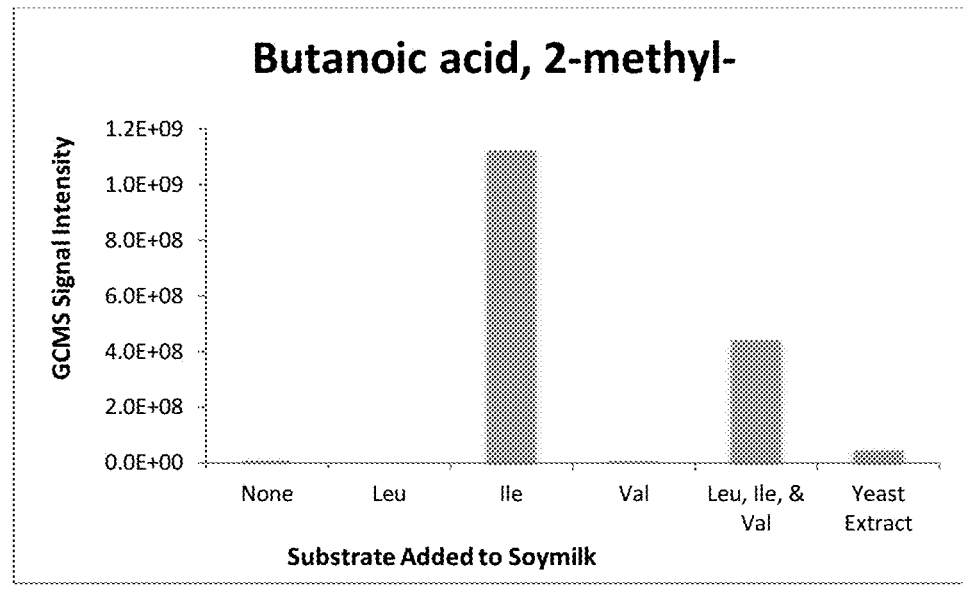
FIG. 21 is a bar graph depicting the signal intensity of 2-methyl-butanoic acid, as detected by GCMS, produced by SX in soymilk with various branched chain amino acids supplemented.
Figure 22:
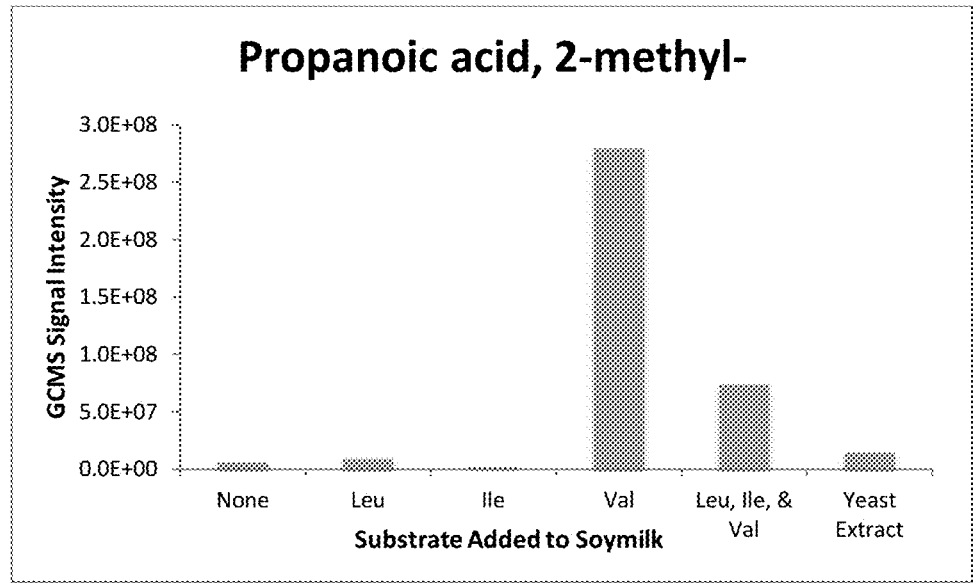
FIG. 22 is a bar graph depicting the signal intensity of 2-methyl-propanoic acid, as detected by GCMS, produced by SX in soymilk with various branched chain amino acids supplemented.
Figure 23:
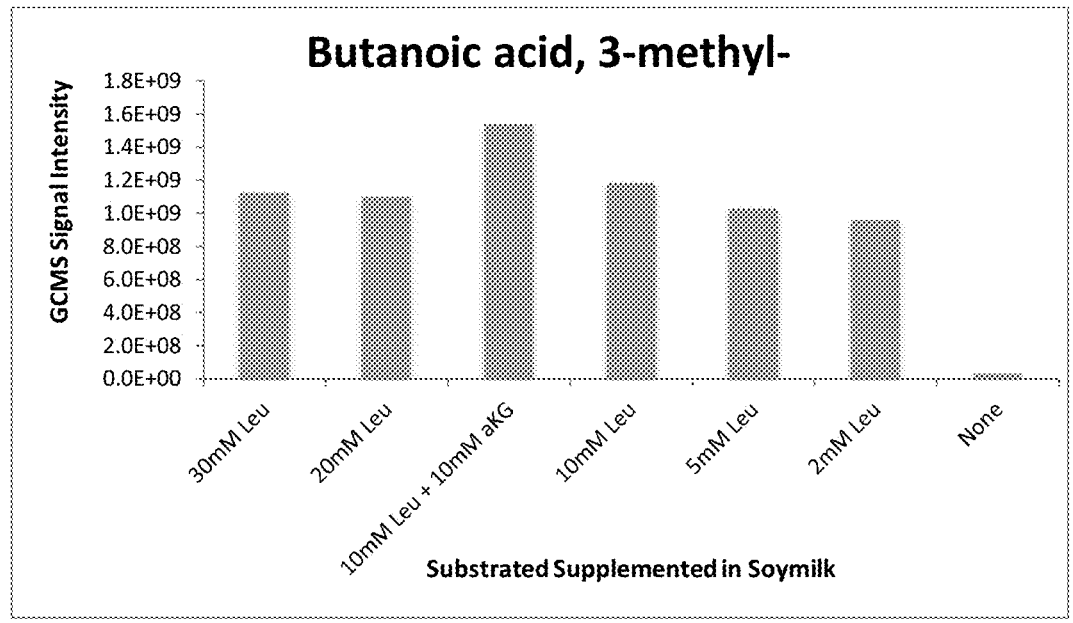
FIG. 23 is a bar graph depicting the signal intensity of 3-methyl-butanoic acid as detected by GCMS in soymilk samples cultured with different concentrations of leucine.
Figure 24:
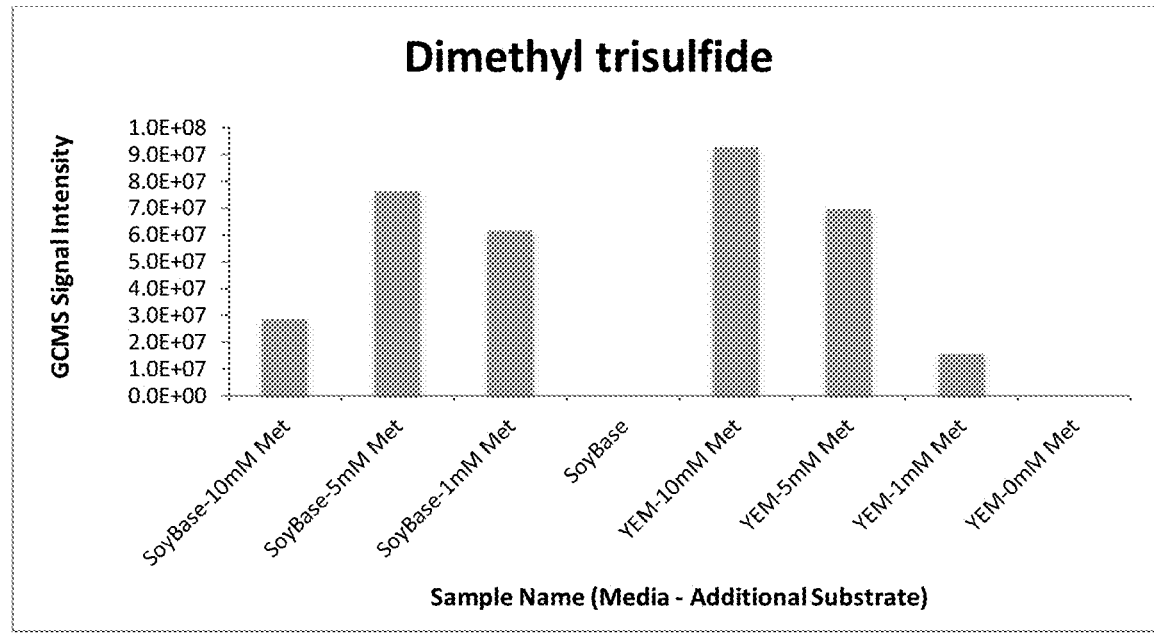
FIG. 24 is a bar graph depicting the signal intensity of dimethyl trisulfide as detected by GCMS in *Brevibacterium* cultured samples.

Example 28A: Use of *Staphylococcus Xylosus* to Develop "Cheesy" Acids in Soymilk SX was cultured in soy milk with varying branched chain amino acids to determine affects of supplemental amino acids on 3-methyl-butanoic acid, 2-methyl butanoic acid, and 2-methyl propanoic acid production by SX. The soy milk (WestSoy, Unsweetened, Organic) was supplemented with 20% Coconut Milk (Sprouts, Premium), 50 mM Glucose, and 50 mM Sodium Chloride. Leucine (Leu), Isolecuine (Ile), and Valine (Val) were spiked in at 10 mM into separate samples. An additional sample was spiked with all 3 amino acids at 6 mM. A final sample included 0.5% yeast extract (Flavor House Inc, Item #090656) as a source of branched chain amino acids. All samples were then inoculated with $1\times10^8$ cells/mL of SX and incubated at 37° C. for 24 hours. Cultured samples were analyzed by GCMS (SPME fiber sampling of headspace). FIGS. 20-22 depict the GCMS data for the 3-methyl-butanoic acid, 2-methyl butanoic acid, and 2-methyl propanoic acid detected in each sample after the 24-hour incubation. The addition of leucine increased 3-methyl butanoic acid production while the addition of isoleucine increased 2-methyl butanoic acid production. Similarly, addition of valine increased 2-methyl propanoic acid production.

Example 28B: Use of *Staphylococcus Xylosus* to Develop 3-Methyl Butanoic Acid in Soymilk SX was cultured in soymilk with varying concentrations of leucine to determine affects of supplemental leucine on 3-methyl-butanoic acid production by SX. The soymilk (WestSoy, Unsweetened, Organic) was supplemented with 20% Coconut Milk (Sprouts, Premium), 50 mM Glucose, and 50 mM Sodium Chloride. Leucine was spiked in to separate samples at 30 mM, 20 mM, 10 mM, 5 mM, 2 mM, and 0 mM. Additionally, a sample with 10 mM leucine was spiked with an additional 10 mM of alpha-ketoglutaric acid (aKG). All samples were then inoculated with $1\times10^8$ cells/mL of SX and incubated at 30° C. for 24 hours. Cultured samples were smelled by a trained flavor scientist, tasted, the pH measured, and then analyzed by GCMS (SPME fiber sampling of headspace). Table 13 contains the recorded aroma and flavor descriptions for each sample after the 24-hour incubation. All samples spiked with leucine had a "dried apricot" aroma and a sweet taste for the lower leucine concentrations and a savory taste for the greater leucine concentrations. The GCMS supports the aroma descriptions and shows all samples with additional leucine have significantly higher 3-methyl butanoic acid. A change in GCMS signal was considered to be significant if was greater than 3× the signal of a compared sample. In this case, the sample with 2 mM Leu was detected to have 28× the signal for 3-methybutanoic acid as the sample without Leu (0 mM).

TABLE 13

Measured pH, aroma descriptions, and flavor descriptions of each SX cultured sample

| [Leucine] (mM) | Aroma | pH | Taste |
|---|---|---|---|
| 0 | old dried apricots, sour, slight musty | 5.5 | soymilk, slight astringent |
| 2 | dried apricots, caramel | 5.5 | slight sweet, yogurt-like, wheat |
| 5 | dried apricots, caramel | 5.5 | slight sweet, savory-note, wheat |
| 10 | dried apricots, malty | 5.5 | savory, dried apricots |
| 20 | dried apricots, malty | 5.5 | savory, light sickly-sweet, apricots |
| 30 | dried apricots, malty, slight octane | 6 | savory, wheat, salty, apricots, musty |
| 10, plus 10 mM aKG | dried apricots, malty, slight musty | 5.5 | savory, dried apricots |

Example 29: Use of *Brevibacterium* and Methionine to Produce Dimethyl Trisulfide

*Brevibacterium* was cultured in soy milk and YEM with varying concentrations of methionine to determine affects of supplemental methionine on "cheesy" aroma production by *Brevibacterium*. The soymilk (SunOpta, SoyBase) was supplemented with 50 mM Glucose and the YEM was composed of 0.5% yeast extracts (Flavor House, Inc, Item # X11020), 20 mM potassium phosphate buffer, pH 7.0, and 50 mM glucose. Both media types were inoculated with 0.02% (w/v) *Brevibacterium/Corynebacteriae* (CHOOZIT, Item # LR LYO 10D) and incubated at 30° C. with 200 rpm of shaking for 22 hours. Cultured samples were then smelled, pH measured, and then analyzed by GCMS (SPME fiber sampling of headspace). Table 15 contains the recorded aroma and flavor descriptions for each sample after the 22-hour incubation. All samples with methionine added had a "fermented" and "fishy" aroma. The GCMS data suggests that this strong aroma is from dimethyl trisulfide. Methionine can be deaminated to create methional which is a desired aged/cheddar cheese aroma compound. Additionally, *Brevibacterium* is normal cultured on the outside of cheese and will produce methional during the aging process.

TABLE 15

Aroma descriptions and sample pH after 22-hour incubation of *Brevibacterium* in SoyBase and yeast extract media with varying Methionine concentrations.

| Sample Name | Aroma | pH |
|---|---|---|
| SoyBase-10 mM Met | fermented, thiol, potato | 7 |
| SoyBase-5 mM Met | fermented, fishy, potato | 7 |
| SoyBase-1 mM Met | fishy, fermented, strong fried potato | 7 |
| SoyBase | soy milk, mushroom, earthy | 7 |
| YEM-10 mM Met | fermented, fishy, potato | 7.5 |
| YEM-5 mM Met | fermented, fishy, potato | 7 |
| YEM-1 mM Met | lighter fermented, fishy, potato | 7 |
| YEM | fermented, brothy, malty | 7 |

Example 30: Production of Microbial Cheese Flavor Production in Pea Cheese Replicas A 50 mg/mL solution of isolated pea vicilin (PV) protein (purified to greater than 80%) was heated to 90° C. for 30 minutes to denature the proteins used as the base for cheese flavor development by SX, TA61, and MD88 cultures. The denatured PV was supplemented with 20% Coconut Milk (Aray-D), 20 mM Glucose, and 0.5% (w/v) yeast extract (BioSpringer, Item #2020). Four different culturing procedures were followed: (i) SX culture followed by MD88 culture (SX/MD88), (ii) SX and MD88 co-culture (SX+MD88), (iii) SX culture followed by TA61 culture (SX/TA61), and (iv) SX and TA61 co-culture (SX+TA61). All samples were inoculated with 1×10$^8$ cells/mL SX and specified samples were inoculated with 0.05% (v/w) MD88 (CHOOZIT, Item # MD088 LYO 50 DCU) or 0.05% (w/v) TA61 (CHOOZIT, Item # TA 61 LYO 50 DCU). For sequentially cultured samples, the SX was cultured at 30° C. with 200 rpm of shaking for 24 hours. Then specified samples were inoculated with MD88 or TA61 and additional substrates (40 mM Glucose, 10 mM Na3-Citrate, 2 mM Methionine, and 3 mM MgCl$_2$).

Figure 25:
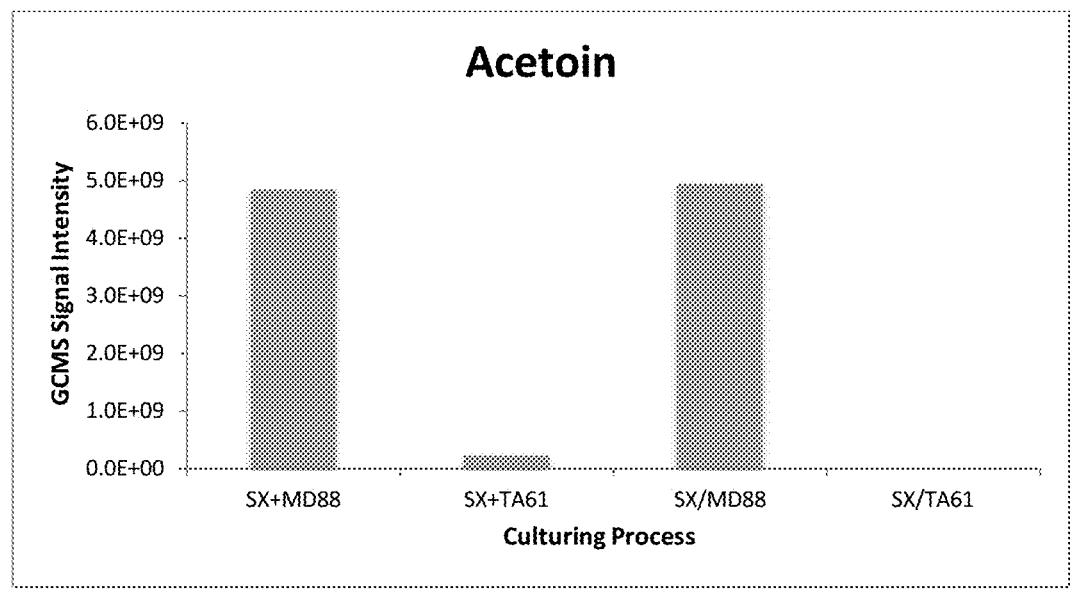
FIG. 25 is bar graph depicting the signal intensity of acetoin as detected by GCMS in cultured PV with coconut milk.
Figure 26:
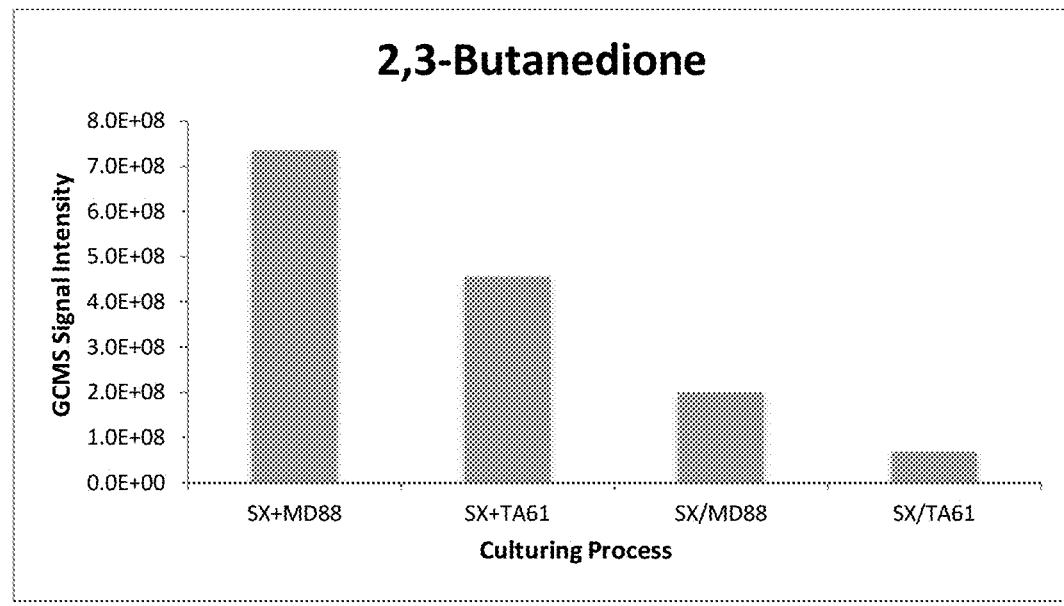
FIG. 26 is bar graph depicting the signal intensity of 2,3-butanedione as detected by GCMS in cultured PV with coconut milk.
Figure 27:
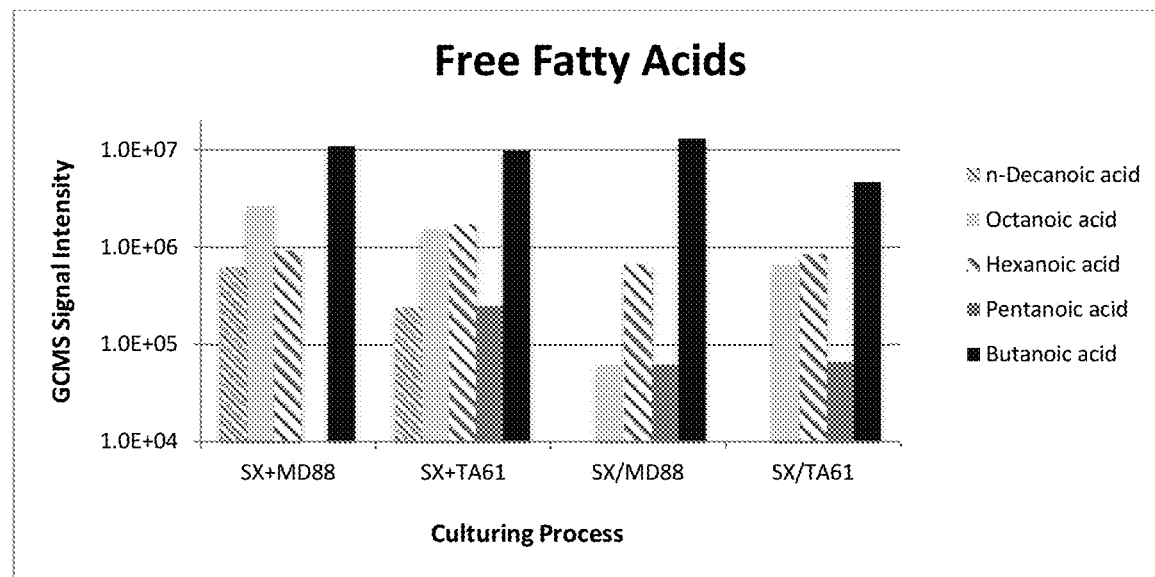
FIG. 27 is bar graph depicting the signal intensity of free fatty acids as detected by GCMS in cultured PV with coconut milk.

All samples were incubated a second time with 200 rpm of shaking for 22 hours; MD88 inoculated samples were incubated at 30° C. and TA61 inoculated samples were incubated at 37° C. Co-cultured samples contained SX, the additional substrates (40 mM Glucose, 10 mM Na3-citrate, 2 mM methionine, and 3 mM MgCl$_2$), and MD88 or TA61. Samples with MD88 were incubated at 30 C. while samples with TA61 were incubated at 37° C., but all samples were shaken at 200 rpm for the 24-hour incubation. Once all samples were cultured, the samples were smelled and tasted by a trained flavor scientist, the pH was measured, and then samples analyzed by GCMS (SPME fiber sampling of headspace). The samples were created into cheese replicas by adding in 20 mM CaCl$_2$ to solidify the replicas. Table 16 contains the recorded aroma and flavor descriptions for all samples cultured with PV. Most samples smelled "buttery" and/or "creamy" and these descriptions are supported by the GCMS data showing the presence of acetoin and 2,3-butanedione. See, FIGS. 25 and 26. FIG. 27 shows the free fatty acids detected by GCMS in cultured PV with coconut milk.

TABLE 16

Aroma, flavor and pH descriptions of cultured pea vicilins with coconut milk.

| Sample Name | Final pH | Aroma | Flavor |
|---|---|---|---|
| SX + MD88 A | 5 | buttery, slight burnt, light cream, coconut | burnt, buttery, slight astringent |
| SX + MD88 B | 4.5 | buttery, creamy, slight burnt | sour, buttery, slight grainy |
| SX + TA61 A | 5 | buttery, creamy, nutty | strong burnt, pea, sour |
| SX + TA61 B | 4.5 | buttery, creamy, pea protein | sour, strong savory, burnt |
| SX/MD88 A | 5 | sweet, floral, buttery, light burnt | strong savory, sour, burnt |
| SX/MD88 B | 5 | fruity, liquor | savory, burnt |
| SX/TA61 A | 4.75 | malty, caramel, cream | savory, burnt |
| SX/TA61 B | 4.75 | fruity, malty | fruity, savory, light burnt |

Example 31: Direct Control of the Creation of Flavor Compounds by Bacteria

To control flavor production of different aroma compounds produced by bacteria, MA11, MD88, TA61 were tested in a low odor media (LOM). Two controls were run, one with only LOM+MA11 and one with LOM only. A stock volume of LOM was made, sterile filtered, and stored at 4° C. thorough the study. Bacteria concentration of 1×10$^8$ cells/mL was added to a stock. This LOM with bacteria was aliquoted into the required number of 10 mL GC vials. To each individual vial, the pre-determined amount of additive was added. All vials were covered tightly with tin foil, stored at 30° C. for ~24 hours, and then 4° C. for ~24 hours. After culturing, the vials were allowed to warm to room temperature as the final reaction pH was checked with pH strips. The pH of each vial was adjusted to 3-3.5 with 6M HCl. Each vial was smelled by a trained flavor scientist and the aroma was recorded. All vials were capped and run on the GCMS. Original data was analyzed using the ChromoTOF library then aligned for each additive type. Table 17 shows the LOM that was used for each of the different bacteria, TA61 was not able to grow in the other media. Table 18 shows the compounds created or eliminated by which bacteria and the additives that control its production.

TABLE 17

Low odor media to determine how additives control flavor generation by different bacteria

| | TA61 | MD88, MA11 |
|---|---|---|
| yeast extracts | 0.50% | 0 |
| Peptone (from Pea) | 0.10% | 0.10% |
| K-phos buffer, pH 7.15 | 50 | 100 |
| MgCl2 | 2 | 2 |
| FeCl2 | 2 | 0 |
| Glucose | 50 | 25 |
| NaCl | | 20 |

TABLE 18

| Aroma | Compound | To increase the compound . . . | To decrease the compound . . . |
|---|---|---|---|
| herbal, sweet green | 1-Hexanol | Mango + MD88 | |
| | 2-Nonanone | Ala + MA11, (CoA, FAD, Lipoic Acid, Thiamine) + MA11, CuSO$_4$ + MA11 | (Folic Acid, Citric Acid, Pyruvate) + MA11 |
| acetone-like, fruity, butterscotch | 2-Butanone | Ile + TA61, Thiamine + TA61, Ascorbic acid + TA61, Mg +TA61, Riboflavin + MA11, Ascorbic Acid + MA11, FeCl$_2$ + MA11, Ascorbic Acid + MD88, C10:0-C16:1 + MD88, Oils + MD88 | Ca + TA61, C3:0 + MA11, C4:0 + MA11, C6:0 + MA11, C8:0 + MA11, amino acids + MD88, Citric acid + MD88, C3:0-C8:0 + MD88 |
| sweet, fruity, fatty | 2-ethyl-1-Hexanol | NAD, FAD, B12, Folic, Nicotinic, Riboflavin, Thiamine, CoenzymeA, lipoic acid, α-Ketoglutarate with TA61 | TA61 + Amino Acids |
| cheese, fruity, coconut | 2-Heptanone | Pro + TA61, Ser + TA61, Thiamine + TA61, Mg + TA61, NAD + MA11, (CoCl$_2$, CuSO$_4$) + MA11, Coconut Oil + MD88, Valine + MD88 | Asp + TA61, Glu + TA61, Met + TA61, Co + TA61, Ala + MA11, citric acid + MA11, CaCl$_2$ + MA11, MNSO$_4$ + MD88, Nicotinic Acid + MD88 |
| green, herbal, cheesy, fresh | 2-Nonanone | Pro + TA61, Ser + TA61, Citric acid + TA61, Malic acid + TA61, Lipoic acid + TA61, Valine + MD88 | |
| fruity, woody, fermented | 2-Pentanone | Amino Acid + MD88, Metals + MD88 | Most Organic Acids + MD88 |
| buttery | 2,3-Butanedione | Ala + TA61, Phe + TA61, Pro + TA61, Pyridoxine + TA61, Citric + TA61, Pyruvate + TA61, Xanthine + TA61, Malate + TA61, Inosine + TA61, Zn$^{2+}$ + TA61, Pyruvate + MA11, CoCl2 + MA11, Citric Acid + MD88, Pyruvate + MD88, Riboflavin + MD88, C16:1 + MD88 | Ile + TA61, Lue + (Ala, Asn, Glu) + MA11, Nicotinic acid + MA11, C3:0 + MA11, C4:0, C6:0, C10:0, C12:0, C14:0, Most Oils and Fatty Acids |
| pungent, fruity, musty | Acetylaldehyde | Thr + TA61, Riboflavin, +TA61, Thiamine + TA61, Ascorbic acid + TA61, Lipoic acid + TA61, Mg + TA61, Riboflavin + MA11, (CuSO$_4$, FeCl$_2$) + MA11, Thr + MD88, Ascorbic Acid + MD88 | Ala + TA61, Asp + TA61, Glu + TA61, Mn + TA61, Ala + MA11, (CaCl$_2$, CoCl$_2$) + MA11 |
| sour | Acetic acid | Ile + TA61, Biotin + TA61, p-aminobenzoic acid + TA61, Citric acid + TA61, Malic acid + TA61, Inosine + TA61, Pyruvate + TA61, MA11, (Riboflavin + CoA) + MA11, CuSo4 + MA11, Citric Acid + MD88, Riboflavin + MD88 | Asp + TA61, Glu + TA61, MA11 + Ala, NAD + MA11, FeCl$_2$ + MA11 |
| buttery | Acetoin | Ile + TA61, Biotin + TA61, p-aminobenzoic acid + TA61, Thiamine + TA61, Citric acid + TA61, Inosine + TA61, Pyruvate + TA61, Malate + TA61, Xanthine + TA61, Mg$^{2+}$ + TA61, Zn$^{2+}$ + TA61, Co + TA61, Citric Acid + MD88, Pyruvate + MA11, CoCl$_2$ + MA11Pyruvate + MD88, Riboflavin + MD88, C16:1 + MD88, Citric Acid + MD88, Pyruvate + MD88, Riboflavin + MD88, C16:1 + MD88 | Asp + TA61, Glu + TA61, (Ala, Asn, Glu) + MA11, Nicotinic acid + MA11, C3:0, C4:0, C6:0, C10:0, C12:0, C14:0 |
| | Acetone | Pro + TA61, Ascorbic acid + TA61, Citric acid + TA61, (Ala, Asn, Met, Pro) + MA11, (NAD, Riboflavin, CoA, FAD, Lipoic Acid, Nicotinic acid, thiamine, B12, Folic Acid, Biotin) + MA11, CaCl$_2$ + MA11, Oxalic Acid + MD88, Ascorbic Acid + MD88, Met + MD88 | Riboflavin + MD88, Citric Acid + MD88 |
| bitter almonds, cherry | Benzaldehyde | Riboflavin + TA61, Ascorbic + TA61, Mn$^{2+}$ + TA61, MnSO$_4$ + MA11, (C16:0, C18:0) + MA11, Nicotinic Acid + MD88 | Ala + TA61, Pro + TA61, p-aminobenzoic acid + TA61, Inosine + TA61, Malate + TA61, Xanthine + TA61, Ca$^{2+}$ + TA61, Mg$^{2+}$ + TA61, (Ala, Asn, Asp, Glu, Ile, Leu, Lys, Met, Pro, Tyr) + MA11, (FAD, NAD, Thiamine, riboflavin, ascorbic acid) + MA11, (CaCl$_2$, CuSO$_4$, FeCl$_2$) + MA11, (C10:0, C12:0) + MA11, FeCl$_2$ + MD88, CuSO$_4$ + MD88, Ascorbic Acid + MD88 |

TABLE 18-continued

Aroma compounds production controlled by different bacteria with additives

| Aroma | Compound | To increase the compound . . . | To decrease the compound . . . |
|---|---|---|---|
| Cocoa, green, malty coco, coffee, nutty chocolate, peachy, fatty | Butanal Butanal, 2-methyl- Butanal, 3-methyl- | Pro + TA61, $Ca^{2+}$ + TA61, Ascorbic Acid + MD88 Riboflavin + TA61, Ascorbic Acid + MD88, p-aminobenzoic acid + MD88 | TA61 in general amino acid + MD88 TA61 in general, amino acid + MD88, Nicotinic acid + MD88, Riboflavin + MD88, Thiamine + MD88 |
| acidic, dirty, cheese nuance | Butanoic Acid and Derivatives Ethanol Ethyl Acetate Methyl Butanals | Ile + TA61, Ala + TA61, Pro + TA61, Inosine + TA61, Malic acid + TA61, $Fe^{2+}$ + TA61, $Mg^{2+}$ + TA61 Ile, Biotin, p-aminobenzoic acid, Inosine, Malate, $Mg^{2+}$ with TA61, MA11, (NAD, Riboflavin, CoA, FAD, Lipoic Acid, Nicotinic acid, thiamine, B12, Folic Acid, Biotin) + MA11, Oxalic Acid + MD88 Pro + MA11 (CoA, Lipoic Acid, Riboflavin, Nicotinic Acid, B12, Folic Acid, Biotin) + MA11 | Thiamine + TA61 (Ala, Asn, Met, Pro) + MA11, MA11 in general, $Ca^{2+}$ + MA11, C3:0, C4:0, C6:0 |
| spicy note, floral | 2-methyl-Propanal | Pro + TA61, Riboflavin + TA61, Ascorbic + TA61, $Mn^{2+}$ + TA61, Ascorbic Acid + MD88, $MnSO_4$ + MD88 | Ala + TA61, Asn + TA61, Pro + TA61, p-aminobenzoic acid + TA61, Citric + TA61, Malate + TA61, $Ca^{2+}$ + TA61 |

Example 32: Culturing Conditions for America Cheese Type Flavor in Non-Dairy Cheese Replica To prepare a non-dairy replica with an American cheese type flavor, the ingredients in Table 19 can be cultured at 30° C. for 24 hours in a closed container with headspace. The resulting material from this culture can be cultured with the ingredients in Table 20 at 37° C. for 24 hours in a closed container with headspace.

TABLE 19

| Components | Concentrations |
|---|---|
| Soymilk or Pea Vicilin | 80% |
| Coconut | 20% |
| Leucine | 2 mM |
| Yeast Extract 090656 or X11020 | 0.5% |
| Glucose | 50 mM |
| Isolated SX Culture | $1 \times 10^8$ cells/mL |

TABLE 20

| Components | Concentrations |
|---|---|
| Material from '1st culture' | 100% |
| Methionine | 5 mM |
| $MgCl_2$ | 5 mM |
| Pyruvate | 15 mM |
| Glucose | 50 mM |
| TA61 | $1 \times 10^8$ cells/mL |

Example 33A: Cheese Replica Containing Coacervates Made of Plant Proteins

A cheese replica was made by first preparing a 3% (w/v) solution of pea vicilins and pea legumins (vicilin:legumin ratio of 3:1 by weight, purified to >90%) in 20 mM potassium phosphate pH 7.4+100 mM sodium chloride. Melted palm oil (from Jedwards International) was added to the solution to a final concentration of 5% (v/v) and mixed by vortexing. The emulsion was then acidified by addition of hydrochloric acid while stirring to a pH of 5. The resulting slurry was centrifuged and the liquid top layer was decanted off to obtain the coacervate. This material was creamy in texture at room temperature, solidified when on chilled ice, and melted when heated.

Example 33B: Cheese Replica Containing Coacervates that is Further Processed by Crosslinking Proteins A cheese replica was prepared by first making a coacervate from a 3% (w/v) solution of pea proteins at 3:1 pea vicilin:legumin ratio and cocoa butter (from Jedwards International) using the method described in Example 33A. The coacervate was collected by centrifugation and further processed by enzymatically crosslinking its constituent proteins using a transglutaminase (Ajinomoto) at a final concentration of 1% (w/v). The material was allowed to incubate with stirring overnight at 30° C. The resulting cheese replica was a firm, elastic material similar to aged cheeses such as cheddar at room temperature.

Example 33C: Cheese Replica Containing Coacervates that is Further Processed by a Heat-Cool Cycle A cheese replica was prepared by first making coacervate from a 3% (w/v) solution of pea proteins at a 3:1 pea vicilin:legumin ratio and canola oil using the method described in Example 33A. The coacervate was collected and heated in a water bath to 70° C. for 10 minutes in a closed container, then removed from the water bath to allow it to cool back to room temperature. The resulting material was a firm cheese replica resembling hard cheeses.

Example 33D: Use of Coacervate to Make Meltable Cheese Replica Slices Using High Pressure Processing A cheese slice-replica was made by mixing 12 g soymilk curd (soymilk from Westsoy sequentially cultured with cheese cultures TA61 and MD88 (both TA61 and MD88 from Danisco) and drained to collect curd) with 12 g of crude soy protein mixture (at a protein concentration of 14% w/v), 6.7 mL of canola oil (final concentration of 20% v/v) and 2.8 g freeze-dried pea legumin (final pea legumin concentration of 8% w/v). The mixture was acidified to pH 5 using lemon juice to produce a cheese sauce-like consistency at room temperature. The sample was sealed in a heat-sealable food-saver plastic bag and then subjected to high pressure processing (85 k psi for 5 minutes in an Avure 2 L Isostatic Food Press). The samples were removed from the bags and then evaluated for firmness and melting properties.

The high pressure processing caused the samples to solidify into a cheese slice-replica that melted when heated in an oven set to 350° F. Firmness of the replica was found to be comparable to Kraft American singles using compression test on a TA.XT2 texture analyzer (slices were cut into 1 cm diameter disks and stacked to a height of ~5 mm. Flat cylinder probe of diameter 25 mm was used to compress the samples at 0.5 mm/sec compression rate up to a distance of 2 mm. The compression force was measured to be 19.2 g for Kraft American singles and between 7.3 g-12.2 g for the replicas).

Example 33E: Modulating Viscosity of the Coacervate by Varying the Pea Legumin:Vicilin Ratio Coacervates were prepared as described in Example 33A using 1:1 or 1:3 pea vicilin:legumin mixtures at a total protein concentration of 10% (w/v) in 20 mM potassium phosphate buffer pH 7.4+100 mM sodium chloride, 10% canola oil (v/v)+10% cocoa butter (v/v) (from Jedwards International). The mixtures were acidified to pH 5 using 1N hydrochloric acid and centrifuged at 5000×g for 10 minutes to collect the coacervate. The coacervate sample from the 1:1 vicilin:legumin mixture was more creamy and sauce-like in appearance at room temperature and set when chilled on ice. In contrast, the sample prepared from the 1:3 vicilin:legumin ratio was more viscous and did not flow at room temperature.

Example 33F: Modulating Viscosity of the Coacervate by Varying the Type of Oil

Coacervate were prepared as described in Example 33A using a 1:1 pea vicilin:legumin mixture at a total protein concentration of 10% (w/v) in 20 mM potassium phosphate buffer pH 7.4+100 mM sodium chloride. Fat, either canola oil or cocoa butter at 16% w/v, or 10% canola oil (v/v)+10% cocoa butter (v/v) (all oils from Jedwards International), was added to the protein solution and the mixture was emulsified by sonication, then acidified to a pH of 5 using 1N hydrochloric acid. The coacervates (cheese replicas) were collected by centrifugation at 5000×g for 10 minutes. The replica made using cocoa butter was viscous, did not flow easily at room temperature and solidified on ice. In contrast, the replica made using canola oil was less viscous and creamy sauce-like at room temperature and became less runny when cooled on ice. The replica made with a mixture of 8% canola oil+8% cocoa butter was of intermediate viscosity at room temperature, but set when cooled on ice.

Example 33E: Modulating Viscosity of the Coacervate Using Emulsifying Salts

Coacervate samples were prepared by first making an emulsion of pea vicilin:legumin (3:1 ratio by weight, total protein concentration of 10%) and a mixture of canola and palm oils (10% each v/v, sourced from Jedwards International). Calcium chloride (Sigma) was added to a final concentration of 1 mM and trisodium pyrophosphate dodecahydrate (TSP12, from Prayon) was added to 1% (w/v). The mixture then was acidified using 1N hydrochloric acid and centrifuged at 5000×g for 10 minutes to collect the coacervate. In a control experiment, coacervate was formed using the same protein and fat mixture but without addition of calcium chloride and emulsifying salts. Although both the coacervate with TSP12 and control sample were cheese sauce-like in nature at room temperature, the coacervate formed from the mixture containing TSP12 showed much lower viscosity and flowed more readily than the control.

Example 34A: Forming Cold Gels with Fat and Cheese Starter Cultures

A cheese replica was formed by first heating a solution of pea-vicilin (>90% purity as judged by gel electrophoresis) at a concentration of 6% (w/v) in 20 mM potassium phosphate buffer pH 7.4+100 mM sodium chloride at 95° C. for 30 minutes. The solution was cooled back down to room temperature. Palm fruit oil (20% v/v, from Jedwards International), glucose (1% w/v), and a starter culture (*Lactococcus lactis lactis* subsp. *diacetylactis* from Danisco) were added to the solution at 0.02% (w/v) and mixed. Calcium chloride was added to a final concentration of 20 mM and the solution was incubated at 30° C. for 24 hours to allow for growth of the Lactococcal culture. The resulting gel was a soft, yogurt-like material that was smooth in texture. The gel did not melt on heating.

Example 34B: Cold Gels with Crosslinked Proteins

A cheese replica was made by heat denaturing a solution of pea-vicilin (>90% purity as judged by gel electrophoresis) at a concentration of 6% (w/v) in 20 mM potassium phosphate buffer pH 7.4+100 mM sodium chloride at 100° C. for 30 minutes. The solution was cooled back down to room temperature and gelled by addition of palm oil (to 40% v/v from Jedwards International) and calcium chloride to 20 mM. The solutions were transferred to 4° C. to obtain a soft, thick yogurt-like gel. The increased amount of fat resulted in a thicker gel. Soy protein (unfractionated) was added to a final concentration of 5% (w/v) and crosslinking was initiated by addition of a transglutaminase (from Ajinomoto) at 0.5% (w/v). The materials were stirred for 1 hr at room temperature and subsequently acidified to a pH of 5 (by addition of 1N hydrochloric acid) while mixing to produce cheese replicas with improved texture (increased firmness, resembling cottage cheese) and meltability (melts in oven set to 350° F.).

Example 34C: Cold Gels Combined with Coacervate to Form Meltable Cheese Replicas A cheese-replica was prepared by combining a cold gel with coacervate as described below. The cold gel component was first prepared by heat denaturing a solution of pea-vicilin (>90% purity as judged by gel electrophoresis) at a concentration of 6% (w/v) in 20 mM potassium phosphate buffer pH 7.4+100 mM sodium chloride at 100° C. for 30 minutes. The solution was cooled back down to room temperature and gelled by adding palm oil (to 40% v/v from Jedwards International) and calcium chloride to 20 mM. The mixture was incubated for approximately 10 minutes at room temperature to allow the gel to form.

The coacervate component was formed from a mixture of 3:1 pea vicilin: legumin (total protein concentration of 11% w/v) and palm fruit oil (5% v/v). The mixture was sonicated to form an emulsion and acidified with 1N hydrochloric acid to pH 5. The mixture was then centrifuged at 5000×g for 10 minutes to collect the coacervate (heavier phase at bottom).

The cold gel was mixed with the coacervate in a 2:1 proportion by weight to form a cheese-replica with a soft but thick curd-like consistency at room temperature. Upon heating in an oven at 350° F., the replica melted like cheese.

Example 35: Formation of Meltable Gels with Fractionated Proteins

Solutions of pea proteins at 7-9% protein concentrations (unfractionated), 50 mM NaCl, were adjusted to pH 3-9 using acid (HCl) or base (NaOH) as appropriate. The solutions were subjected to a heat-cool cycle by heating to 95° C. in a water bath, holding at 95° C. for 1 hr and then turning off the heat and allowing the samples to slowly cool back to room temperature while in the water bath. The samples were then removed from the containers and the gels were evaluated for appearance and meltability. All samples showed formation of an opaque, white precipitate-like curd that did not melt upon heating.

To evaluate properties of the pea protein fractions comprising the globular proteins in peas, the proteins were fractionated via anion exchange chromatography. A mixture of crude pea proteins (0.5% w/v) in 20 mM potassium phosphate buffer pH 8+50 mM NaCl was passed over Q-Sepharose (GE Life Sciences). The unbound protein fraction was collected (albumins) and the bound proteins were fractionated over a salt gradient 50-500 mM NaCl. Proteins were observed to elute in 2 major peaks (peak 1=vicilin+convicilin, peaks 2=legumin), fractions were pooled and then frozen until use.

Pea protein fractions (vicilin+convicilin and legumin) were tested for formation of meltable gels by dialyzing proteins into buffered solutions pH 4-9 at NaCl concentrations of 50, 100 mM and 300 mM (Buffers used at 20 mM each: pH 4,5 sodium acetate, pH 6-8 potassium phosphate, pH 9 sodium carbonate). Solutions of 7% protein (w/v) at respective NaCl and pHs were subject to heat-gelation as described above. The samples were then removed from the tubes and evaluated for appearance and melting behavior. Observations are summarized in Table 21.

TABLE 21

Summary of types of gels comprising pea protein legumins and vicilins obtained under various pH and NaCl concentrations

| | pH 4 | pH 5 | pH 6 | pH 7 | pH 8 | pH 9 |
|---|---|---|---|---|---|---|
| Pea-vicilin + convicilin | | | | | | |
| 100 mM NaCl | phase separation | | some precipitate | | translucent gel, meltable | |
| 300 mM NaCl | precipitate | | | | opaque gel, no melt | |
| Pea-legumin | | | | | | |
| 100 mM NaCl | phase separation | | some precipitate | | opaque gel, does not melt | |
| 300 mM NaCl | opaque gels, do not melt | | | | translucent gel, meltable | |

It was found that pea vicilins (+convicilin) and legumins formed meltable gels at pH >7 but did so at different NaCl concentrations. This likely explains why a mixture of pea-legumins and vicilins (+convicilin) did not form a meltable gel under any condition.

It was further explored how pure the legumin or vicilin fractions needed to be in order to obtain meltable gels. Fractionated pea proteins (legumin and vicilin (+convicilin)) fractionated as described above were mixed in ratios legumin: vicilin 0:8, 1:7, 2:6, 3:5, 1:1, 5:3, 6:2, 7:1 and 8:0 (at total protein concentration of 8% w/v in 20 mM potassium phosphate buffer pH 7.4 at 158 mM and 300 mM NaCl concentrations. The samples were subject to heat-cool cycle by heating to 95° C. in a water bath, holding at 95° C. for 15 minutes and cooling to 30° C. at the rate of 0.5 C./min. The samples were then evaluated for melting properties. At 158 mM NaCl where the vicIin (+convicilin) fraction was expected to form a meltable gel, only samples at legumin: vicilin ratios of 2:6, 1:7 and 8:0 formed meltable gels. This suggests that vicilin (+convicilin) fraction needs to be at least 75% pure to form meltable gels. On the other hand, at 300 mM NaCl where legumins are expected to form meltable gels, only samples at a legumin:vicilin ratio of 7:1 and 8:0 formed meltable gels. This suggests that legumin fraction needs to be at least 87.5% pure to form meltable gels.

Example 36: Using Melting Salts for Gelled Emulsions of Proteins

Solutions of pea legumin, vicilin (+convicilin), soy proteins, and moong 8S proteins were prepared at 7% (w/v) in 20 mM potassium phosphate buffer pH 7.4 at 100 mM NaCl (except pea legumins at 300 mM NaCl). Melted palm oil (from Jedwards International) was added at 20% (v/v), calcium chloride (from Sigma) at 1 mM and a melting salt (disodium phosphate (DSP), trisodium pyrophosphate dodecahydrate (TSP12), sodium hexametaphosphate (SHMP) or trisodium citrate (TSC)) was added at 1% (w/v) and the mixtures were sonicated to form an emulsion. Each salt was tested for every protein based emulsion. No melting salt added to control samples. The emulsions were transferred to closed containers in a water bath and then subjected to a heat-cool cycle to induce gelation (heated to 95° C. for 15 minutes, held at 95° C. for 15 minutes and cooled to 30° C. at 0.5-1 C./min). The samples were then removed from the container and evaluated for meltability.

It was found that while protein solutions described here readily form meltable gels at pH 7.4 at 100 mM NaCl (300 mM NaCl for pea-legumin), the presence of fats appears to interfere with meltability of the gels, i.e., control samples containing protein+oil+/−calcium chloride did not form meltable gels. However, addition of melting salts allowed the protein gels to retain meltability as summarized in Table 23.

TABLE 23

Summary of specificity of melting salts for emulsions comprising different proteins.

| Protein franction in emulsion | DSP | TSP | SHMP | TSC |
|---|---|---|---|---|
| pea-vicilin (+convicilin) | ✓ | ✓ | x | x |
| pea-legumin | x | ✓ | ✓ | ✓ |
| soy (unfractionated) | ✓ | x | x | x |
| mung 8s globulin | ✓* | x | x | x |

(✓) indicates heat-induced gel formed from emulsion was meltable,
(x) indicates gel was not meltable;
*indicates sample was heated to a maximum of 85° C. during the gelling procedure.

Example 37: Making a Nut Milk Ricotta

A pasteurized nut milk containing 12-14% fat and having a pH between 6.0 to 6.3 was used to prepare ricotta cheese replica. *Lactococcus lactis lactis* (0.02 g/L) and *Lactococcus lactis cremoris* (0.02 g/L) were inoculated into the nut milk held at about 80° F., then stirred for 15 minutes. Hydrated transglutaminase (ACTIVA TI, from Ajinomoto) was added to the inoculated milk and was allowed to coagulate at temperatures between 12° C. and 25° C. for 10 to 14 hours. When the pH was below 4.6, the curd was cut into 1" cubes and drained and pressed for 24 hours at 41° F. to obtain firm ricotta with a moisture range from 62 to 68%. The curd can be salted and whipped as desired.

What is claimed is:

1. A ricotta cheese replica comprising:
   (a) a solidified nut milk comprising 15% or less of insoluble solids from a starting nut milk,
   (b) a transglutaminase enzyme,
   (c) *Lactococcus lactis lactis*, and
   (d) *Lactococcus lactis cremoris*,
   wherein the transglutaminase enzyme was added to the nut milk at an amount between 0.001% and 0.05% weight/volume, and wherein the *Lactococcus lactis lactis* and *Lactococcus lactis cremoris* were added to said nut milk comprising 15% or less of insoluble solids milk at 0.02 g/L.

2. The ricotta cheese replica of claim 1, wherein said nut milk comprising 15% or less of insoluble solids is almond milk.

3. The ricotta cheese replica of claim 1, wherein the replica has a moisture content of 62% to 68%.

4. The ricotta cheese replica of claim 1, wherein the replica has a pH below 4.6.

5. A ricotta cheese replica comprising:
   (a) a solidified nut milk comprising 15% or less of insoluble solids from a starting nut milk,
   (b) a transglutaminase enzyme, and
   (c) *Lactococcus lactis lactis*,
   wherein the transglutaminase enzyme was added to said nut milk comprising 15% or less of insoluble solids milk at an amount between 0.001% and 0.05% weight/volume, and wherein the *Lactococcus lactis lactis* was added to said nut milk comprising 15% or less of insoluble solids milk at 0.02 g/L.

6. The ricotta cheese replica of claim 5, wherein said nut milk is almond milk.

7. The ricotta cheese replica of claim 5, wherein the replica has a moisture content of 62% to 68%.

8. The ricotta cheese replica of claim 5, wherein the replica has a pH below 4.6.

* * * * *